（12） United States Patent
Gulick, Jr. et al.

(10) Patent No.: US 11,466,477 B2
(45) Date of Patent: Oct. 11, 2022

(54) SECURITY APPARATUS FOR THE FUNCTIONAL DISPLAY OF PORTABLE ELECTRONIC DEVICES

(71) Applicant: Scorpion Security Products, Inc., Vestal, NY (US)

(72) Inventors: Franklyn W. Gulick, Jr., Vestal, NY (US); Gary R. Page, Chenango Forks, NY (US); Patrick McEwen, Greene, NY (US); Andrew Bartoszewski, Syracuse, NY (US)

(73) Assignee: Scorpion Security Products, Inc., Vestal, NY (US)

( * ) Notice: Subject to any disclaimer, the term of this patent is extended or adjusted under 35 U.S.C. 154(b) by 0 days.

(21) Appl. No.: 17/297,677

(22) PCT Filed: Jul. 15, 2020

(86) PCT No.: PCT/US2020/042092
§ 371 (c)(1),
(2) Date: May 27, 2021

(87) PCT Pub. No.: WO2021/011625
PCT Pub. Date: Jan. 21, 2021

(65) Prior Publication Data
US 2021/0363788 A1  Nov. 25, 2021

Related U.S. Application Data

(60) Provisional application No. 62/874,277, filed on Jul. 15, 2019, provisional application No. 62/994,305, (Continued)

(51) Int. Cl.
*E05B 73/00* (2006.01)
*F16M 11/04* (2006.01)

(52) U.S. Cl.
CPC ....... *E05B 73/0082* (2013.01); *F16M 11/041* (2013.01); *F16M 2200/028* (2013.01); *F16M 2200/08* (2013.01)

(58) Field of Classification Search
CPC .............. E05B 73/0082; F16M 11/041; F16M 2200/028; F16M 2200/08
See application file for complete search history.

(56) References Cited

U.S. PATENT DOCUMENTS 4,833,442 A * 5/1989 Von Heck ............. B60R 25/093
340/427
5,695,164 A * 12/1997 Hartmann ............... B60R 11/00
248/206.4

(Continued)

FOREIGN PATENT DOCUMENTS

CN   206973217 U   2/2018
GB   2533500 A *  6/2016  ......... E05B 73/0082

(Continued)

OTHER PUBLICATIONS

International Searching Authority, International Search Report and Written Opinion, International Application No. PCT/US20/42092, dated Oct. 15, 2020, (10 Pages).

(Continued)

*Primary Examiner* — Kimberly T Wood
(74) *Attorney, Agent, or Firm* — Barclay Damon LLP

(57) ABSTRACT

A security apparatus for securing a portable electronic device comprises a support and a guide positioned within the support and defining a plurality of surface features. At least two holders are partially positioned between the guide and the support and define a plurality of complimentary surface features. A lock assembly is configured move between an unlocked state and a locked state. In an unlocked state, the at least two holders are enabled to move in a first direction that is away from the support and in an opposing second (Continued)

direction to move the at least two holders towards the support. In a locked state, the lock assembly moves the guide to clamp the at least two holders between the guide and the support to engage the surface features of the guide with those of the holders and inhibit movement of the at least two holders in the first direction.

20 Claims, 58 Drawing Sheets

Related U.S. Application Data filed on Mar. 25, 2020, provisional application No. 63/011,390, filed on Apr. 17, 2020.

(56) References Cited

U.S. PATENT DOCUMENTS

| | | | | |
|---|---|---|---|---|
| 5,715,711 | A * | 2/1998 | Jennison | B60R 25/093 |
| | | | | 188/32 |
| 8,066,241 | B2 | 11/2011 | Yu | |
| 8,264,827 | B2 * | 9/2012 | Yuan | G06F 1/1605 |
| | | | | 361/679.21 |
| 8,464,563 | B2 * | 6/2013 | Perez | E05B 73/0023 |
| | | | | 70/57.1 |
| 8,638,557 | B2 * | 1/2014 | Tsai | H04M 1/04 |
| | | | | 361/679.56 |
| 8,864,089 | B2 * | 10/2014 | Hung | F16M 11/041 |
| | | | | 248/274.1 |
| 9,103,492 | B2 * | 8/2015 | Springer | F16M 13/022 |
| 9,117,351 | B2 * | 8/2015 | Gulick, Jr. | G06F 21/88 |
| 9,972,178 | B2 * | 5/2018 | Richardson | G06Q 30/0185 |
| 10,208,777 | B1 * | 2/2019 | Brassard | F16M 11/041 |
| 10,378,248 | B1 * | 8/2019 | Kelsch | E05B 73/0017 |
| 10,448,759 | B1 * | 10/2019 | Chapuis | A47F 5/16 |
| 10,533,699 | B2 * | 1/2020 | Yang | H04B 1/3877 |
| 10,663,104 | B2 * | 5/2020 | Yang | F16M 13/022 |
| 10,858,865 | B2 * | 12/2020 | Kelsch | E05B 73/0017 |
| 2011/0062299 | A1 * | 3/2011 | Tsai | F16M 11/041 |
| | | | | 248/231.41 |
| 2012/0037783 | A1 | 2/2012 | Alexander et al. | |
| 2012/0234055 | A1 | 9/2012 | Bland, III et al. | |
| 2013/0104364 | A1 | 5/2013 | Carnevali | |
| 2013/0301216 | A1 * | 11/2013 | Trinh | A47F 7/0246 |
| | | | | 361/679.58 |
| 2014/0042285 | A1 * | 2/2014 | Carnevali | F16M 13/00 |
| | | | | 248/316.4 |
| 2014/0166832 | A1 * | 6/2014 | Briant | A45F 5/10 |
| | | | | 248/205.1 |
| 2015/0060624 | A1 | 3/2015 | Huang | |
| 2015/0300050 | A1 * | 10/2015 | Van Balen | A47F 5/0087 |
| | | | | 248/551 |
| 2015/0305518 | A1 | 10/2015 | Galant | |
| 2016/0225204 | A1 | 8/2016 | Grziwok et al. | |
| 2017/0049251 | A1 * | 2/2017 | Gulick, Jr. | A47F 7/0246 |
| 2017/0107742 | A1 | 4/2017 | Moock et al. | |
| 2017/0188724 | A1 * | 7/2017 | Lin | F16M 11/041 |
| 2018/0252003 | A1 | 9/2018 | Klinkman et al. | |
| 2018/0261058 | A1 | 9/2018 | Richardson et al. | |
| 2018/0279809 | A1 | 10/2018 | Regan et al. | |
| 2020/0107653 | A1 * | 4/2020 | Leyden | E05B 73/0082 |

FOREIGN PATENT DOCUMENTS

| | | | | |
|---|---|---|---|---|
| KR | | 101326687 B1 | 11/2013 | |
| WO | WO-2012137007 A1 * | | 10/2012 | F16M 13/00 |
| WO | | 2109213490 A1 | 11/2019 | |

OTHER PUBLICATIONS

International Preliminary Examining Authority, International Preliminary Report on Patentability, International Application No. PCT/US20/42092, dated Mar. 2, 2021 (72 pages).

International Preliminary Examining Authority, Communication in Cases for which no other Form is Applicable (Amending IPRP), International Application No. PCT/US20/42092, dated Apr. 19, 2021 (71 pages).

European Patent Office, Extended Search Report, Application No. 19796333.3, Patent No. 3788221, dated Jan. 1, 2022 (38 pages).

* cited by examiner

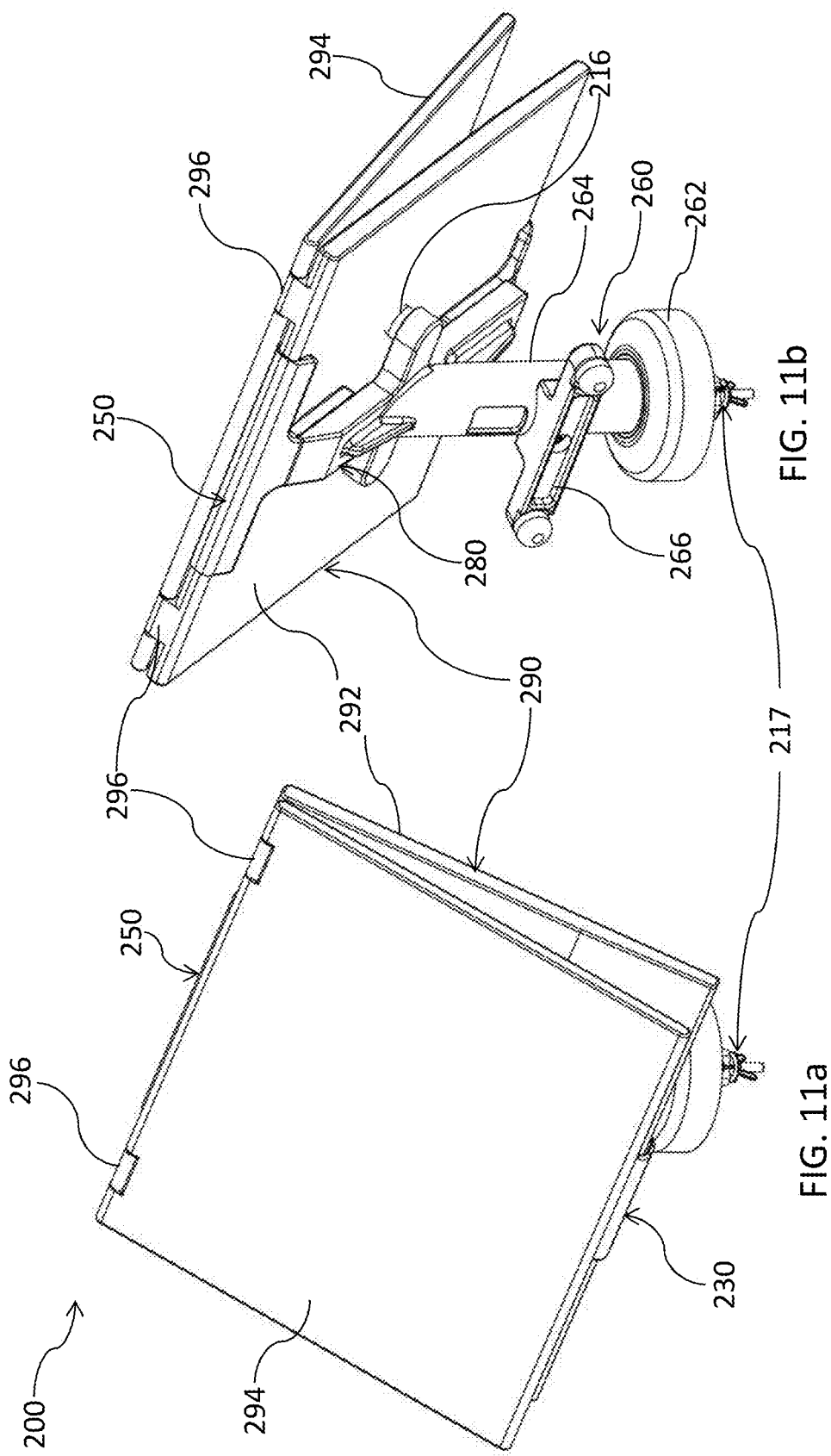

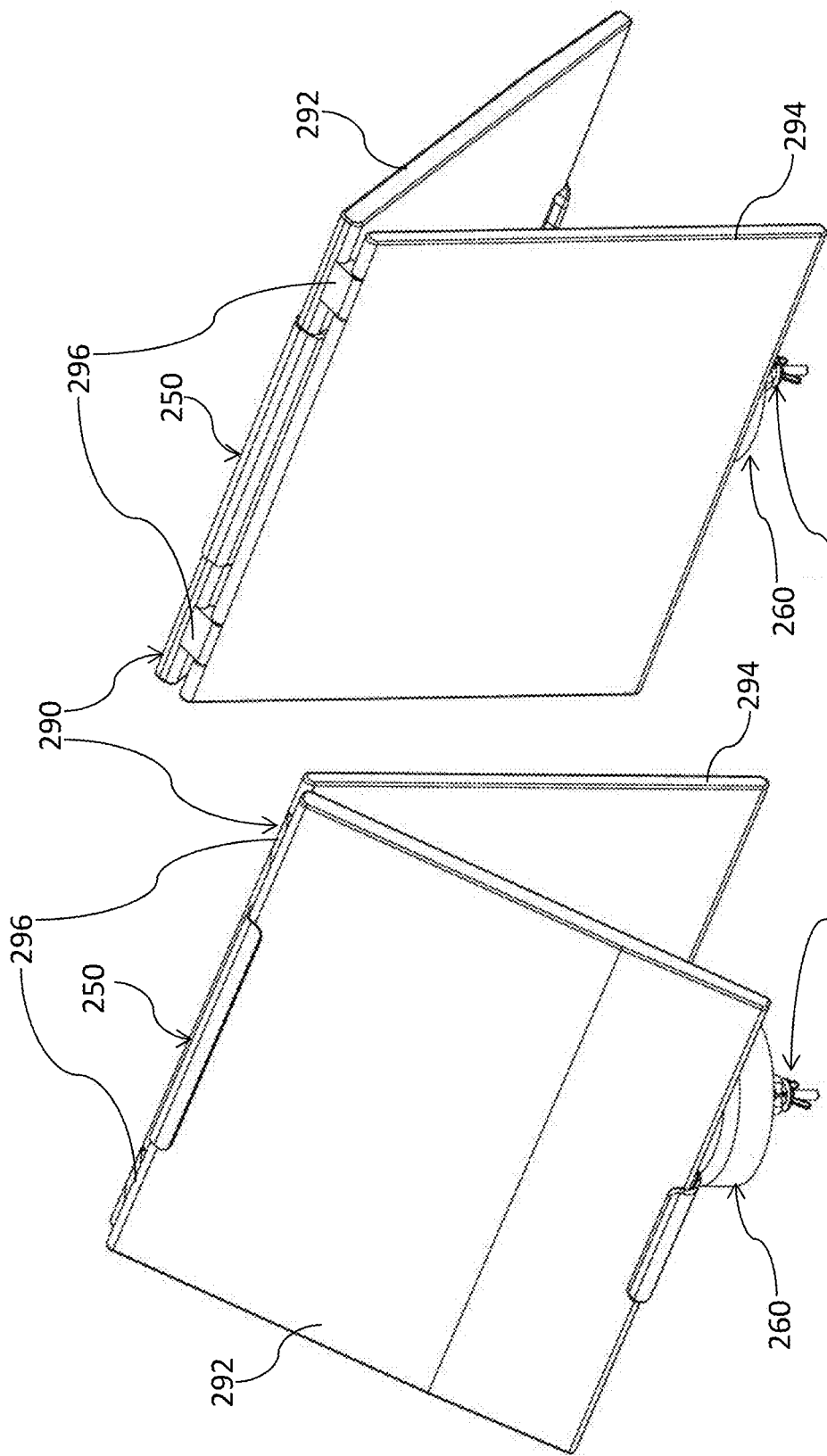

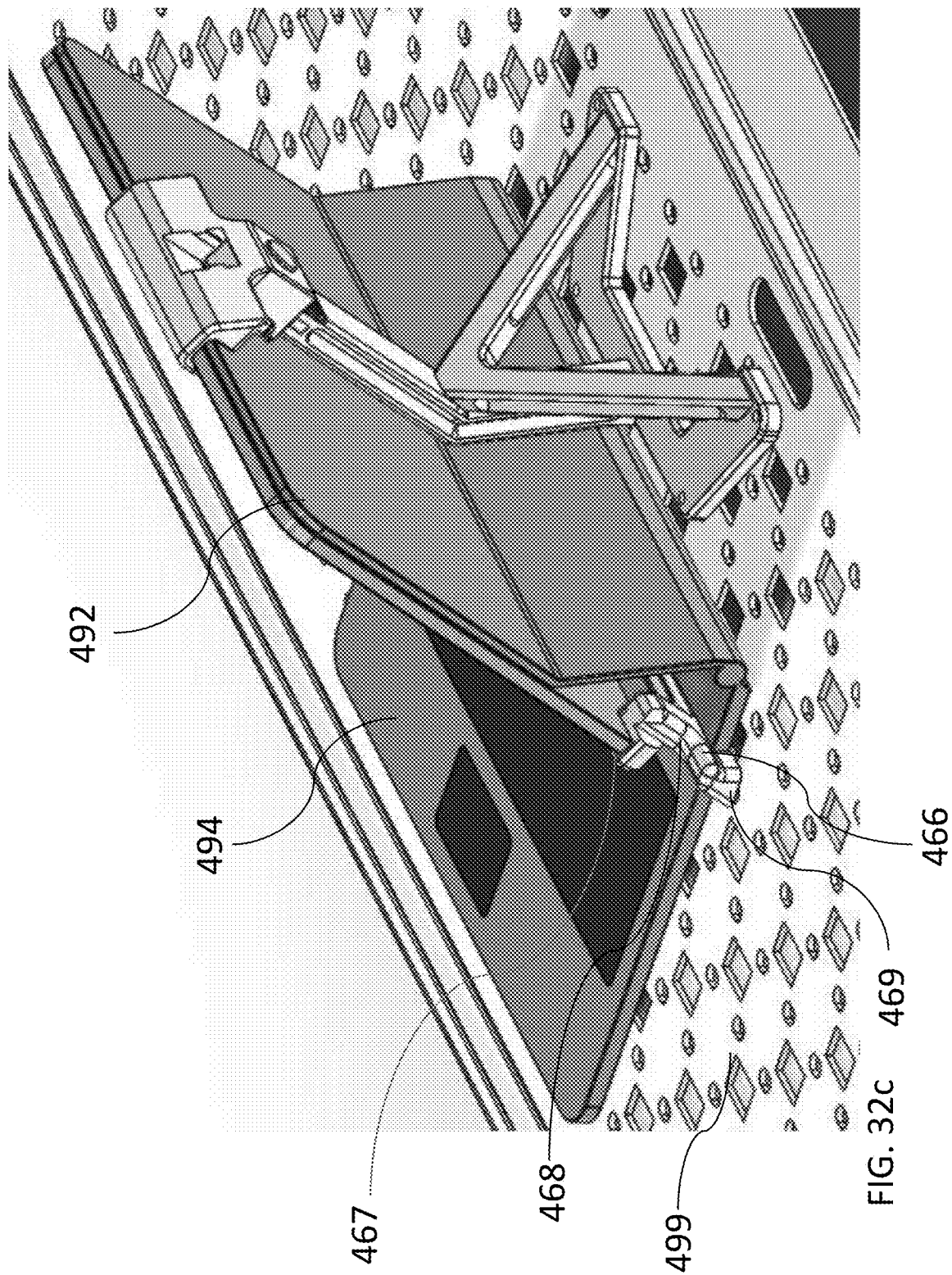

SECURITY APPARATUS FOR THE FUNCTIONAL DISPLAY OF PORTABLE ELECTRONIC DEVICES

CROSS-REFERENCE TO RELATED APPLICATIONS

This application claims the benefit of and priority to U.S. Provisional Patent Application No. 62/874,277, filed Jul. 15, 2019, U.S. Provisional Patent Application No. 62/994,305, filed on Mar. 25, 2020, and U.S. Provisional Patent Application No. 63/011,390, filed on Apr. 17, 2020. The entirety of these applications are incorporated herein by reference.

TECHNOLOGICAL FIELD

This invention relates to a security apparatus that is easily locked and unlocked, and which facilitates functional and secure display of portable, mobile, or handheld electronic devices of various sizes and shapes.

BACKGROUND

Retailers sell a wide range of portable or hand held electronic devices that can assist in or perform a multitude of tasks for the a user or customer. Part of the purchasing experience is having the ability to examine and test the device. This is done using floor models that are fitted with some form of security apparatus to prevent theft of the portable electronic device.

Some of the security apparatuses used by retailers allow a customer to pick up the electronic device while keeping it attached or tethered to the security apparatus. Other security apparatuses comprise a fixed portion that remains coupled to the display surface and a second portion coupled to the electronic device. These types of security apparatuses allow the customer to freely hold the electronic device while the second portion of the security apparatus remains attached to the electronic device. Unfortunately, these security apparatuses are not suitable for all types of electronic devices and provide a lower level of theft protection. Overall, many of the security apparatuses currently in use sacrifice security for the functional display of a portable electronic device.

The other security apparatuses in use err on the side of security over functional display and/or ease of operation. Consequently, they are cumbersome to operate and require undue time and effort to load and unload a portable electronic device. These security apparatuses also do not allow customers to fully interact with a portable electronic device while it is secured by the security apparatus. Another drawback of the security apparatuses currently in use is that they are designed for specific electronic devices and are not able to be adjusted to be used with other portable electronic devices. Therefore, a retailer will be required to more than one size/type of security apparatus in order to securely display a wide range of portable electronic devices.

These are just some of the problems associated with current security apparatuses for handheld or portable electronic devices.

BRIEF DESCRIPTION OF DRAWINGS

A more particular description of the invention briefly summarized above may be had by reference to the embodiments, some of which are illustrated in the accompanying drawings. It is to be noted, however, that the appended drawings illustrate only typical embodiments of this invention and are therefore not to be considered limiting of its scope, for the invention may admit to other equally effective embodiments. Thus, for further understanding of the nature and objects of the invention, references can be made to the following detailed description, read in connection with the drawings in which:

FIG. 7b illustrates a close up side plan view of area A from FIG. 7a;

FIG. 11a illustrates a front perspective view of an embodiment of the security apparatus securing a laptop computer in a closed position;

FIG. 11b illustrates a rear perspective view of an embodiment of the security apparatus securing a laptop computer in a closed position;

FIG. 12a illustrates a front perspective view of an embodiment of the security apparatus securing a laptop computer in an open position;

FIG. 12b illustrates a rear perspective view of an embodiment of the security apparatus securing a laptop computer in an open position;

FIG. 32b illustrates a top perspective view of the embodiment of the security apparatus of FIG. 32a;

FIG. 32c illustrates a rear perspective view of the embodiment of the security apparatus of FIG. 32a;

FIG. 32d illustrates a left elevational view of the embodiment of the security apparatus of FIG. 32a;

FIG. 41c illustrates a bottom perspective view of the embodiment of the security apparatus of FIG. 41a;

SUMMARY

Figure 1:
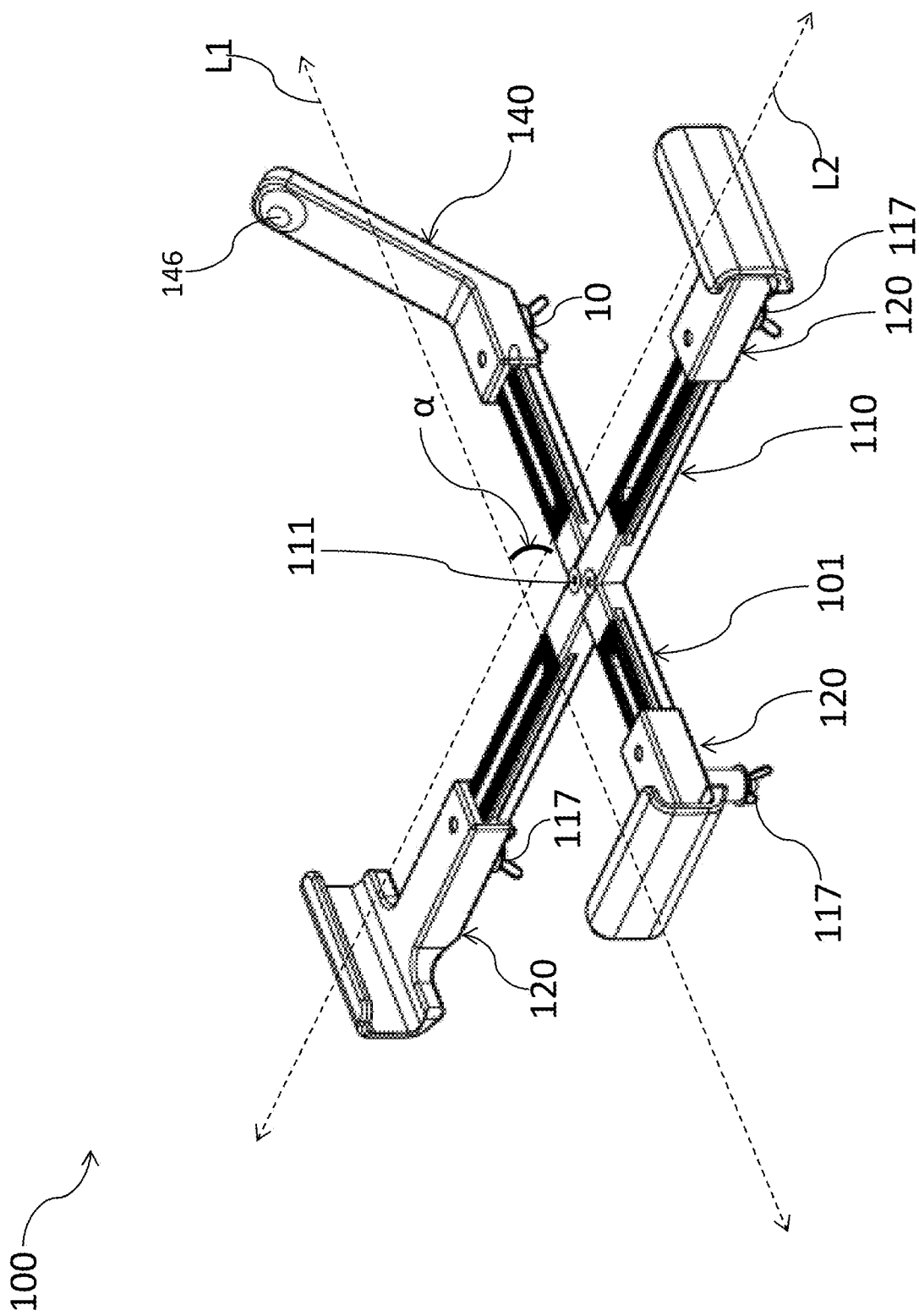
FIG. 1 illustrates a perspective front view of an embodiment of a security apparatus.

A security apparatus for a portable electronic device is disclosed. In an embodiment, the security apparatus comprises a base and a support assembly coupled to the base. The support assembly comprises a support base coupled to the base portion and a support plate coupled to at least one of the support base and the base. A guide assembly is positioned between the support base and the support plate and comprises a guide plate and at least two engagement plates positioned on the guide plate. Each of the at least two engagement plates defines a plurality of surface features. At least two holders are partially positioned between the guide assembly and the support plate. Each of the at least two holders comprises a retainer configured to retain a portion of the portable electronic device and a holder extension defining a plurality of surface features that are complimentary to the plurality of surface features defined on the at least two engagement plates. A lock assembly at least partially positioned within at least one of the base and the support assembly comprises a barrel configured to accept a locking tool and a locking pin operatively coupled to the barrel. The locking pin includes a biaser comprising one or more biaser surfaces. A biasing element is positioned adjacent to the locking pin.

In an unlocked state, the locking pin is positioned away from the biasing element and the at least two engagement plates are spaced apart from the holder extensions such that the at least two holders are enabled to move in a first direction to move the retainers away from the support assembly and an opposing second direction to move the retainers towards the support. In a locked state, the locking pin contacts and advances the biasing element into contact with the guide assembly to push the guide assembly towards the support plate to clamp the holder extensions between the guide assembly and the support plate such that the plurality or surface features of the holder extensions engage the surface features of the engagement plates to inhibit movement of the at least two holders in the first direction.

Another embodiment of the security apparatus for securing a portable electronic device comprises a base and a support assembly coupled to the base. The support assembly comprises a support base coupled to the base and a support plate coupled to at least one of the base and the support base. A guide assembly is positioned between the support base and the support plate and comprises a guide plate and at least two engagement plates that each define a plurality of surface features. At least two holders are partially positioned between the guide assembly and the support plate and each comprise a retainer configured to retain a portion of the portable electronic device, and a holder extension defining a plurality of surface features that are complimentary to the surface features of the at least two engagement plates. A lock assembly is at least partially positioned within at least one of the base and the support assembly and is configured move between an unlocked state and a locked state. In an unlocked state, the at least two engagement plates are spaced apart from the holder extensions such that the at least two holders are enabled to move in a first direction to move each retainer away from the support assembly and an opposing second direction to move each retainer towards the support assembly. In a locked state, the lock assembly urges the guide assembly towards the support plate to clamp the holder extensions between the guide assembly and the support plate, wherein the surface features of the holder extensions engage the surface features of the engagement plates to inhibit movement of the at least two holders in the first direction.

Another embodiment of the security apparatus for securing a portable electronic device comprises a base, a support coupled to the base, and a guide positioned within the support and defining a plurality of surface features. At least two holders are partially positioned between the guide and the support and each defines a plurality of surface features that are complimentary to the surface features of the guide. A lock assembly is at least partially positioned within at least one of the base and the support, and is configured move between an unlocked state and a locked state. In the unlocked state, the plurality of surface features defined by the guide are spaced apart from the plurality of surface features on the holders such that the at least two holders are enabled to move in a first direction that is away from the support and an opposing second direction to move the holders towards the support. In the locked state, the lock assembly moves the guide to clamp the holder between the guide and the support, wherein the surface features of the holder engage the plurality of surface features defined by the guide to inhibit movement of the at least two holders in the first direction.

DETAILED DESCRIPTION

FIGS. 1-9 illustrate an embodiment of a tool-less detachable security apparatus ("security apparatus") 100, which generally comprises a first support member 101 and a second support member 110. The first support member 101 and the second support member 110 each extend along an axis L1, L2, (FIGS. 1 and 2a) respectively. The first and second support members 101, 110 are fastened together using one or more fasteners 111 such that their axes L1, L2 (FIGS. 1 and 2a) intersect each other at an angle α (FIG. 2a) that may be about 90°. In other embodiments, the security apparatus 100 may comprise additional support members depending on the electronic device being secured. The first support member 101 may further comprise a notch 105 or other feature (FIG. 6) that is configured to engage the second support member 110 in order to add additional strength at their junction.

Figure 2:
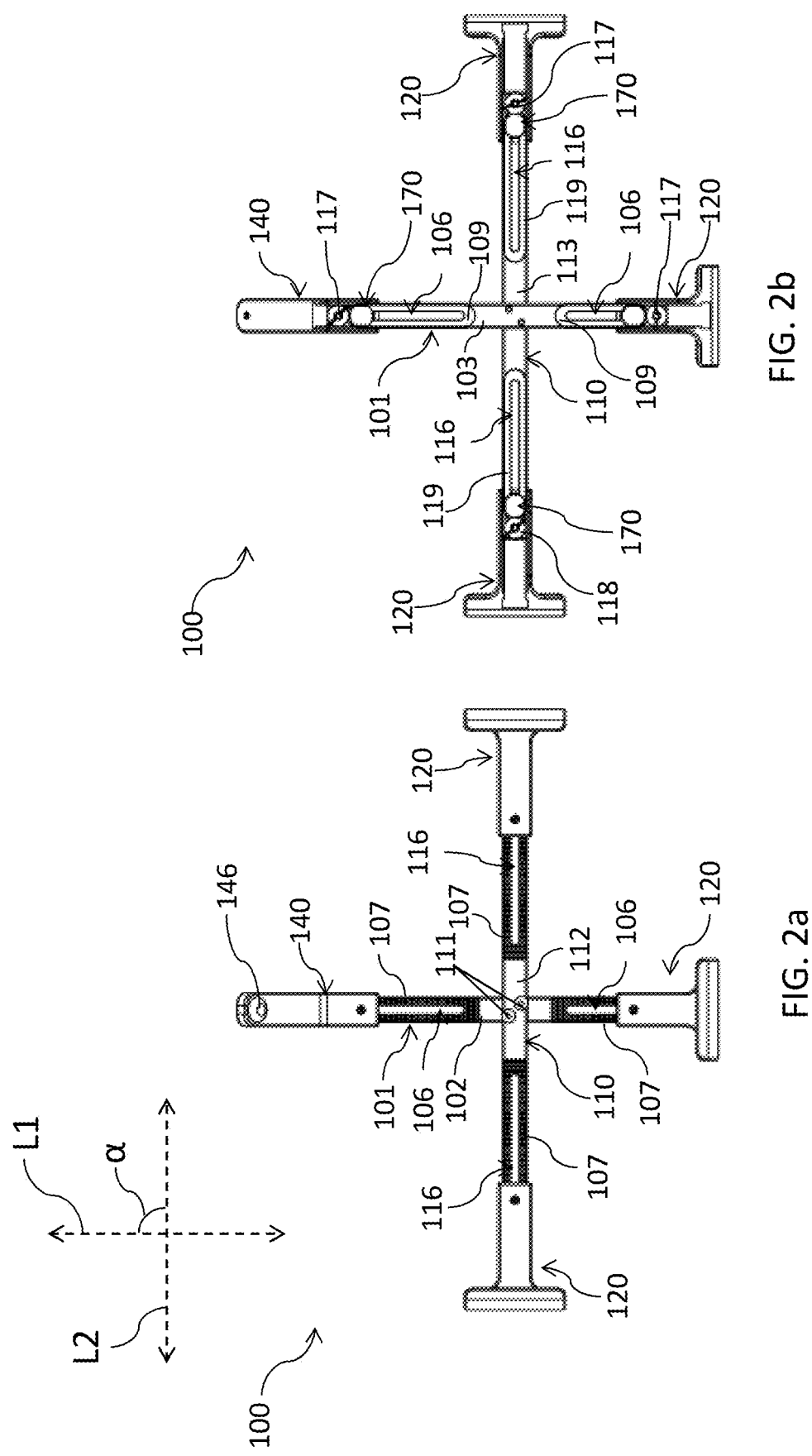
FIG. 2a illustrates a top plan view of an embodiment of the security apparatus.
FIG. 2b illustrates a bottom plan view of an embodiment of the security apparatus.
Figure 3:
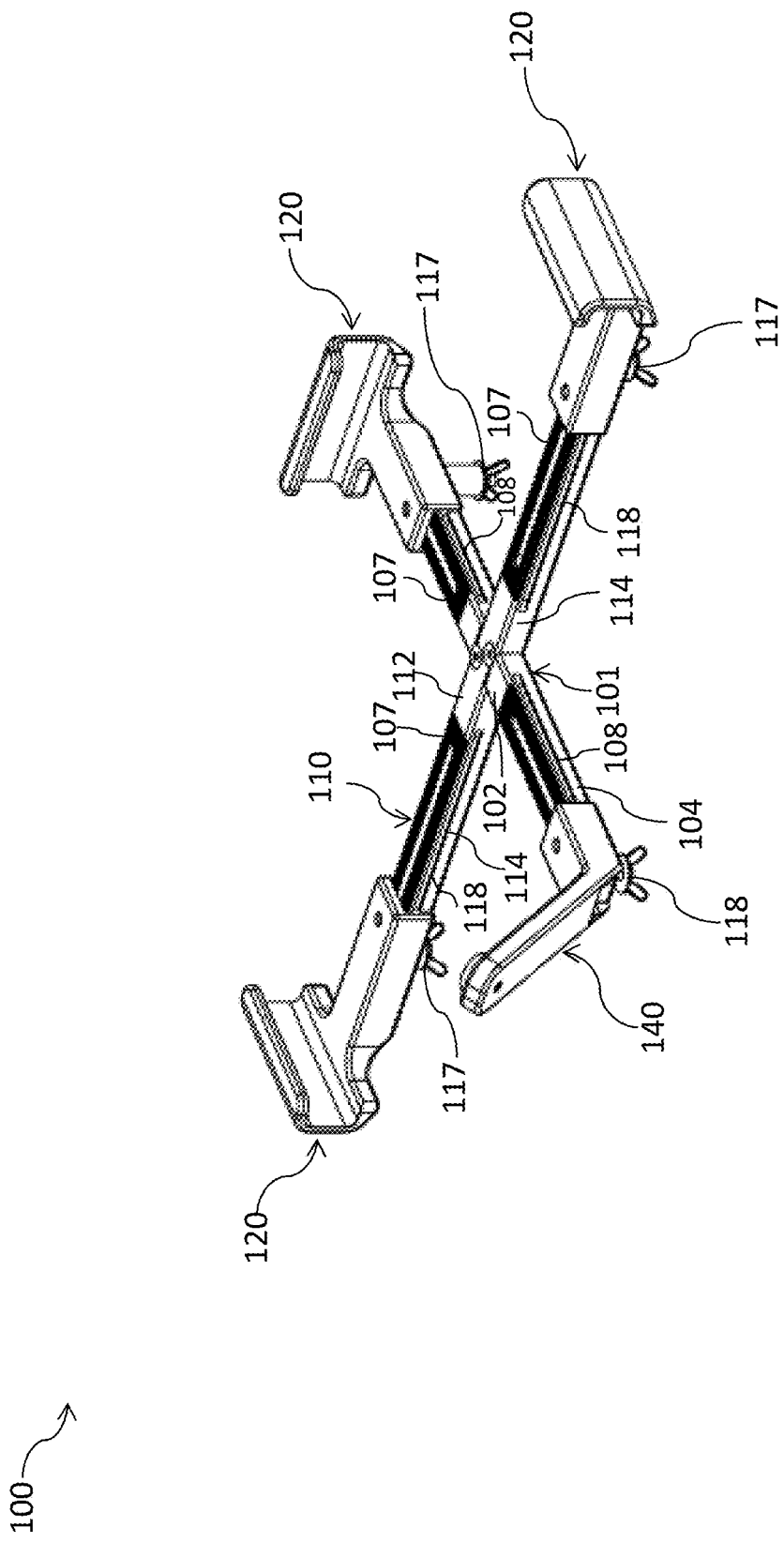
FIG. 3 illustrates a perspective rear view of an embodiment of the security apparatus.
Figure 4:
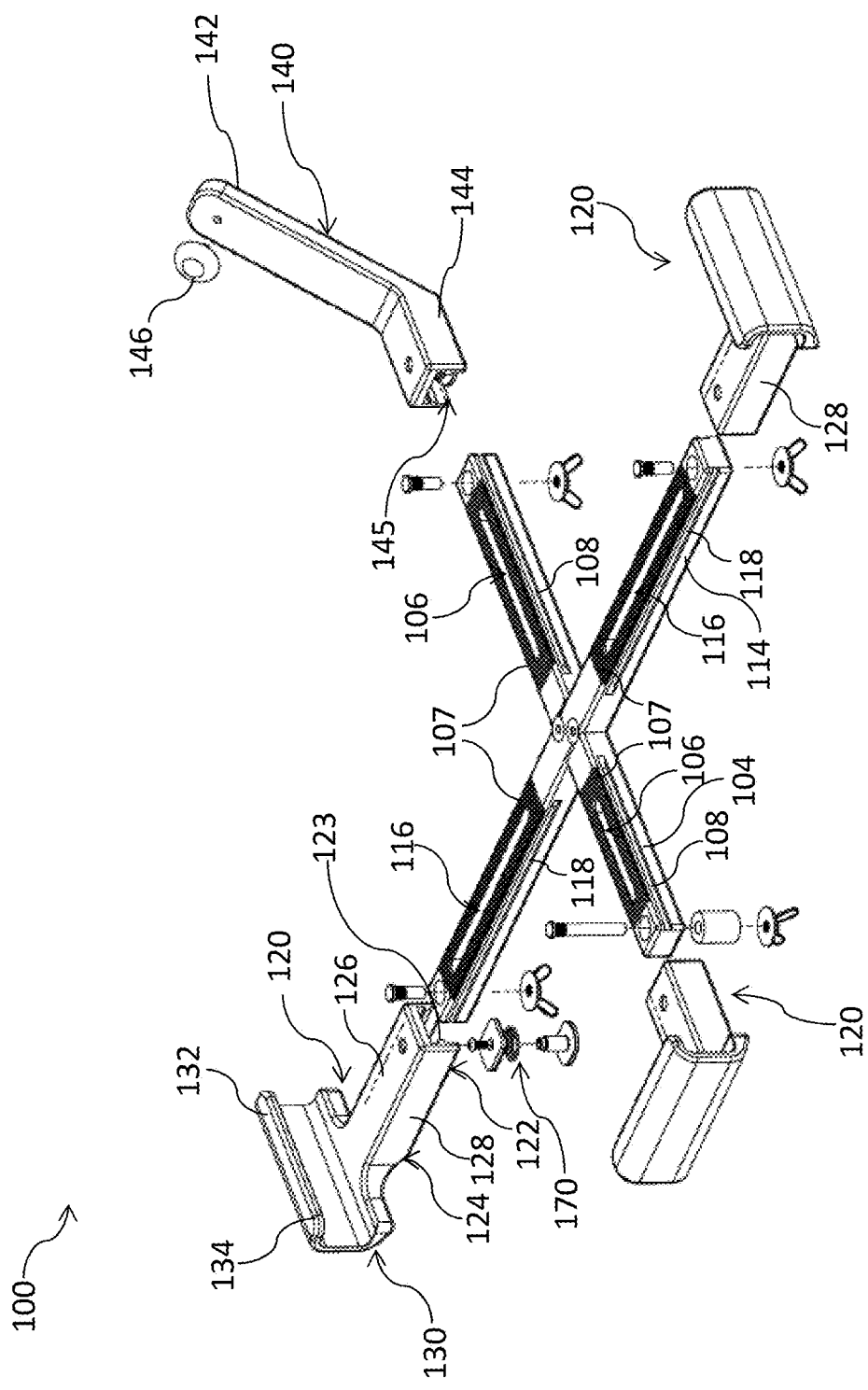
FIG. 4 illustrates an exploded view of an embodiment of the security apparatus.
Figure 5:
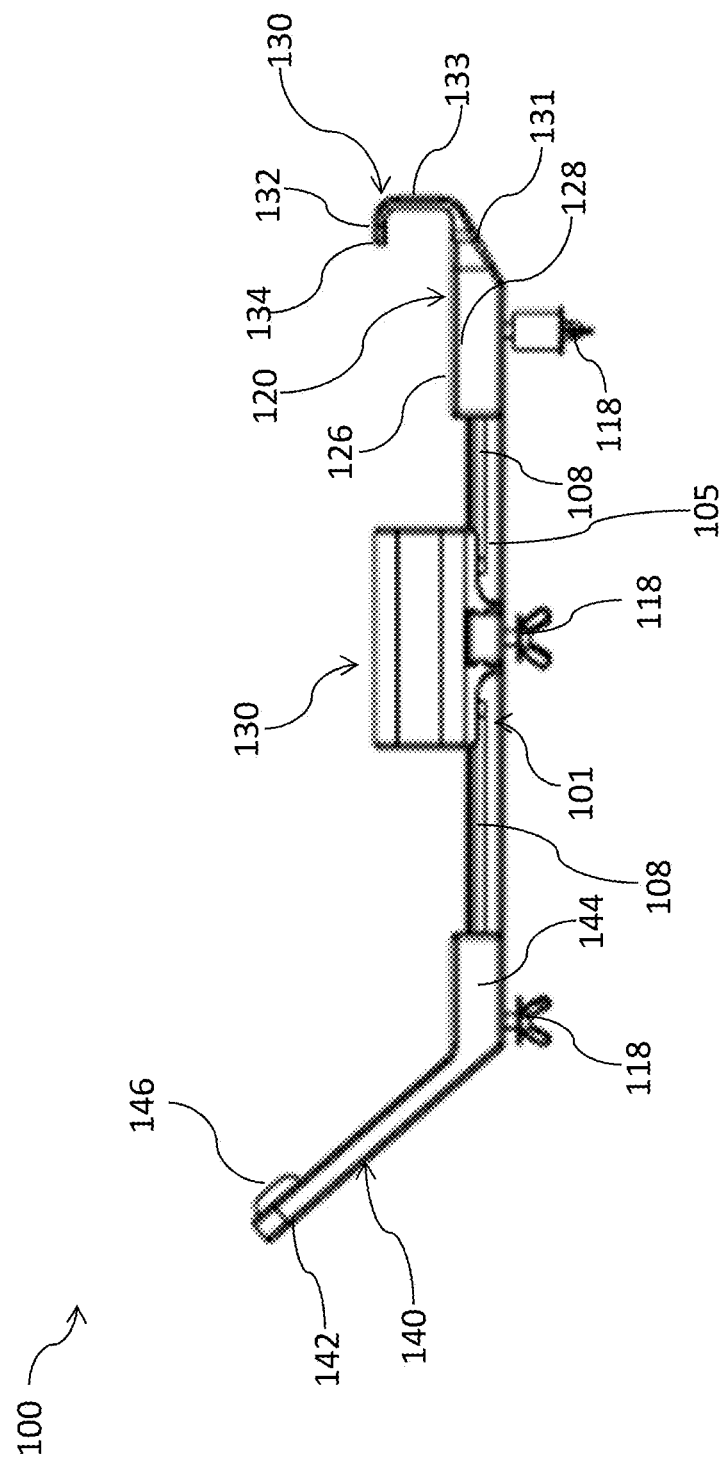
FIG. 5 illustrates a side plan view of an embodiment of the security apparatus.
Figure 6:
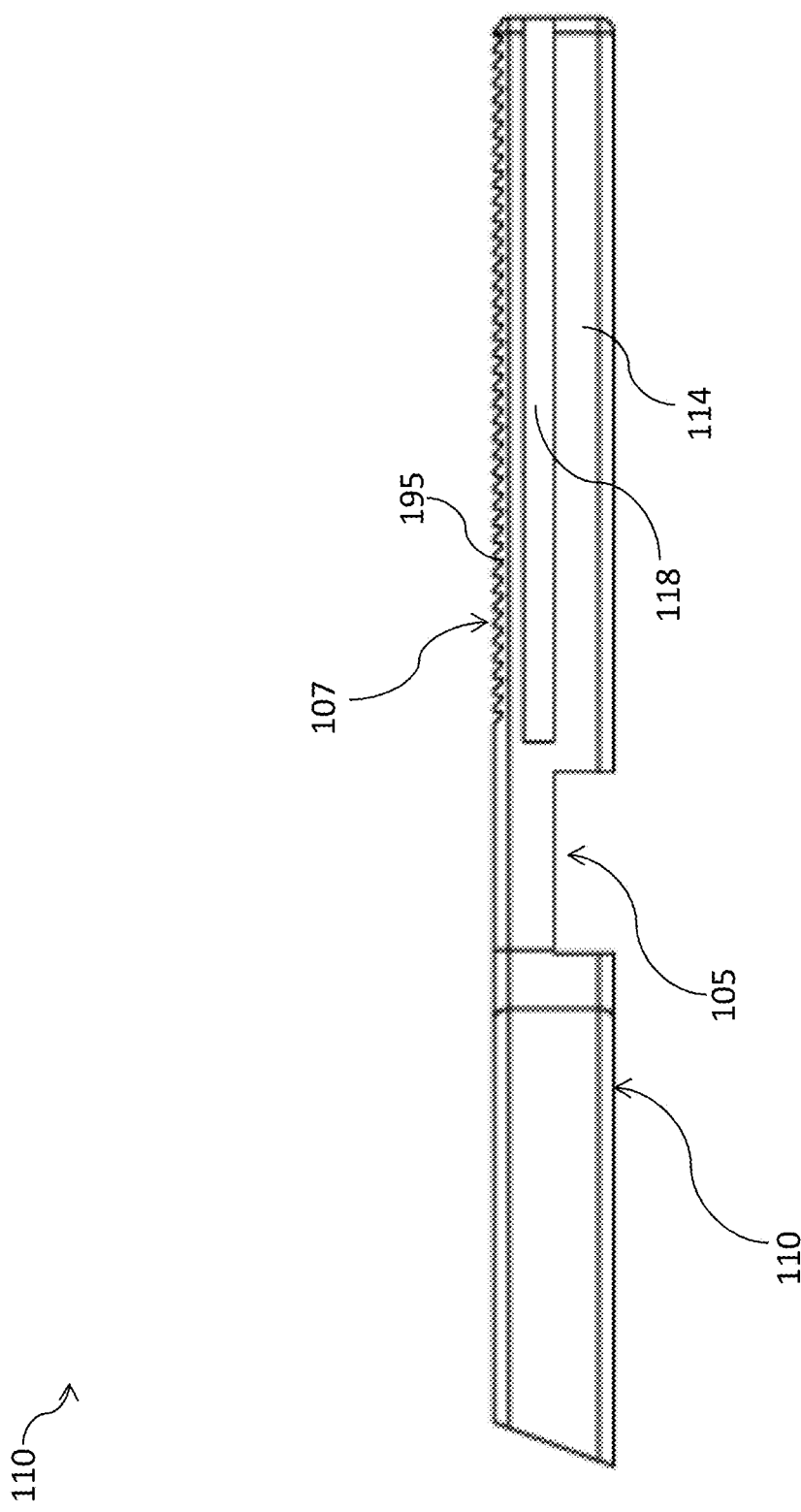
FIG. 6 illustrates a side plan view of an embodiment of a support member of the security apparatus.

As shown in FIGS. 2a-3, the first support member 101 comprises a top surface 102 (FIG. 2a), a bottom surface 103 (FIG. 2b), and side surfaces 104 (FIG. 3). Referring to FIGS. 1-5, one end of the first support member 101 is coupled to an arm 120 and the opposing end is coupled to a stop member 140. As shown in FIGS. 4-5, the stop member 140 comprises a brace 142 that extends from a base member 144. The base member 144 is configured to couple to the first support member 101. As show in FIG. 4, the base member 144 defines an interior space 145 that is configured to at least partially house the first support member 101. In an embodiment, the base member 144 fixedly couples to the first support member 101. The brace 142 may further comprise one or more resilient members 146 configured to engage a portion of a portable electronic device being secured in the security apparatus 100. Similar to the first support member 101, the second support member 110 also comprises a top surface 112, a bottom surface 113 (FIG. 2b), and opposing side surfaces 114. Each end of the second support member 110 may be coupled to an arm 120.

As shown in FIG. 3, each arm 120 generally comprises a top surface 126 and two (2) opposing side surfaces 128. The proximal end 122 of the arm 120 may be positioned closer to the junction of the first support member 101 and the second support member 110. The distal end 124 of the arm 120 comprises a holder 130. The holder 130 comprises a distal end surface 133 that extends above the top surface 126 and is coupled to a cap 132. The cap 132 extends from the top of the distal end surface 133 towards the proximal end 122 of the arm 120 to form a lip 134. The holder may further comprise an end cap 131 (FIG. 5) that also acts to limit the retraction of the arm 120. The holder 130 may be formed as a single unitary component or may be comprised of two (2) or more components joined together using one or more welded joints, fasteners, or any other suitable means to join the components. As shown specifically in FIG. 2b, the arms 120 may be open at the bottom such that a cavity is formed that is defined by the inner surfaces of the top surface 126 and the opposing side surfaces 128. The cavity may be configured to at least partially house a portion of one of the first or the second support members 101, 110. The cavity may also serve to decrease the overall weight of the security apparatus 100.

As shown, the security apparatus 100 comprises three (3) identical or nearly identical arms 120, however in other embodiments, one or more of the arms 120 may vary in its size and/or shape. The arms 120 may be configured to be completely removed or detached from the corresponding first and second support members 101, 110. In this manner, arms 120 of different sizes and shapes may be attached to the support members to fully customize the security apparatus 100.

Referring to FIGS. 2a, 2b, 4 and 7a-8, the first support member and the second support member 101, 110 each define one or more elongated openings 106, 116 that extend between the top surface 102, 112 and the bottom surface 103, 113 (FIGS. 2a-2b) of each of the first and second support member 101, 110. The one or more elongated openings 106, 116 extend a distance along the length of the first support member 101 and the second support member 110. A depression or recess 109, 119 is defined around the perimeter of each elongated opening 106, 116 on the bottom surface 103, 113 of the first and second support members 101, 110.

Figure 7A:
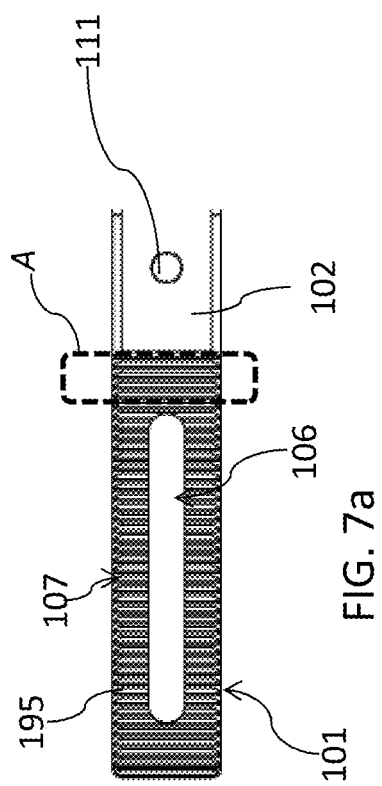
FIG. 7a illustrates a partial top plan view of an embodiment of a support member of the security apparatus.
Figure 7B:
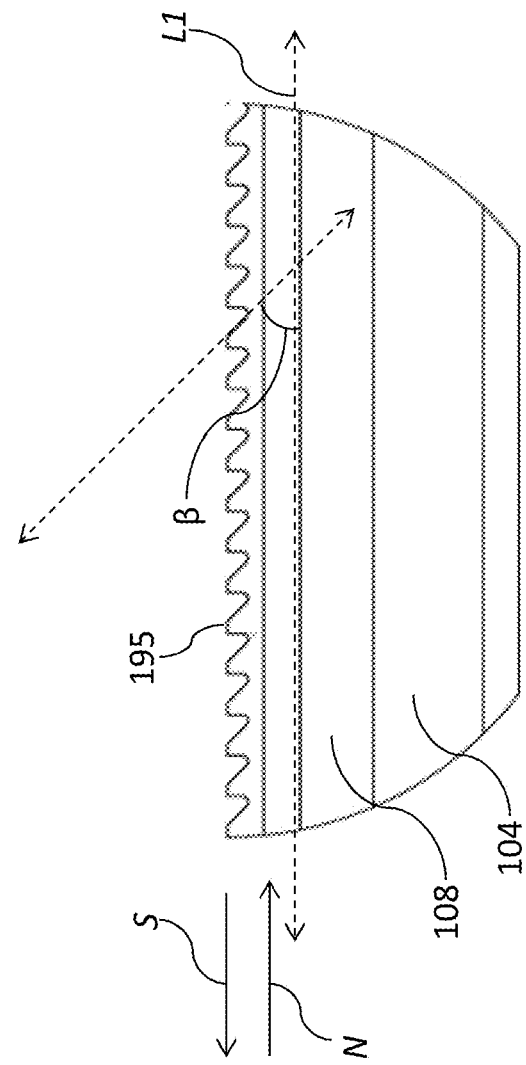

The top surfaces 102, 112 of the first support member 101 and the second support member 110 may further comprise a plurality of support member surface features 107 such as teeth 50. Referring to FIGS. 7a-7b, the teeth 195 may be angled with respect to the axis L1 of the first support member 101 at an angle β that is less than 90°. The teeth 195 of the second support member 110 may also be positioned with respect to the axis L2 (FIG. 2a) of the second support member 110 at an angle equal to β. As shown specifically in FIGS. 6-8, the side surfaces 104 of the first support member 101 and the side surfaces 114 of the second support member 110 comprise a first engagement structure 108, 118. The first engagement structure 108, 118 extends substantially along the length of the first support member 101 and second support member 110. As shown, the first engagement structure 108, 118 may be broken into two or more segments on each side of the first and second support members 101, 110 and may not extend continuously from one end of the first and second support members 101, 110 to the opposing end.

Figure 8:
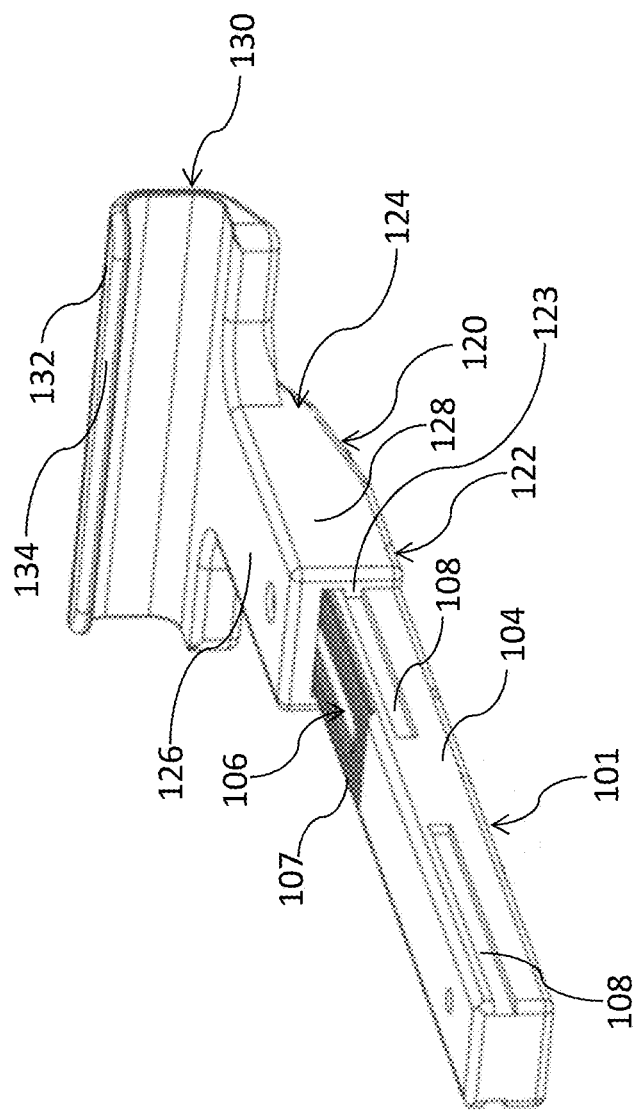
FIG. 8 illustrates a close up view of and embodiment of an arm coupled to a support member of the security apparatus.

Referring to FIG. 8, the arms 120 further comprise a second engagement structure 123 that is configured to fit at least partially within the first engagement structure 108, 118 of the first support member 101. As shown, the first engagement structure 108, 118 is a channel or recess and the second engagement structure 123 is protrusion, however in other embodiments, the first engagement structure 108, 118 is a protrusion and the second engagement structure 123 is channel or recess. As shown with regard to the first support member 101, the second engagement structure 123 is formed on an inner surface of each opposing side surface 128 and may extend along the length of the arm 120. The end of each arm 120 opposing the distal end surface 133 may be open to allow the arm 120 to slide along the length of the first support member 101. The interaction of the first engagement structure 108 and the second engagement structure 123 aid in coupling the arm 120 to the first support member 101 as well as assisting in the sliding action and stability of the arm 120 when coupled to the first support member 101. It will be understood that the second support member 110 also comprises a first engagement structure 118 that is also configured to engage the second engagement structure 123 that is formed on the inner surface of each opposing side surface 128 of the arm 120. The interaction of the second engagement structure 123 and the first engagement structure 118 of the second support member 110 may have similar advantages to those described above with regard to the first support member 101.

Figure 9:
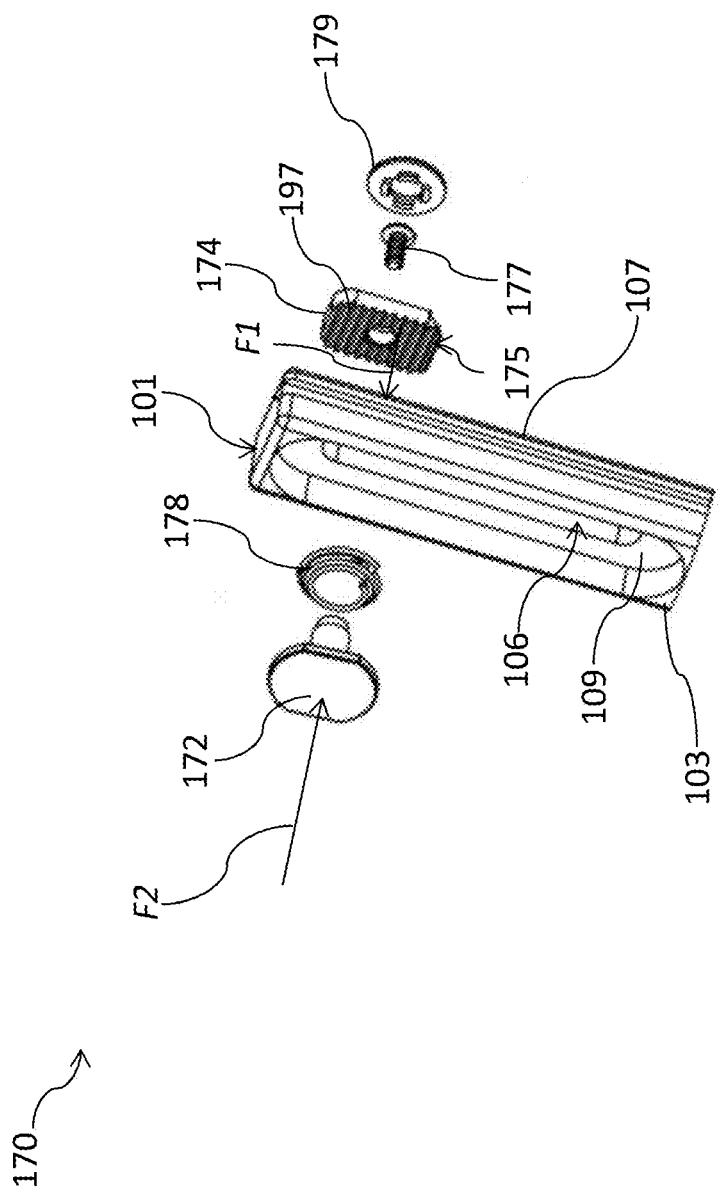
FIG. 9 illustrates an exploded view of an embodiment of a lock assembly of the security apparatus.

The arms 120 may further be coupled to the first and second support members 101, 110 using one or more lock assemblies 170 (FIGS. 2b, 4, and 9). Each lock assembly 170 is configured to restrain or prevent the sliding movement of the arm 120 in one direction when in a locked position and allow the arm 120 to slide freely along the first and second support member 101, 110 when in an unlocked position.

As shown in FIG. 9, the lock assembly 170 is a push-button assembly, however in other embodiments the lock assembly 170 may not be a push-button assembly. The lock assembly 170 will be described with regards to its interaction with the first support member 101 as shown in FIG. 9, however it will be understood that the lock assembly 170 would also interact in a similar manner with the second support member 110 as it has been described above. As shown in FIGS. 7a-b, and 9, the lock assembly 170 comprises a depression plate 172 coupled to one end of a push rod 177 and a backing 179 that engages an opposing end of the push rod 177. An engagement plate 174 is positioned between the backing 179 and the first support member 101. In an embodiment, the backing 179 and the push rod 177 may be formed as a single component. As shown, the push rod 177 traverses the arm 120 and extends through the elongated opening 106 of the first support member 101. The engagement plate 174 comprises a plurality of lock surface features 175 that are complimentary to the support member surface features 107. As shown, the lock surface features 175 are complimentary teeth 197 that are configured to engage or interact with the teeth 195 on the top surface 102 of the first support member 101. A spring or resilient member 178 may surround part of and/or contact a portion of the depression plate 172 and be positioned between the depression plate 172 and the recess 109 to prevent over-depression of the depression plate. In an embodiment, the resilient member or spring 178 may be housed within the push rod 177. In the resting or decompressed state, the spring 178 may act to exert a force F1 against the depression plate 172, which in turn acts to bring the lock surface features 175 of the engagement plate 174 into engagement with the support member surface features 107 of the second support member 110. When the support member surface features 107 and the lock surface features 175 are engaged, the sliding movement of the arm 120 along the first support member 101 is permitted in a first direction S, but not in a second direction. As shown in FIG. 7b, when the support member surface features 107 and the lock surface features 175 are teeth, the angle β of the teeth 195 allows the arm 120 to slide in a first direction S toward the proximal end 122 when engaged with the complimentary teeth 197, but prevents the arm 120 from sliding in a second direction N toward the distal end 124. Applying a force F2 (FIG. 9) to depress the depression plate 172 results in the disengagement of the lock surface features 175 from the support member surface features 107. This disengagement allows the arm 120 slide freely along the first support member 101 in both the first S and second directions N.

In order to secure a portable electronic device (not shown), such as a laptop computer, the depression plate 172 of each arm 120 is depressed and the arms 120 are moved in a second direction N toward their distal ends 124 (FIG. 4). The portable electronic device (not shown) may be placed onto the security apparatus 100 such that it at least partially contacts the top surfaces 102, 112 of the first support member 101 and the second support member 110, respectively. The arms 120 are slid in a first direction S (FIG. 7b) toward the portable electronic device (not shown) until a portion of the portable electronic device (not shown) is positioned under the lip 134 of each arm 120 and/or the inner side of the distal end surface 133 is proximate to or in contact with the portable electronic device (not shown). The security apparatus 100 containing the portable electronic device is then secured to a display surface (not shown) using one or more anchors 117. As shown, the one or more anchors 117 are threaded bolts or screws that may be secured to the display surface (not shown) using a nut, however in other embodiments the one or more anchors 117 may be any hardware suitable to securely fasten the security apparatus 100 to the display surface (not shown).

When the security apparatus 100 is anchored to the display surface (not shown), the lock assemblies 170, and specifically the depression plates 172 are not accessible and the lock surface features 175 of the engagement plate 174 remain engaged with the support member surface features 107 of the first and second support members 101, 110. In this state, the arms 120 can only be advanced in the first direction S (FIG. 7b) toward the portable electronic device (not shown). When the portable electronic device (not shown) is locked into the security apparatus 100, the restricted movement of the arms 120 and the holders 130, as well as the stop member 140 act to prevent removal of the portable electronic device (not shown) from the security apparatus 100. In order to release the portable electronic device (not shown) from the security apparatus 100, the security apparatus 100 must be detached from the display surface (not shown) so that the push-button assemblies 170 become accessible. The depression plate 172 can then be pushed down by a force F2 to disengage the engagement plate 174 (and thereby, the lock surface features 175) from the support member surface features 107. The arm(s) 120 may then be slid away from the portable electronic device or in the second direction N away from the portable electronic device (not shown). The portable electronic device (not shown) may then be removed and another portable electronic device may be placed in the security apparatus 100. In an embodiment, a wireless charger may be coupled to the top surfaces 102, 112 of the first and second support members 101, 110.

In another embodiment, the stop member 140 may be configured to accept a supplemental security piece comprising one or more additional support members that have similar features to the previously described first and second support members 101, 110. In this embodiment, the security apparatus 100 would be capable is securing the keyboard portion and the display portion of a laptop computer.

Figure 16:
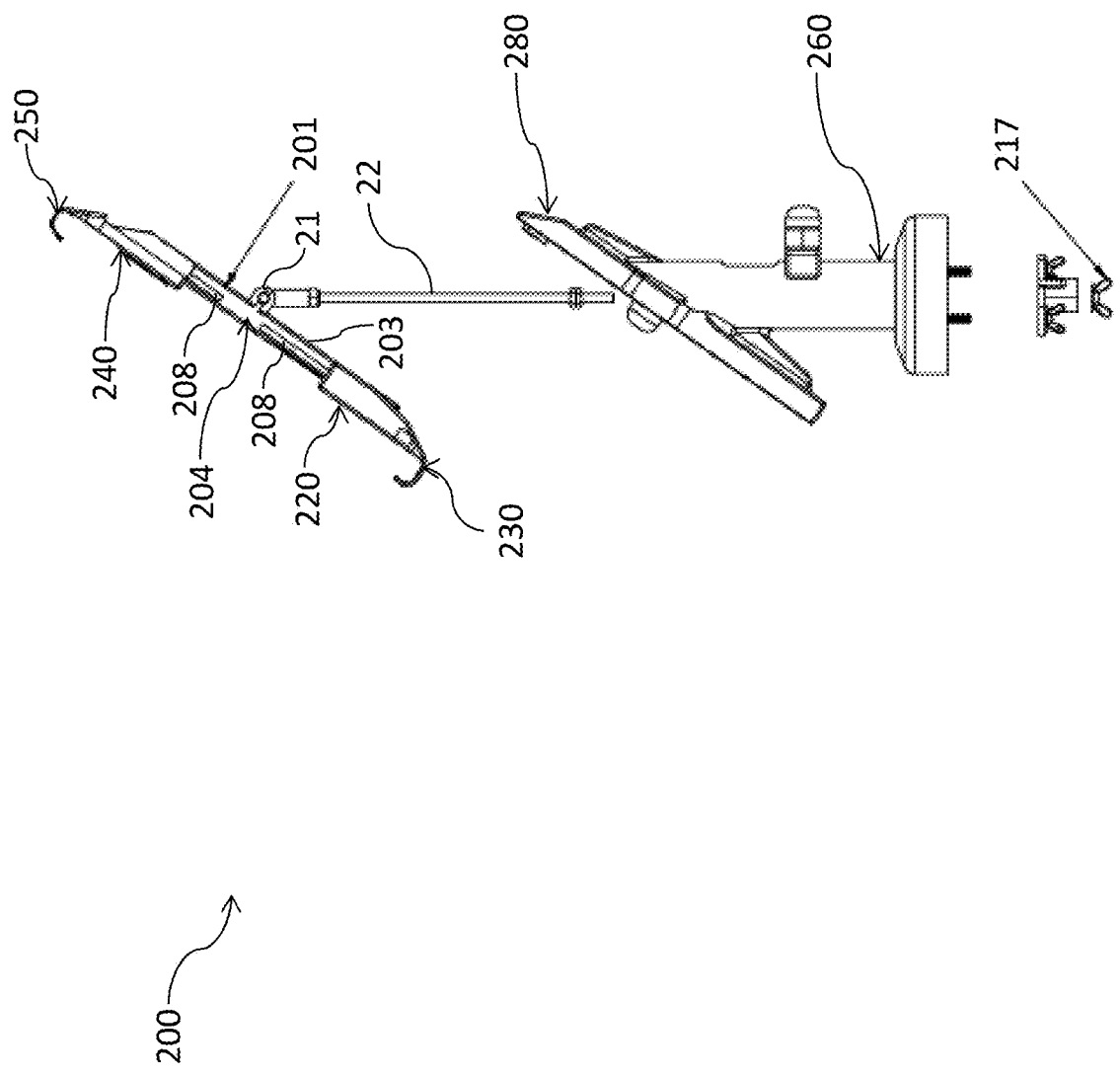
FIG. 16 is a partially exploded view of an embodiment of the security apparatus.

Referring to FIGS. 10-17, another embodiment of the security apparatus 200 comprises a support member 201 coupled to a first arm 220 at one end and a second arm 240 at the opposing end. Similar to the embodiment of the security apparatus 100 previously described, the support member 201 comprises a top surface 202, opposing side surfaces 204, and a bottom surface 203 (FIG. 16). At least one of the opposing side surfaces 204 defines a first engagement structure 223. As shown, the first engagement structure 208 is a channel or recess and the second engagement structure 223 is protrusion, however in other embodiments, the first engagement structure 208 is a protrusion and the second engagement structure 223 is channel or recess. The support member 201 may generally extend from one end to an opposing end along an axis. At least one end of the support member 201 defines a plurality of support member surface features 207 and an elongated opening 206 extending from the top surface 202 of the support member 201 to the bottom surface 203 (FIG. 16). As shown, the support member surface features may be teeth 295 that are configured to function similar to those previously described, however in other embodiments the support member surface features 107 may be any other suitable surface feature such as grooves, ridges, or depressions.

Figure 17:
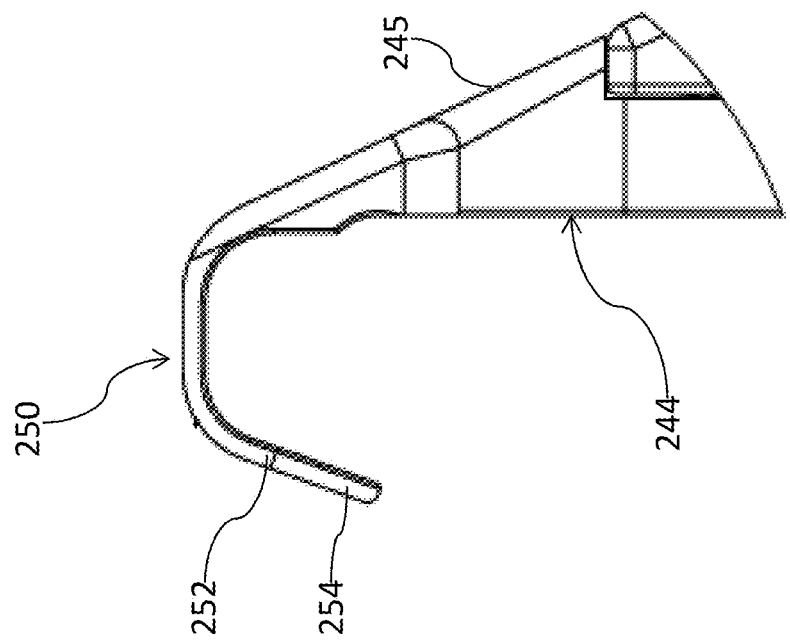
FIG. 17 illustrates a side plan view of an embodiment of a holder of the security apparatus.

The first arm 220 and the second arm 240 generally comprise a top surface 226, 246 and two (2) opposing side surfaces 228, 248 where at least one of the two (2) opposing side surfaces 228, 248 defines a second engagement structure 223 that is configured to slidably engage the first engagement structure 208. The proximal ends 222, 242 of each arm 220, 240 face each other. The distal ends 224, 244 of each of the first arm 220 and the second arm 240 comprise a holder 230, 250. The first holder 230 comprises a distal end surface 233 that extends above the top surface 226 of the first arm 220 and is coupled to a cap 232. The cap 232 extends from the top of the distal end surface 233 towards the proximal end 222 of the arm 220 to form a lip 234. Similarly, and as shown in FIG. 17, the second holder 250 comprises a distal end surface 253 that extends above the top surface 246 of the second arm 240 and is coupled to a cap 252. The cap 252 extends from the top of the distal end surface 253 towards the proximal end 242 of the second arm 240 to form a lip 254. One or more components of the holders 230, 250 may be formed as a single component. As shown, the holder 250 of the second arm 240 extends a greater distance between opposing ends than does the holder 230 of the first arm 220. The first arm 220 and the second arm 240 may be open at the bottom such that a cavity is formed that is defined by the inner surfaces of the top surface 226, 246 and the opposing side surfaces 228, 248. The cavity may be configured to at least partially house a portion of the support member 201. The cavity may also serve to decrease the overall weight of the security apparatus 200.

Figure 10:
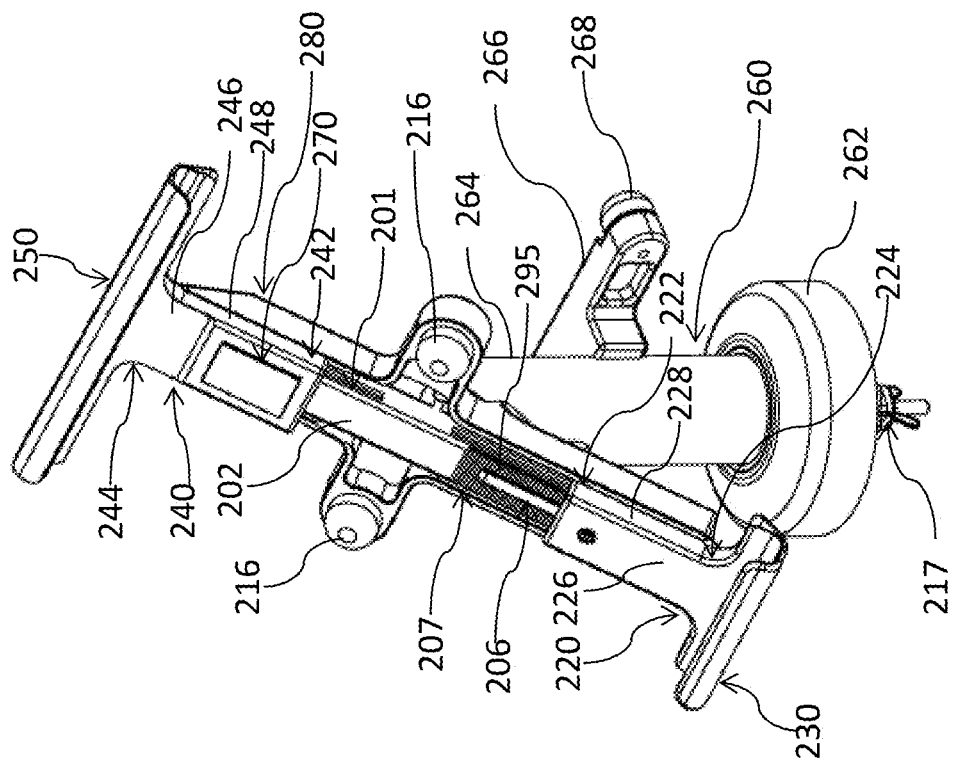
FIG. 10 illustrates a front perspective view of another embodiment of the security apparatus.

Each of the first arm 220 and the second arm 240 is configured to engage and slide along one or more first engagement structures 208 (FIG. 16) that extend along the opposing side surfaces 204 of the support member 201. The first arm 220 may further comprise an end cap 225 configured to limit the retraction of the second arm 220. The second arm 240 may further comprise an end cap 245 configured to limit the retraction of the second arm 240. Similar to the previously disclosed embodiments, at least one arm may further be coupled to the support members 201 using one or more lock assemblies 270. As shown in FIG. 10, the second arm 240 is coupled to the support member 201 via a lock assembly 270. The lock assembly 270 comprises a plurality of lock surface features that are configured to prevent sliding movement of the second arm 240 in the second direction N when in a locked position, and to allow the second arm 240 to slide freely along the support member 201 when in an unlocked position. The lock assembly 270 and the interaction of the lock surface features with the support member surface features 207 operates in a similar manner to the embodiments of the lock assembly previously described.

Referring to FIG. 16, the support member 201 is coupled to a rod 22 at a connection point 21. The support member 201 with the arms 220, 240 coupled to it is seated within a housing 280 that is positioned on a pedestal 260. The pedestal 260 comprises a central bore (not shown) that is configured to accept the rod 22 when the support member 201 is seated in the housing 280. The housing 280 may further comprise one or more stabilizing elements 216 configured to support the portable electronic device being secured in the security apparatus 200. Placing the support member 201 within the housing 280 prevents the unlocking of the locking assembly 270 inaccessible.

Figure 13B:
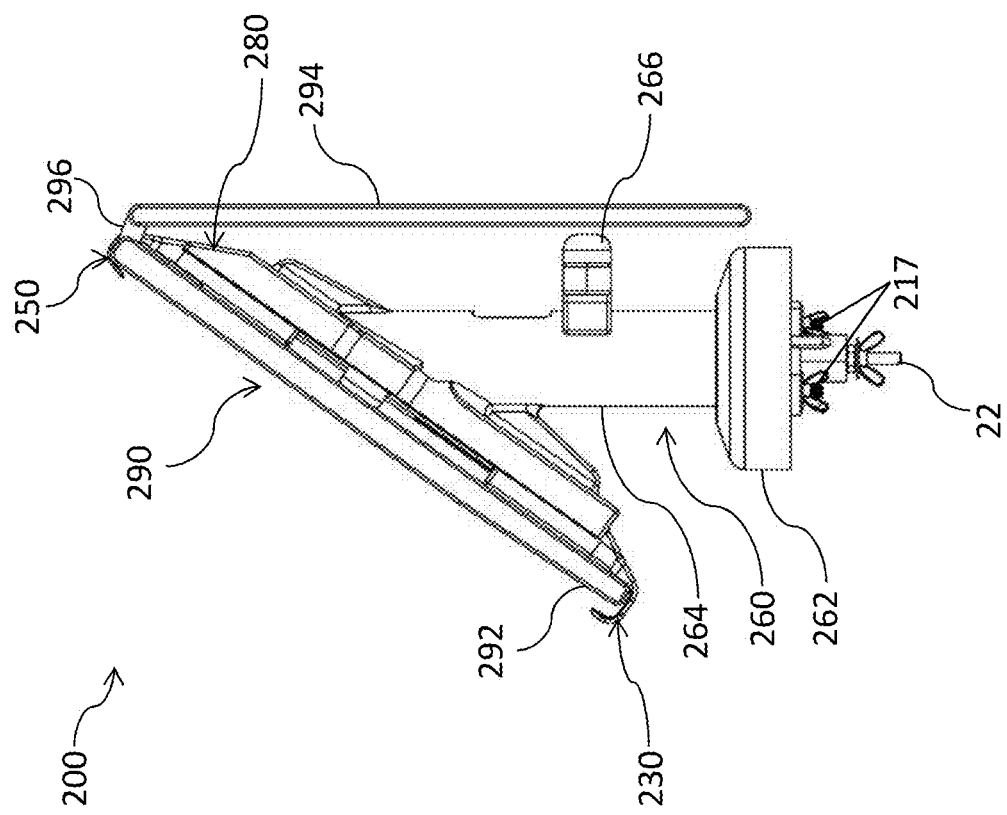
FIG. 13b illustrates a side perspective view of an embodiment of the security apparatus securing a laptop computer in an open position.
Figure 13A:
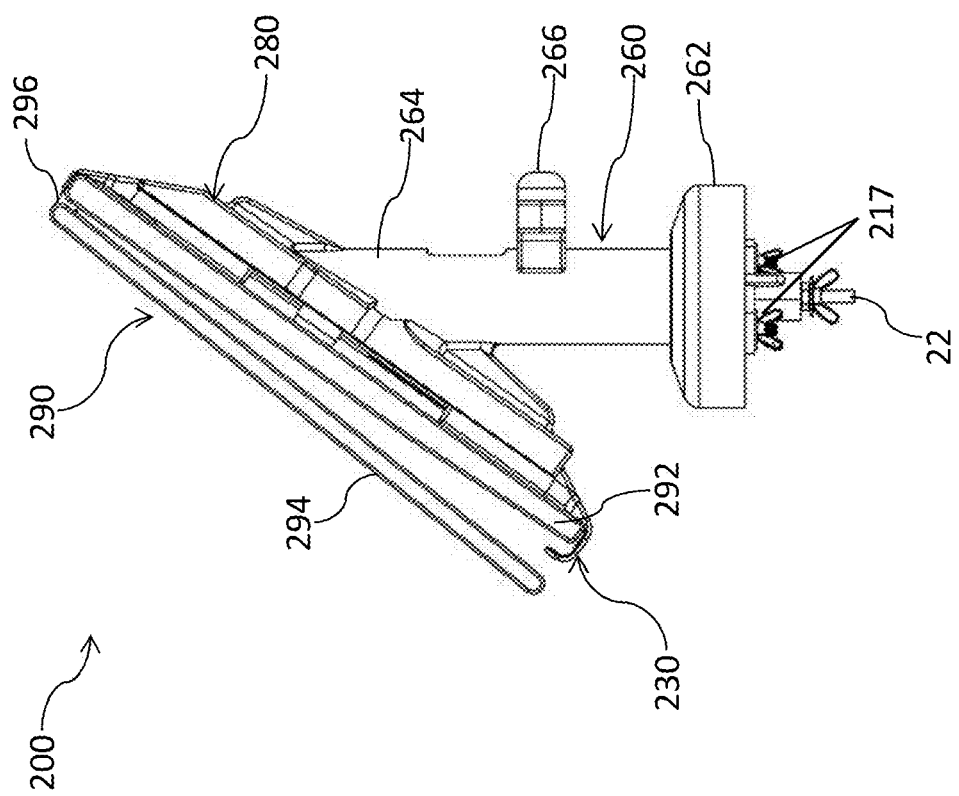
FIG. 13a illustrates a side perspective view of an embodiment of the security apparatus securing a laptop computer in a closed position.
Figure 14:
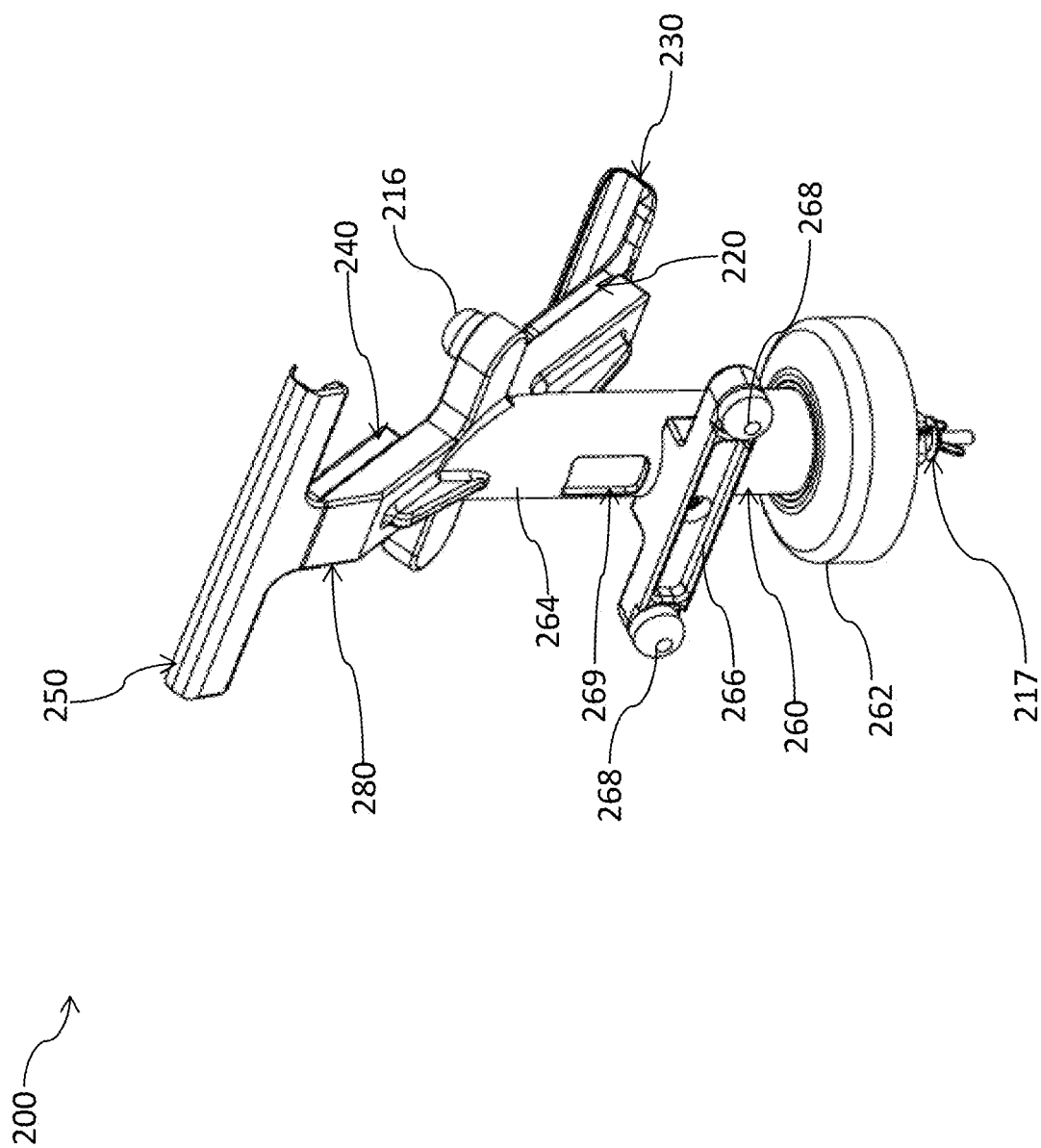
FIG. 14 illustrates a rear perspective view of an embodiment of the security apparatus.
Figure 15:
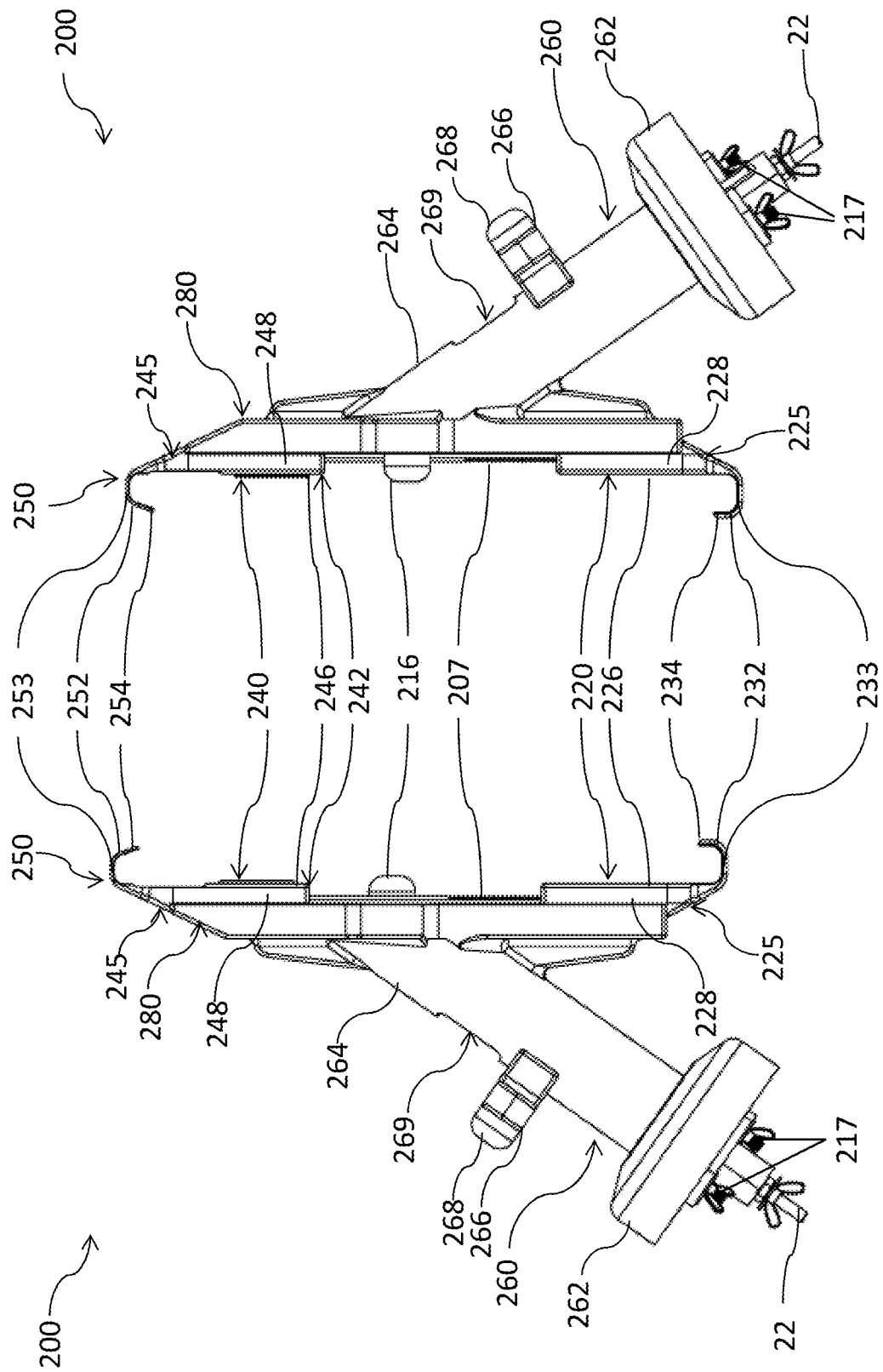
FIG. 15a illustrates a right side plan view of an embodiment of the security apparatus.
FIG. 15b illustrates a left side plan view of an embodiment of the security apparatus.

The pedestal 260 further comprises a base portion 262 (FIGS. 13a-13b) and a stem portion 264 (FIGS. 13a-13b). The stem portion 264 may further comprise one or more additional stabilizing elements 266, 268 (FIGS. 10, 14) and may also define an opening 269 (FIG. 14) configured to provide access to electrical components within the pedestal 260 or an additional locking mechanism. In an embodiment, the housing 280 and the pedestal 260 may be formed as a single component. In another embodiment, the security apparatus 200 may comprise a wireless charger.

In order to assemble the security apparatus 200, the first arm 220 and the second arm 240 are extended along the support member 201 by unlocking the locking assembly 270. The support member 201 is then placed into the housing 280 with the rod 22 extending through the pedestal 260. The security apparatus 200 is then secured to a display surface (not shown) via mounts 217 positioned on the base portion 262 of the pedestal 260. As shown, the mounts 217 are bolts secured with wing nuts. Referring to FIGS. 13a-b and 15a-b, the rod 22 is configured to extend through or traverse the display surface (not shown) and be secured to the underside of the display surface (not shown) so that the support member 201 cannot be separated from the housing 280. The portable electronic device 290 may be placed against the support member 201 and the stabilizing elements 216. Referring to FIGS. 11a-13b, the portable electronic device 290 may be a laptop, The second arm 240 is then pushed towards the portable electronic device 290 in the first direction S (FIG. 7b) until it traps a portion of the portable electronic device 290 under the lip 254 and secures the portable electronic device 290 between the first holder 230 and the second holder 250. As previously described, interaction between the support member surface features 207 and the lock surface features may allow the arms 220, 240 to be slid towards each other a first direction S (FIG. 7b), but prevent them from being able to be moved away from each other in a second direction N (FIG. 7b) as has been previously described. The housing 280 prevents access to the lock assembly 270 such that the portable electronic device 290 is secured in the security apparatus 200. Referring to FIG. 11b, the dimensions of the second holder 250 allow it to engage a keyboard portion 292 of the portable electronic device 290 between a pair of hinges 296 that couple the keyboard portion 292 to the display portion 294. In this manner, the portable electronic device 290 cannot be removed from the security device 200 unless the rod 20 is uncoupled from the display surface (not shown) so that the lock assembly 270 can be unlocked.

Figure 24:
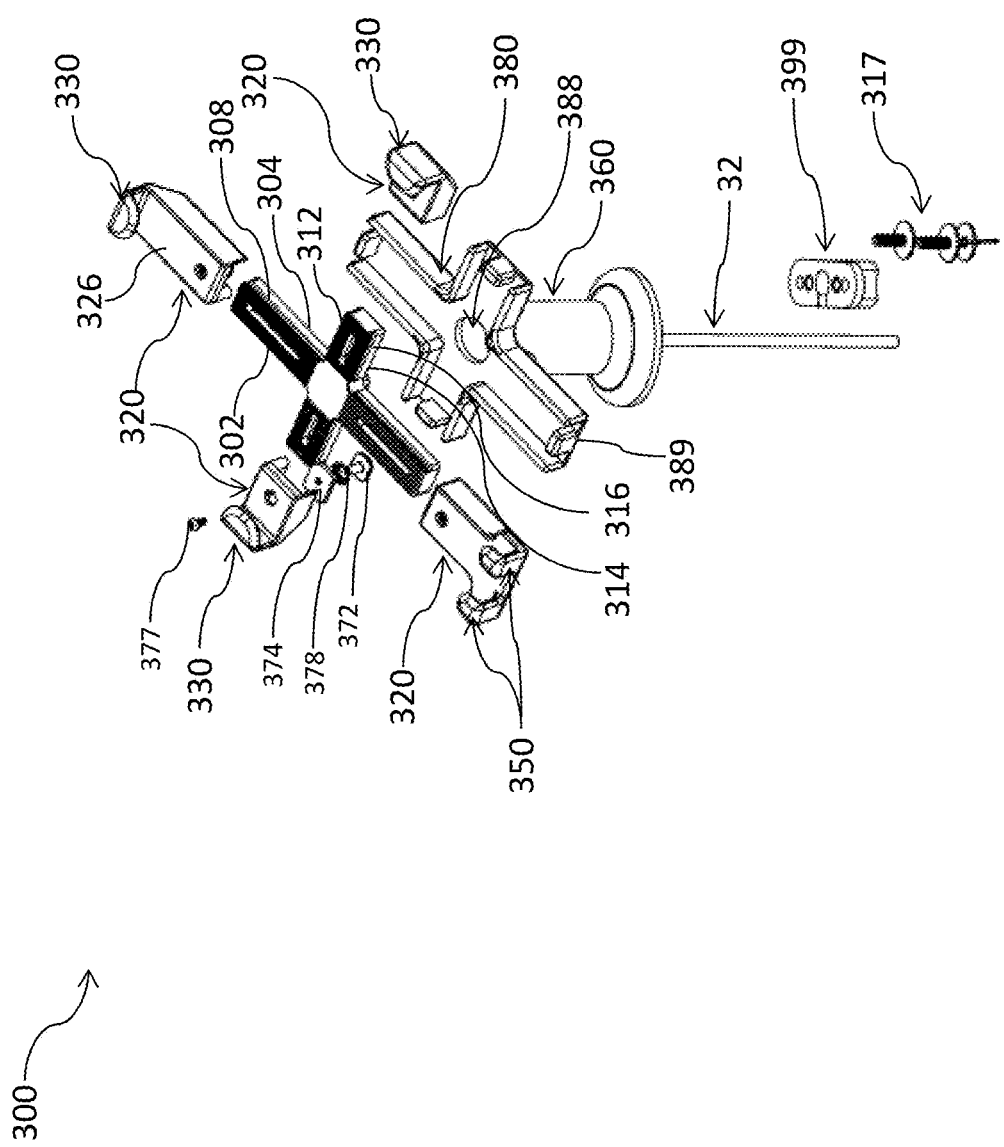
FIG. 24 illustrates an exploded view of an embodiment of the security apparatus.
Figure 25:
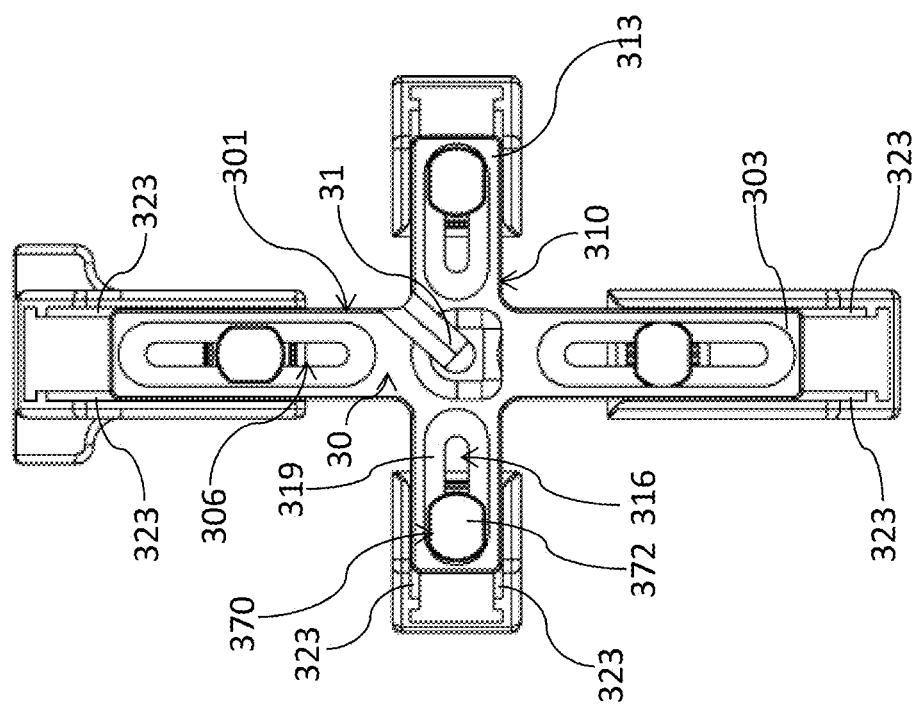
FIG. 25 illustrates a bottom plan view of a portion of an embodiment of the security apparatus showing a bottom side of the lock assemblies.

In another embodiment shown in FIGS. 18-26, the security apparatus 300 comprises a first support member 301 and a second support member 310. Referring to FIGS. 24-25, the first and second support members 301, 310 comprise a top surface 302, 312, opposing side surfaces 304, 314, and a bottom surface 303, 313. The top surface 302, 312 of the first support member 301 and the second support member 310 define a plurality of support member surface features 307 and two (2) elongated openings 306, 316 extending from the top surface 302, 312 to the bottom surface 303, 313 of the first and second support members 301, 310. As shown, the support member surface features are teeth 395 that are configured and function similar to those previously described in other embodiments. Similar to the embodiments previously described, the opposing side surfaces 304, 314 of the first and second support members 301, 310 define a first engagement structure 308, 318.

Figure 20:
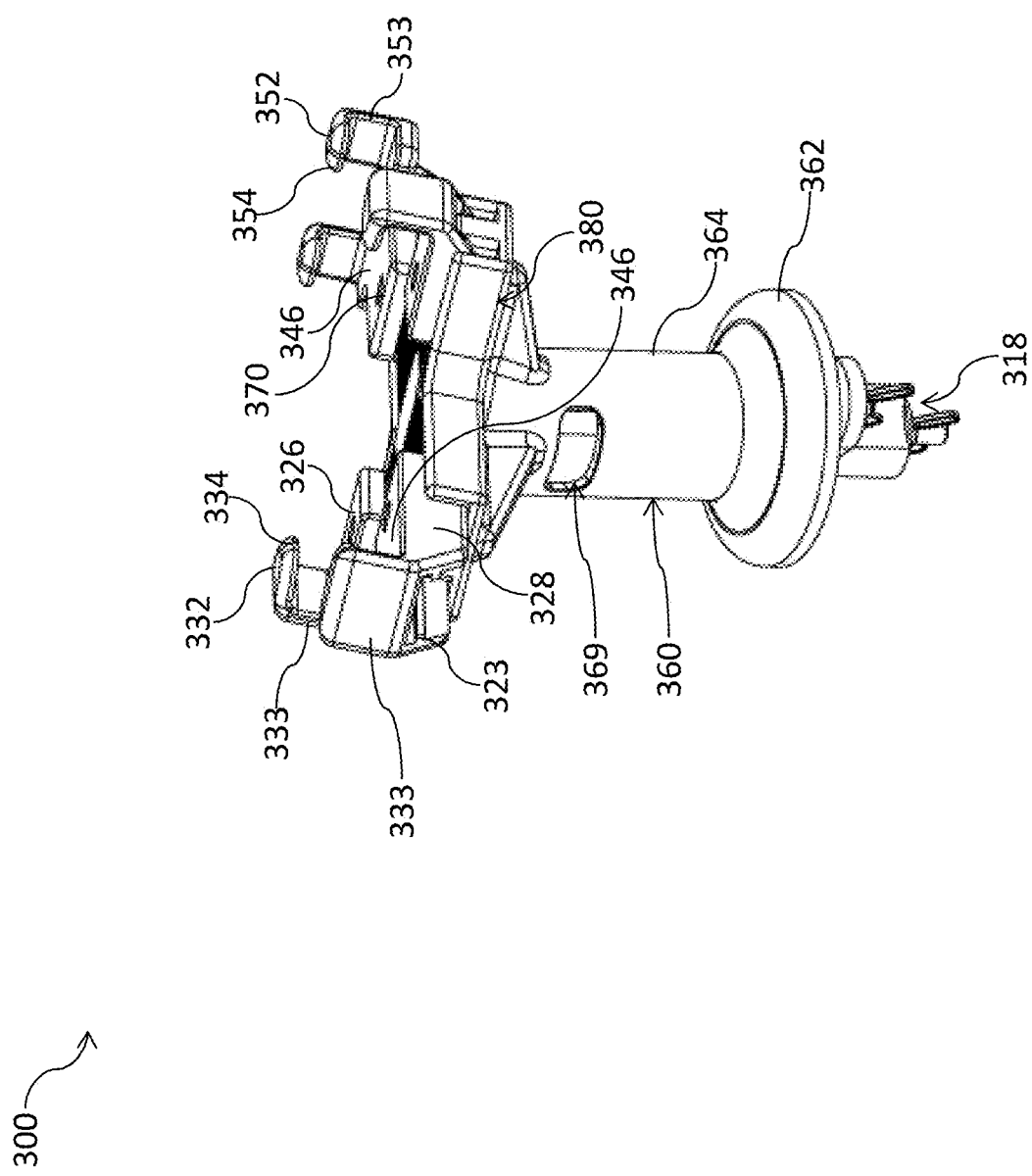
FIG. 20 illustrates a rear perspective view of an embodiment of the security apparatus.
Figure 21:
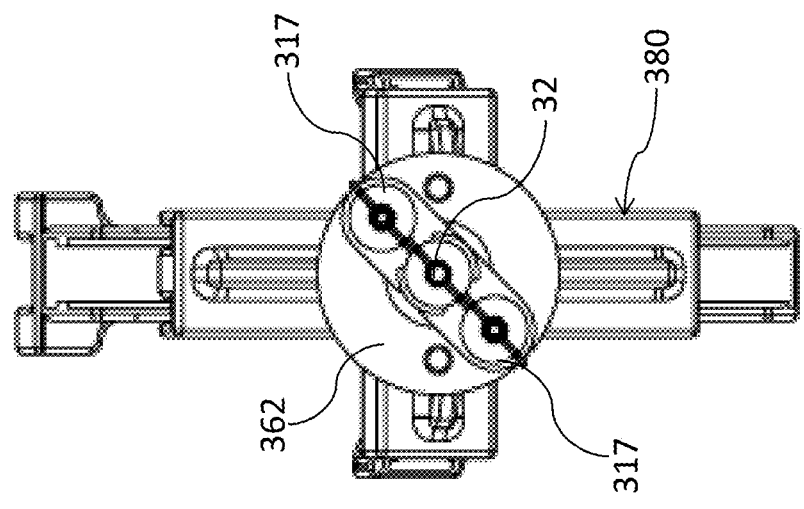
FIG. 21 illustrates a bottom plan view of an embodiment of the security apparatus.
Figure 22:
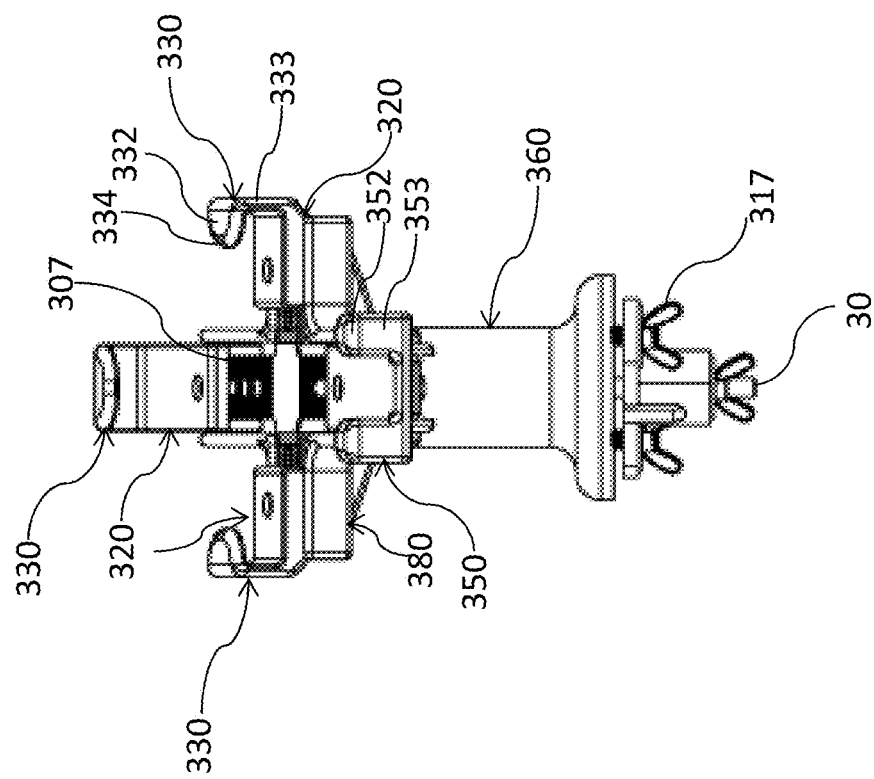
FIG. 22 illustrates a front perspective view of an embodiment of the security apparatus.
Figure 23:
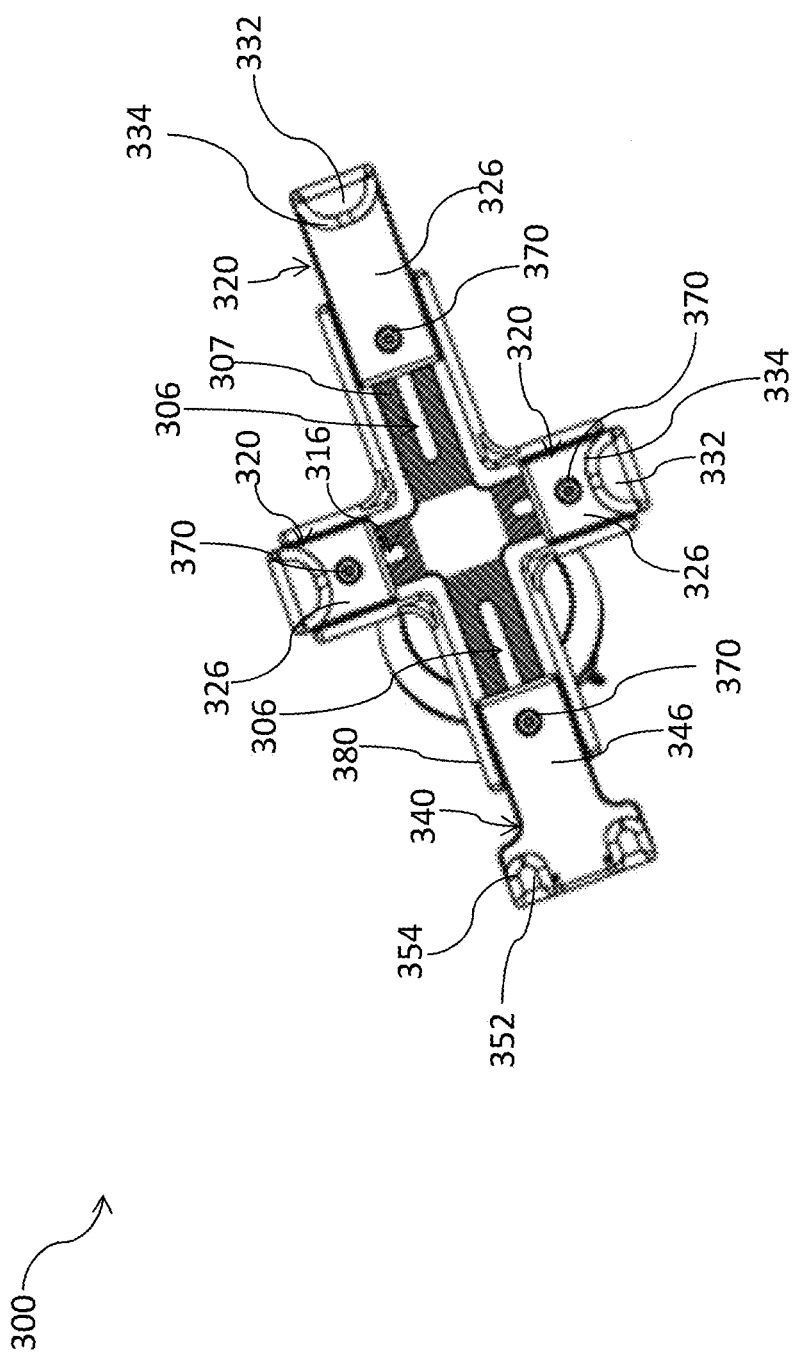
FIG. 23 illustrates a top plan view of an embodiment of the security apparatus.
Figure 26:
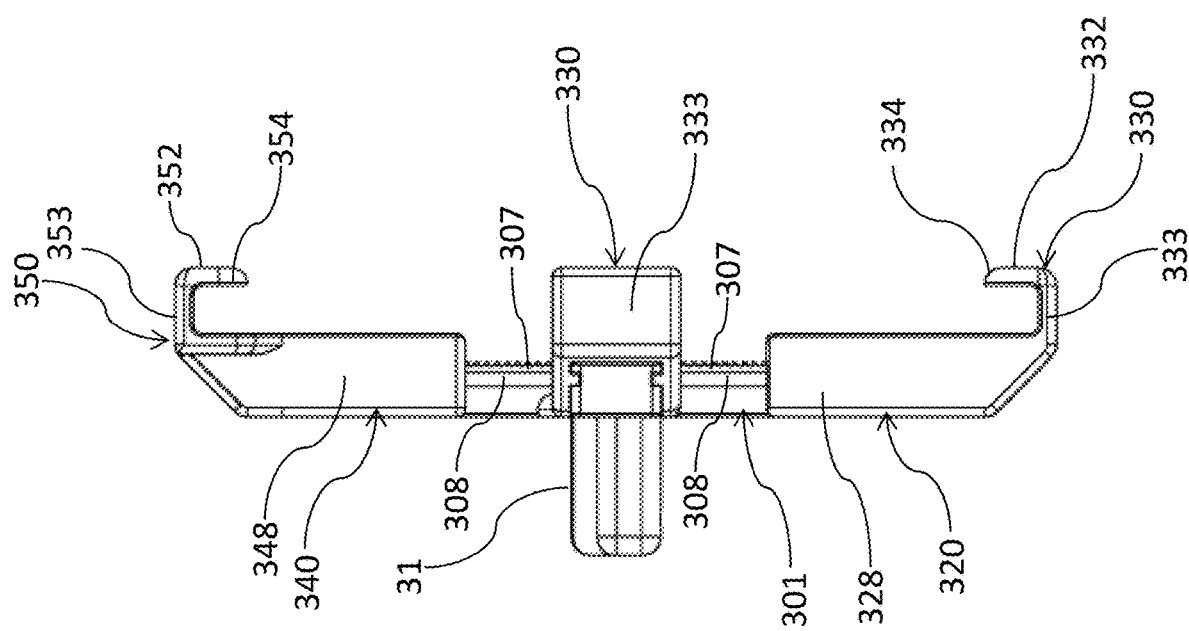
FIG. 26 illustrates a right side plan view of an embodiment of the security apparatus.

As shown, the first support member 301 is coupled to an arm 320 at one end and a split arm 340 at an opposing end. The second support member 310 is coupled to an arm 320 at each end. As shown specifically in FIG. 19, the arms 320 may be of a different size, however their configuration is otherwise identical. The arms 320 and the split arm 340 generally comprise a top surface 326, 346 and two (2) opposing side surfaces 328, 348. Referring to FIG. 20, the opposing side surfaces 328 of the arm 320 further define a second engagement structure 323. As shown, the first engagement structure 308, 318 is a channel or recess and the second engagement structure 323 is protrusion, however in other embodiments, the first engagement structure 308, 318 is a protrusion and the second engagement structure 323 is channel or recess. It will be understood that one or more of the other arms 320 and the split arm 340 may also comprise a similar second engagement structure 323. The distal ends of each arm 320, 340 comprise a holder 330, 350. Referring specifically to FIG. 26, the holders 330, 350 comprise a distal end surface 333, 353 that extends above the top surface 326, 346 of the arm 320, 340 and is coupled to a cap 332, 352. The cap 332, 352 extends from the top of the distal end surface 333, 353 towards the opposing end of the arm 320, 340 to form a lip 334, 354. As shown in FIGS. 18-19 and 22-24, the split arm 340 comprises two identical holders 350. The arms 320 and the split arm 340 may be open at the bottom such that a cavity is formed that is defined by the inner surfaces of the top surface 326, 346 and the opposing side surfaces 328, 348. The cavity may be configured to at least partially house a portion of the first and second support members 301, 310, respectively. The cavity may also serve to decrease the overall weight of the security apparatus 300.

The second engagement structure 323 of each arm 320, 340 is configured to engage and slide along the first engagement structures 308, 318 that extend along the opposing side surfaces 304, 314 of the first and second support members 301, 310. Similar to the previous embodiments described and as shown in FIGS. 24-25 the arms 320 and the split arm 340 may further be coupled to their corresponding support member using one or more lock assemblies 370. Still referring to FIGS. 24-25, the lock assembly 370 is a push-button assembly, however in other embodiments, the lock assembly 370 may not be a push-button assembly. The lock assembly 370 operates in a similar manner to previously described embodiments of a lock assembly. The lock assembly 370 will be additionally described with regards to its interaction with the second support member 310 as shown in FIGS. 24-25, however it will be understood that the lock assembly 370 would also interact in a similar manner with the first support member 301.

The lock assembly 370 comprises a depression plate 372 and an engagement plate 374. A push rod 377 is coupled to the depression plate 372 at one end and the engagement plate 374 is positioned between the push rod 377 and the second support member 310. As shown, the push rod 377 traverses the arm 320 and extends through the opening 316 of the second support member 310. The engagement plate 374 comprises a plurality of lock surface features that are complimentary to the support member surface features 307. The lock surface features are configured to engage with the support member surface features 307 on the top surface 312 of the second support member 310. A spring or resilient member 378 may surround part or and/or contact a portion of the depression plate 372 and be positioned between the depression plate 372 and the recess 319 to prevent over-depression of the depression plate 372. As described, the lock assembly 370 functions in a manner similar to that of the previously discussed embodiments (100, 200). When support member surface features 307 and the lock surface features are engaged, the sliding movement of the arm 320 with respect to the second support member 310 is permitted in the first direction S (FIG. 7b), but not in the second direction N (FIG. 7b).

Figure 18:
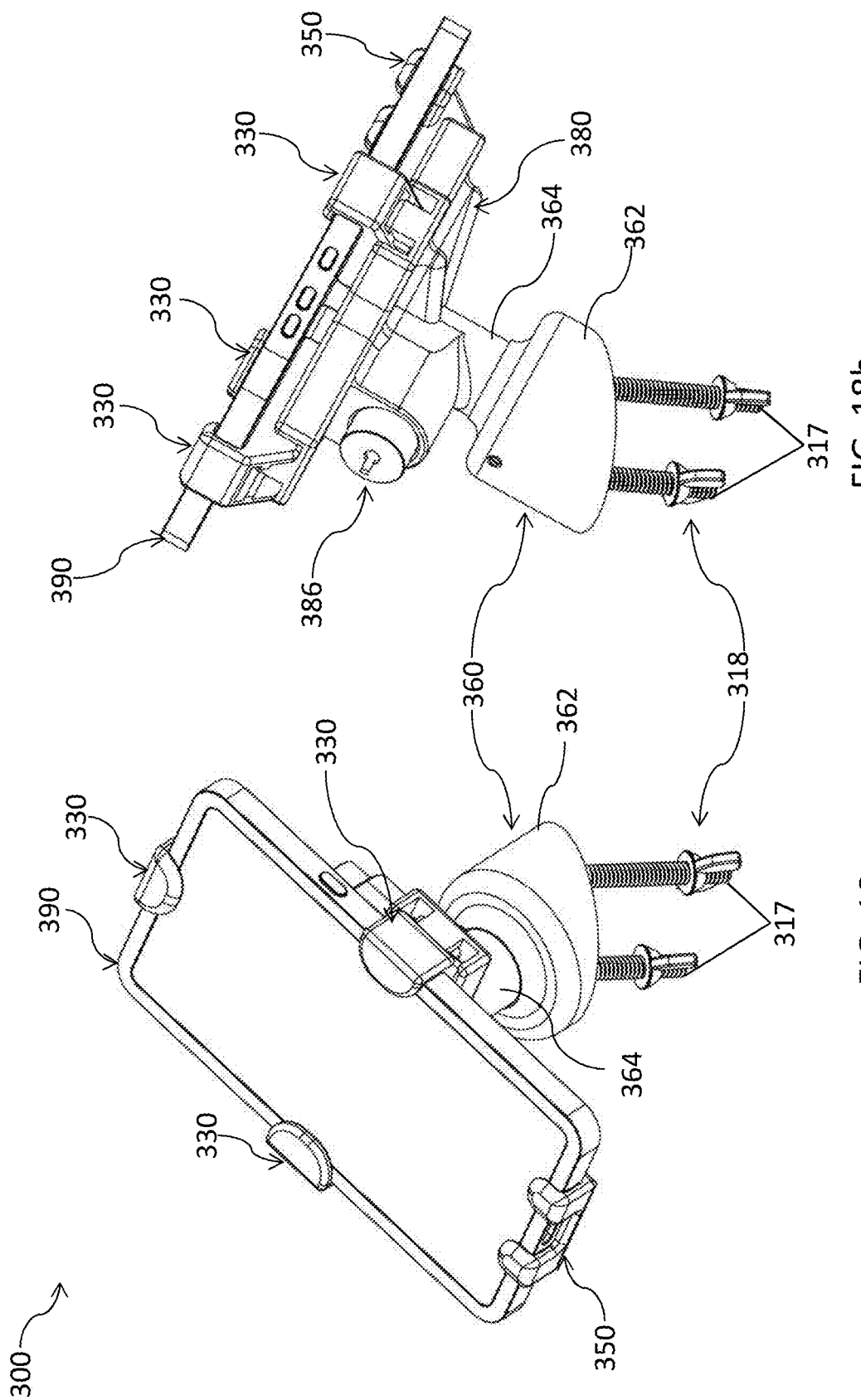
FIG. 18a illustrates a front perspective view of an embodiment of the security apparatus securing a Smart Phone.
FIG. 18b illustrates a rear perspective view of an embodiment of the security apparatus securing a Smart Phone.
Figure 19:
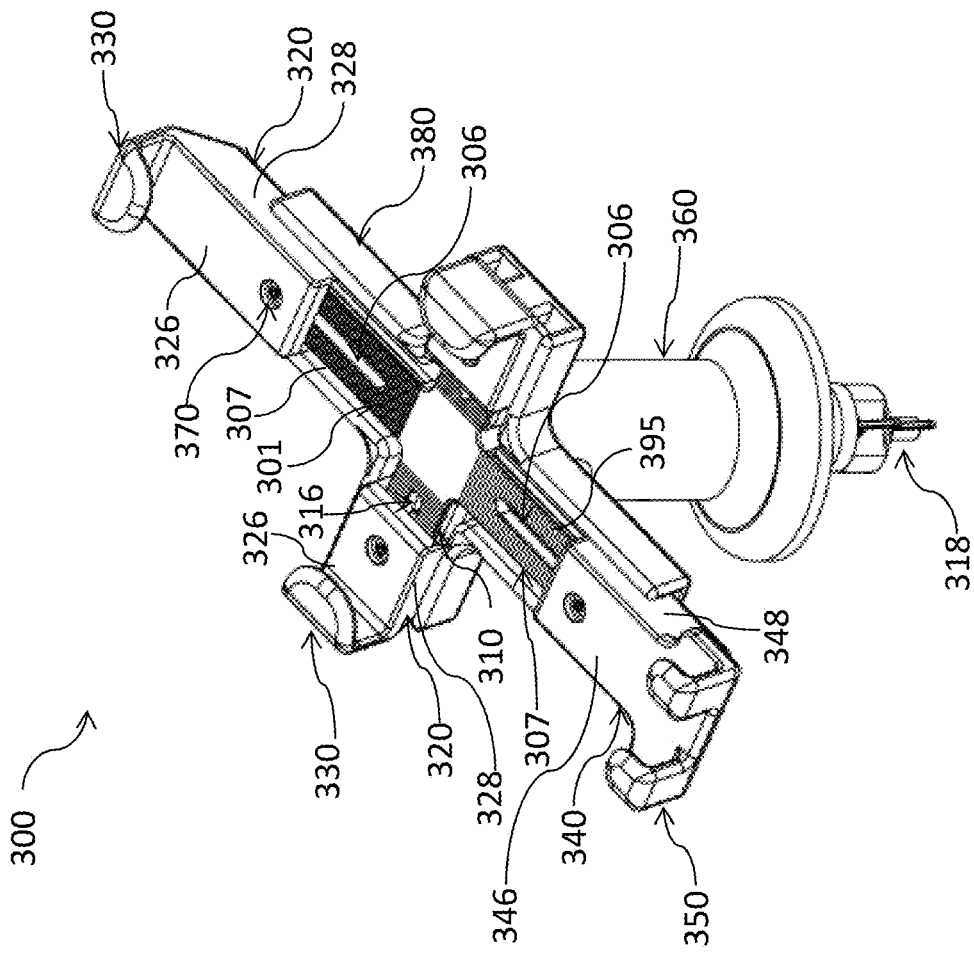
FIG. 19 illustrates a front perspective view of another embodiment of the security apparatus.

Still referring specifically to FIGS. 24-25, the first support member 301 and the second support member 310 are coupled together at area 30. A rod 32 is coupled to area 30 at a connection point 31. In an embodiment, the first and second support members 301, 310 may be formed as a single component. As shown specifically in FIGS. 18-19 and 24, the first and second support members 301, 310 are coupled to the arms 320 and the split arm 340 and seated or positioned within a housing 380. The housing 380 is further positioned on a pedestal 360 and is configured to obscure or otherwise make inaccessible the depression plates 372 of the locking assembly 370. The pedestal 360 comprises a central bore 388 that is configured to accept the rod 32 when the first and second support members 301, 310 are seated in the housing 380. The housing 380 further comprises one or more security tabs 389 configured to further prevent access to the components of the locking assemblies 370 while the first and second support members 301, 310 are positioned within the housing 380. Referring to FIG. 20, the pedestal 360 further comprises a base portion 362 and a stem portion 364. The stem portion 364 may further define an opening 369 configured to provide access to electrical components within the pedestal or an additional locking mechanism 386 (FIG. 18). The housing 380 and the pedestal 360 may be formed as a single unitary component. In and embodiment, the security apparatus 300 may further comprise a wireless charger.

In order to assemble the security apparatus 300, the arms 320 and the split arm 340 are fully extended along the first and second support members 301, 310 by depressing or pressing down on the depression plate 372 of each lock assembly 370. The first and second support members 301, 310 are placed into the housing with the rod 32 extending through the central bore 388 of the pedestal 360. The security apparatus 300 is then secured to a display surface (not shown) via mounts 317 positioned on a bracket 399 (FIG. 24) positioned within the base portion 362 of the pedestal 360. As shown, the mounts 317 are bolts secured with wing nuts. The rod 32 is configured to extend through or traverse the display surface (not shown) and be secured on the underside of the display surface (not shown) so that the first and second support members 301, 310 cannot be separated from the housing 380.

The portable electronic device 390 may be placed against the first and second support members 301, 310. Referring to FIGS. 18*a*-18*b*, the portable electronic device 390 is a Smart Phone, such as an iPhone® The arms 320 and the split arm 340 are then pushed towards the portable electronic device 390 until they trap a portion of the portable electronic device 390 under each holder lip 334, 354. As described in other embodiments, the configuration of the support member surface features 307 on the first and second support members 301, 310 and the lock surface features the lock assembly 370 allow the arms 320, and the split arm 340 to slide towards each other in the first direction S (FIG. 7*b*), but prevent them from being moved away from each other in the second direction N (FIG. 7*b*) unless the depression plate 372 is depressed. The housing 380 prevents access to the depression plates 372 of the lock assembly 370 such that the portable electronic device 390 is secured in the security apparatus 300. In this manner, the portable electronic device 390 cannot be removed from the security apparatus 300 unless the rod 32 is uncoupled from the display surface (not shown) so that the depression plates 372 of the lock assembly 370 can be accessed. In other embodiments, it is possible that only the arms 320 are configured to slide along the first and second support members 301, 310 while the split arm 340 remains in a fixed position. In still another embodiment, a split arm 340 may not be included and all four (4) of the arms 320 may be identical.

Referring to FIGS. 27-32, another embodiment of the security apparatus 400 generally comprises a first support member 401 and a second support member 410. The first and second support members 401, 410 each extend along an axis and are fastened together using one or more fasteners 411 such that the axes intersect each other at an angle that may be about 90°. In other embodiments, the security apparatus 400 may comprise additional support members depending on the portable electronic device being secured. The first support member 401 may further comprise a notch 405 (FIG. 32) or other feature that is configured to engage the second support member 410 in order to add additional strength at their junction.

Figure 28:
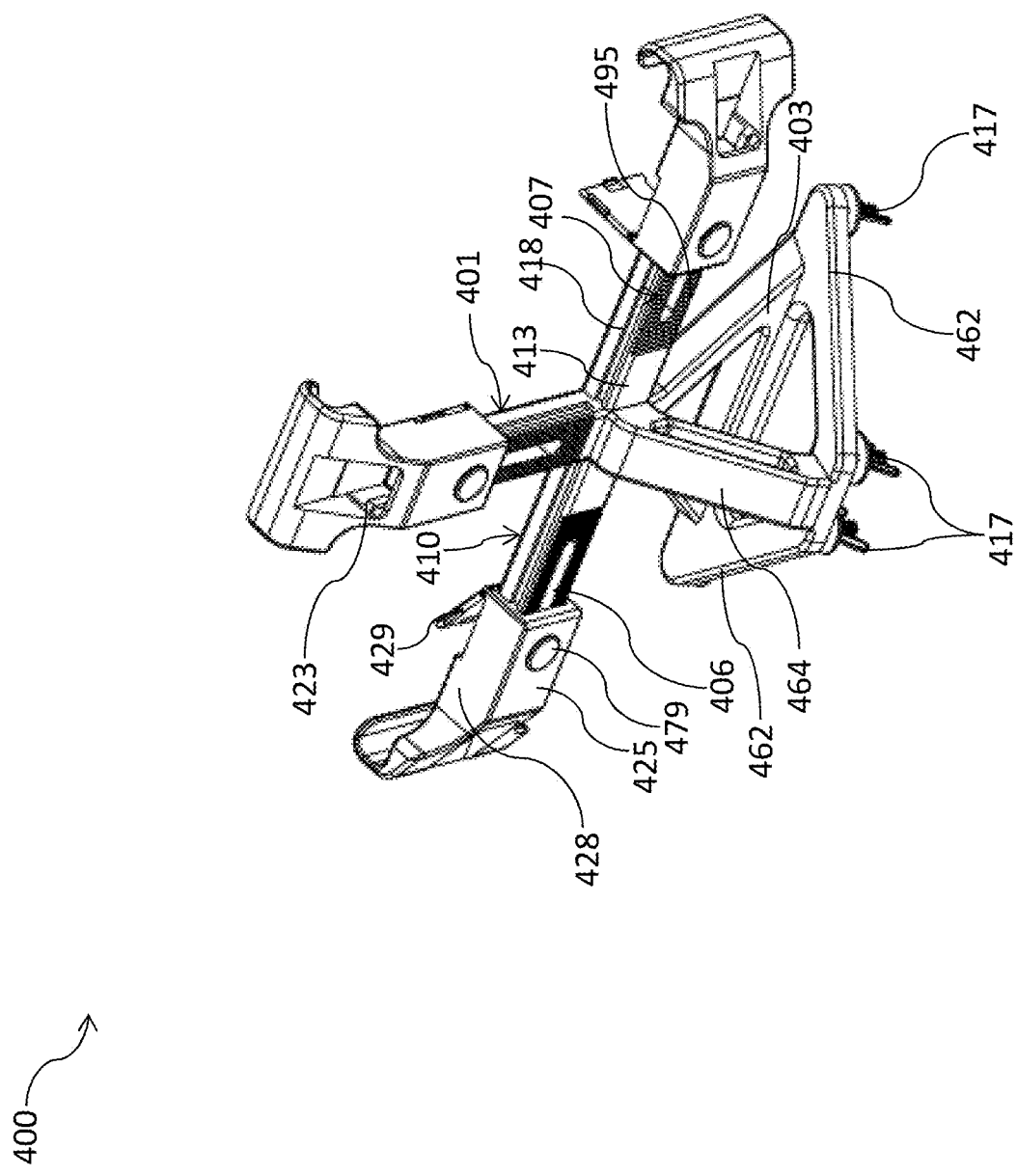
FIG. 28 illustrates a rear perspective view of an embodiment of the security apparatus.
Figure 29:
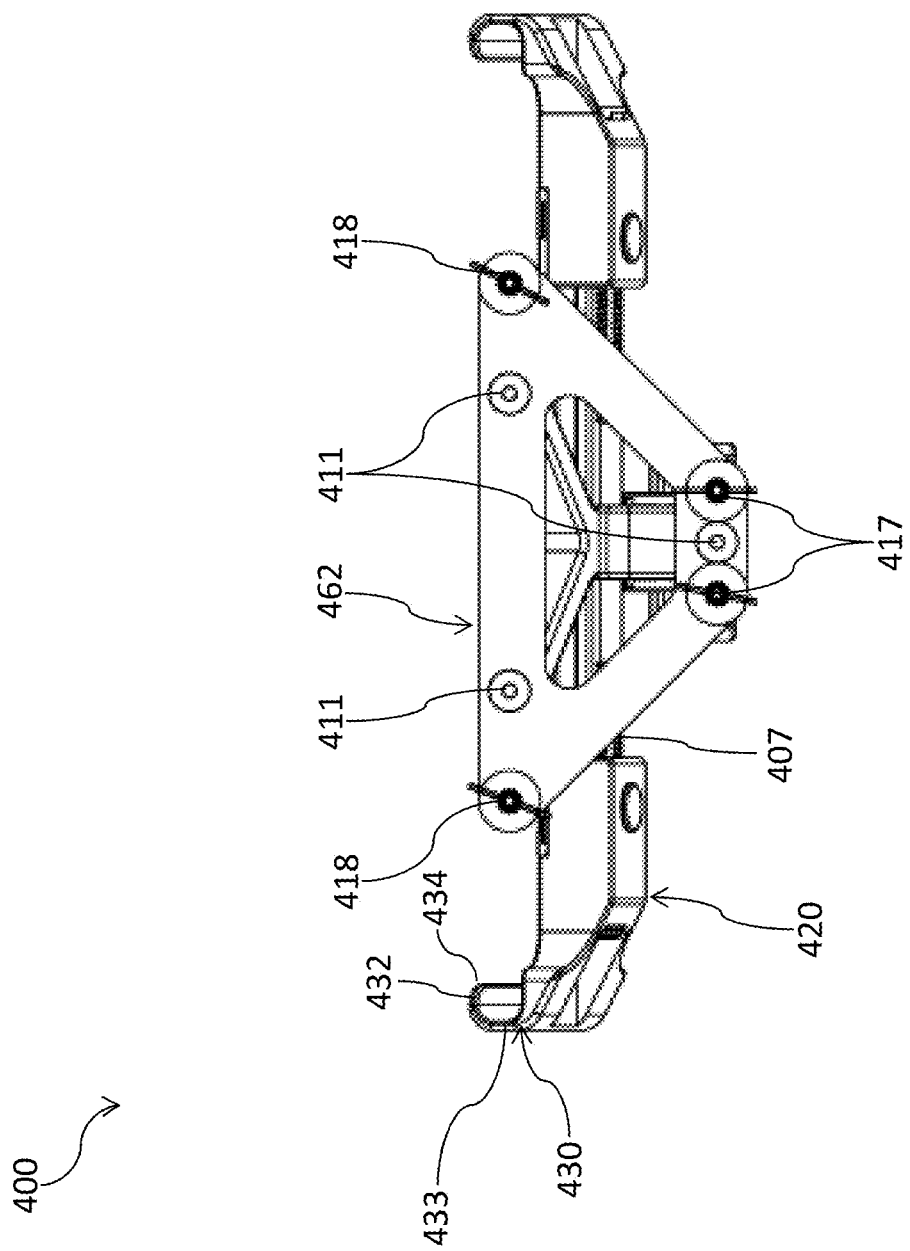
FIG. 29 illustrates a bottom plan view of an embodiment of the security apparatus.

As shown, the first and second support members 401, 410 comprise a top surface 402, 412, a bottom or rear surface 403, 413 (FIG. 28), and opposing side surfaces 404, 414. The opposing side surfaces 404, 414 further comprise a first engagement structure 408, 418 that extends or at least partially along a length of the opposing side surfaces 404, 414. Referring to FIG. 28, the rear surfaces 403, 413 of the first and second support members 401, 410 define a plurality of support member surface features 495 and one or more elongated openings 406, 416 that extend from the rear surface 403, 413 to the top surface 402, 412. As shown, and described further below, the plurality of support member surface features 407 are a plurality of teeth similar to those described in previous embodiments, however in other embodiments the plurality of support member surface features may be ridges, depressions, grooves, or any other suitable surface feature. A depression or recess 409, 419 is defined around the perimeter of each elongated opening 406, 416 on the top surface 402, 412 of the first and second support members 401, 410. One end of the first support member 401 is coupled to an arm 420 and the opposing end is coupled to the base 462. A brace 464 extends between the base 462 and the intersection of the first and second support members 401, 410 to provide further support to the security apparatus 400. The second support member 410 is coupled to two (2) arms 420, each positioned at opposing ends of the second support member 410. As shown, the arms 420 are identical, however in other embodiments, the arms 420 may not be identical and may be configured to secure a specific object or portable electronic device.

Figure 30:
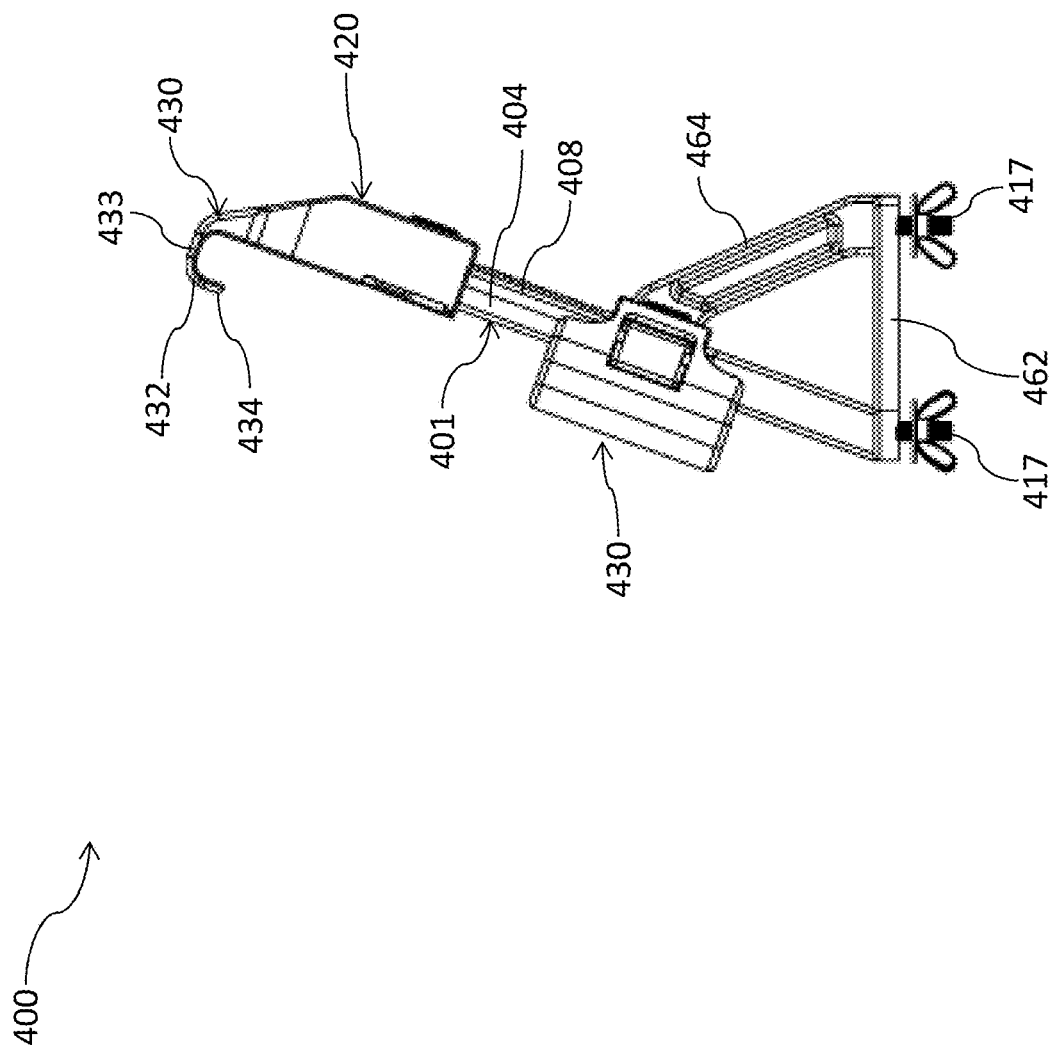
FIG. 30 illustrates a left side plan view of an embodiment of the security apparatus.
Figure 31A:
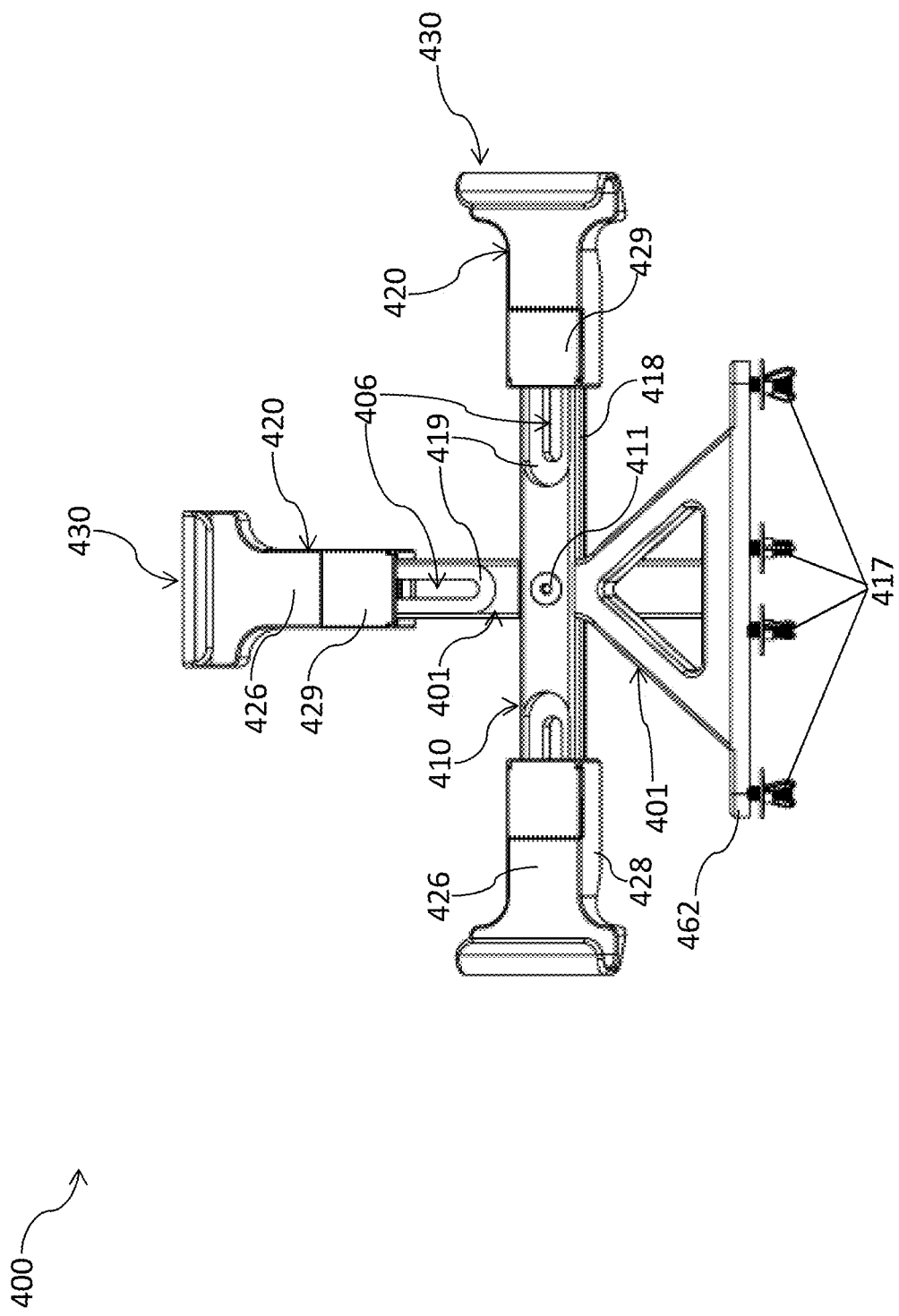
FIG. 31a illustrates a front plan view of an embodiment of the security apparatus.

As shown specifically in FIGS. 28 and 31, each arm 420 generally comprises a top surface 426, two (2) opposing side surfaces 428, and a rear surface 425. The distal end of each arm 420 comprises a holder 430. Referring to FIG. 30, the holder 430 comprises a distal end surface 433 that extends above the top surface 426 of the arm 420 and is coupled to a cap 432. The cap 432 extends from the top of the distal end surface 433 towards the opposing end of the arm 420 to form a lip 434. As shown, the top surface 426, side surfaces 428, and rear surface 425 of each arm 420 define an inner cavity and the interior surface of the opposing sides 428 further defines a second engagement structure 423 (FIG. 32). As shown, the first engagement structure 408, 418 is a channel or recess and the second engagement structure 423 is protrusion, however in other embodiments, the first engagement structure 408, 418 is a protrusion and the second engagement structure 423 is channel or recess. The second engagement structure 423 is configured to fit at least partially within the first engagement structure 408, 418 of the first and second support member 401, 410. Accordingly, the cavity is configured to at least partially house a portion of one of the first or the second support members 401, 410.

Figure 27:
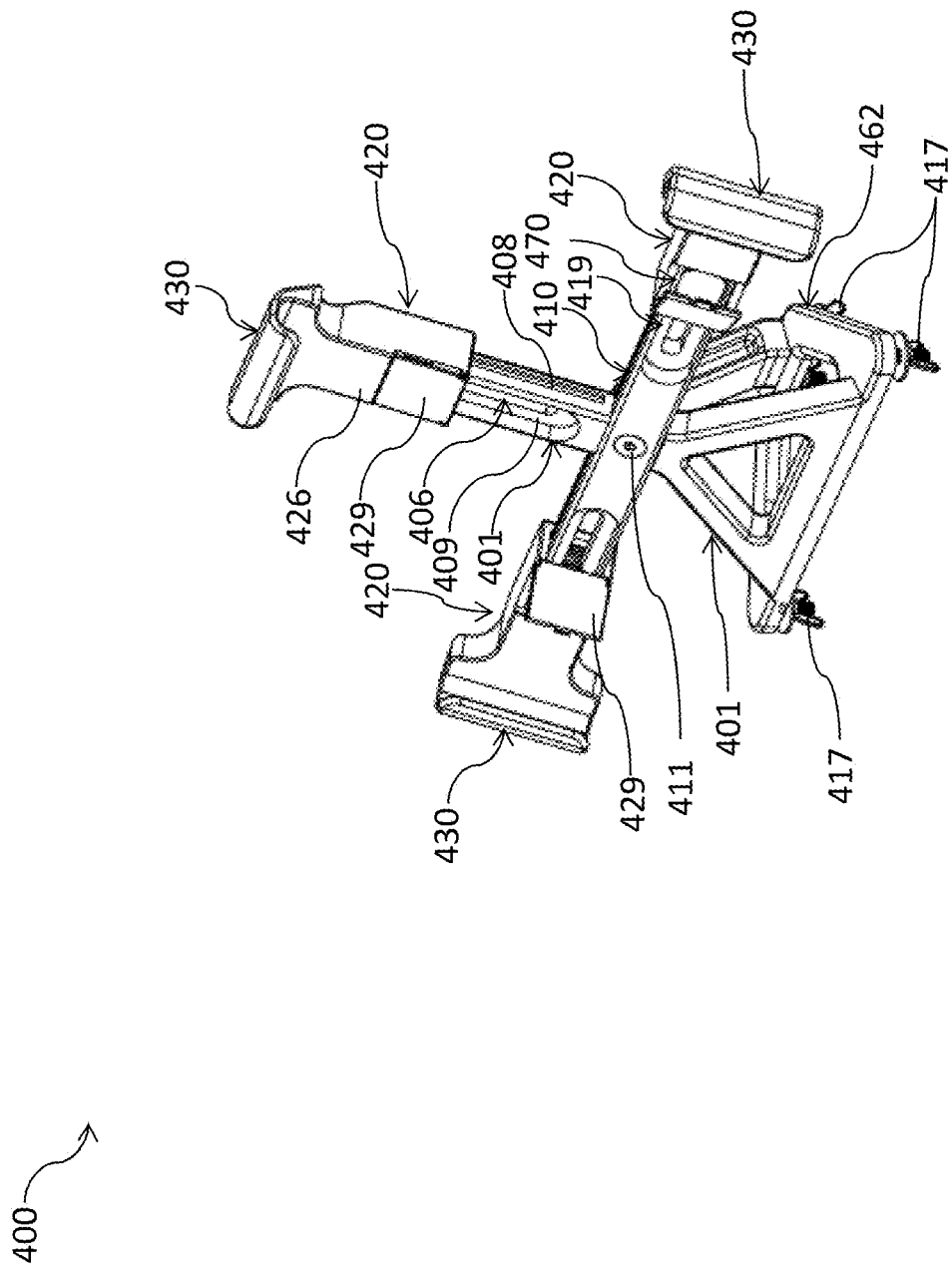
FIG. 27 illustrates a front perspective view of another embodiment of the security apparatus.
Figure 31B:
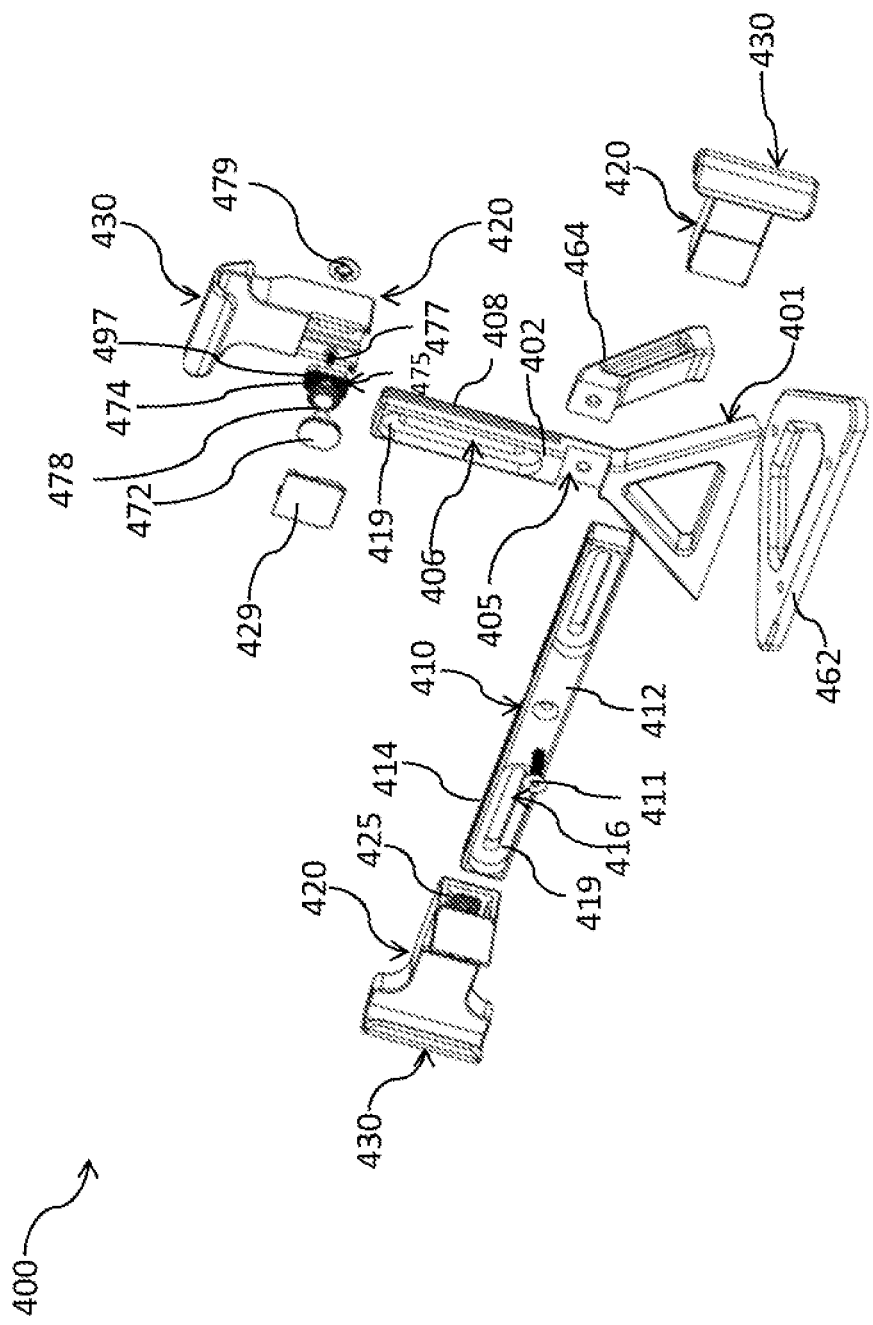
FIG. 31b illustrates an exploded view of an embodiment of the security apparatus.
Figure 32A:
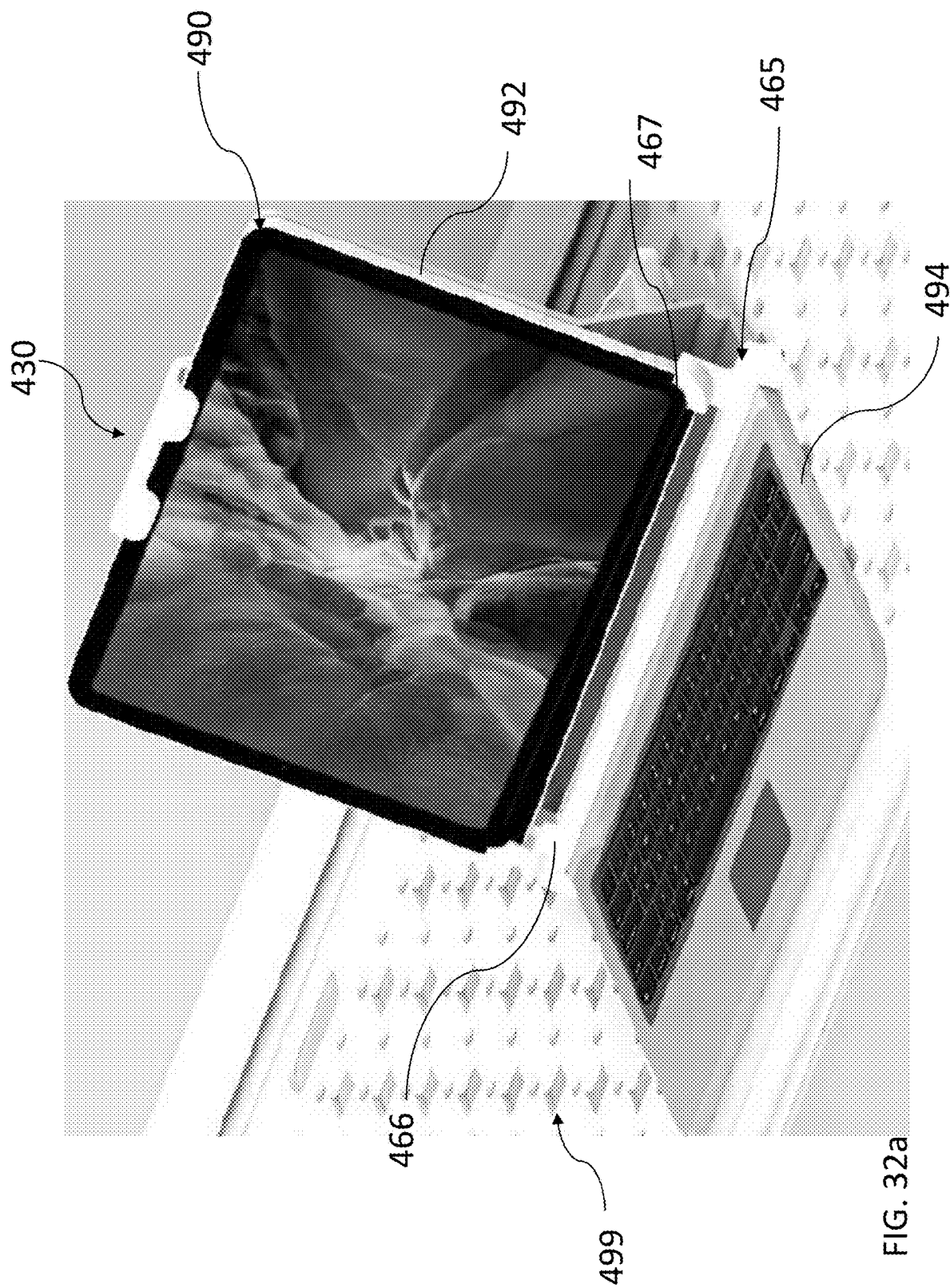
FIG. 32a illustrates a front perspective view of another embodiment of the security apparatus of FIG. 27 including a keyboard bar and securing a portable electronic device.
Figure 32B:
Figure 32D:
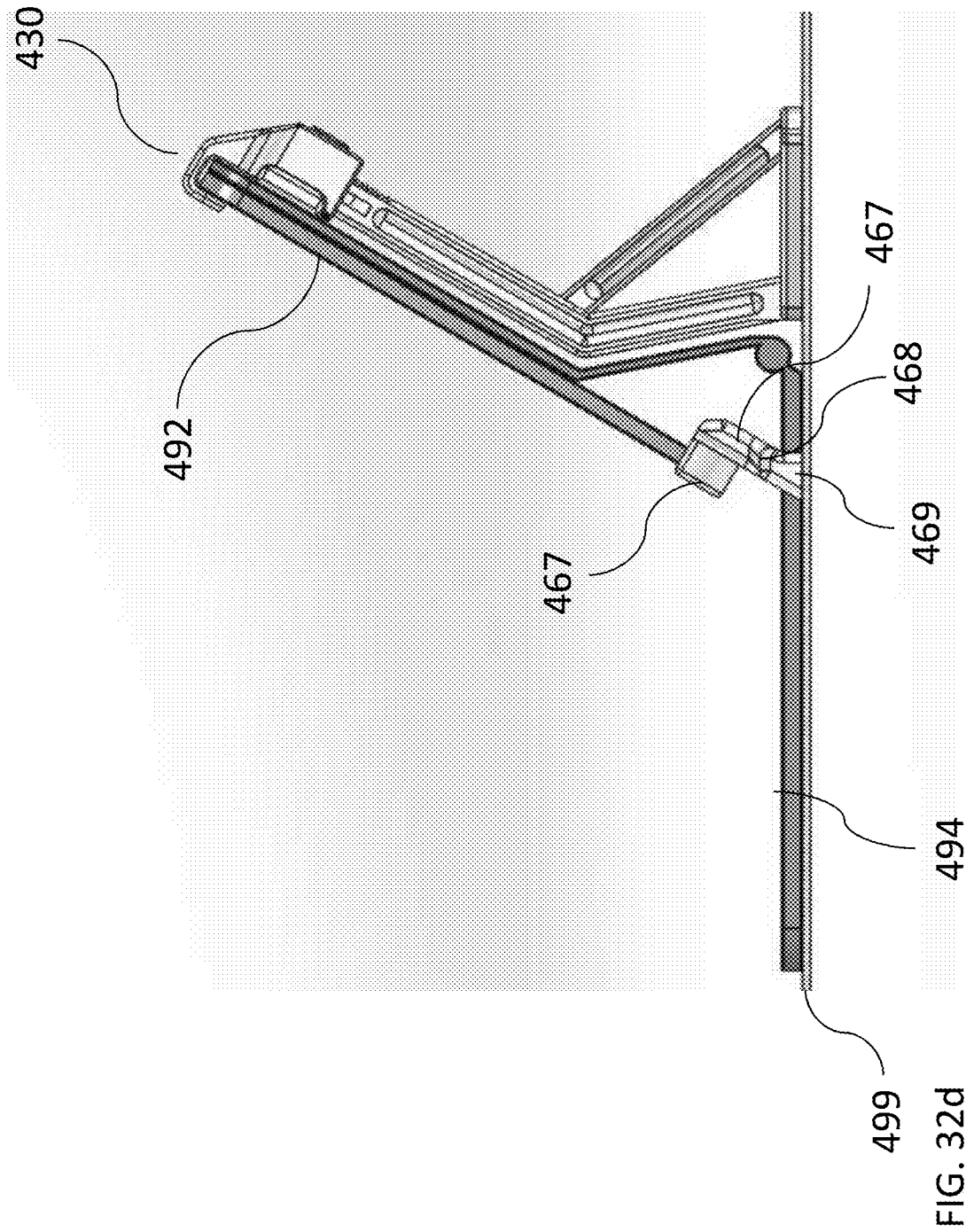
Figure 33A:
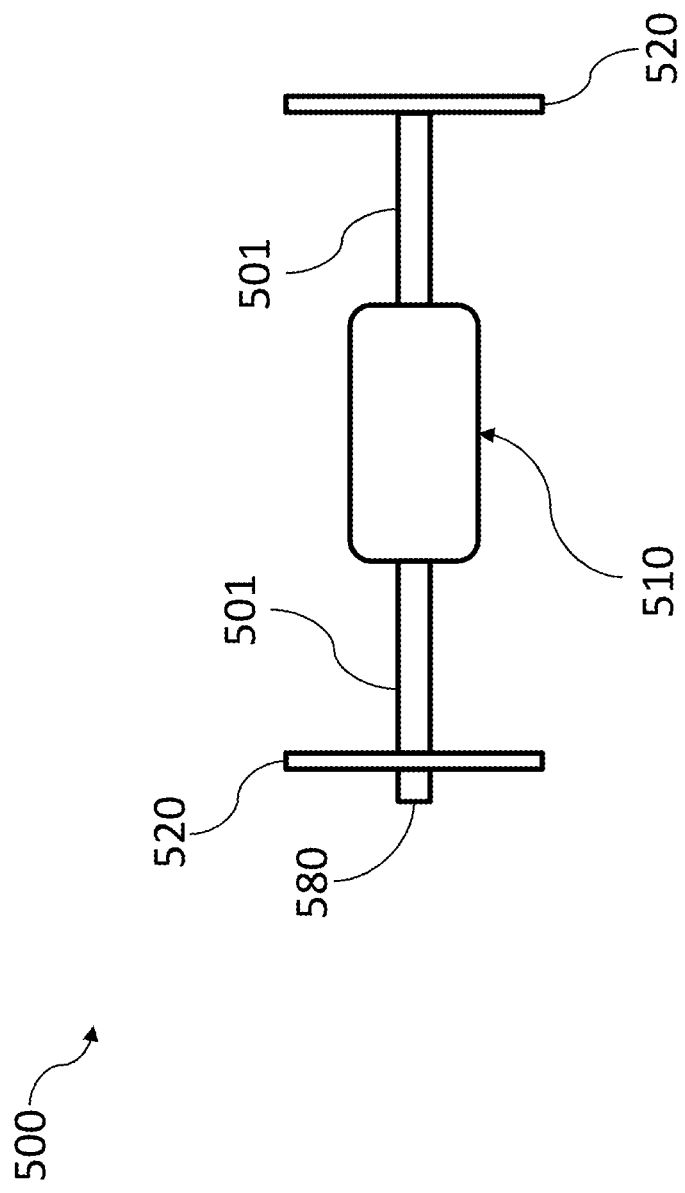
FIG. 33a illustrates a schematic representation of another embodiment of the security apparatus.
Figure 33B:
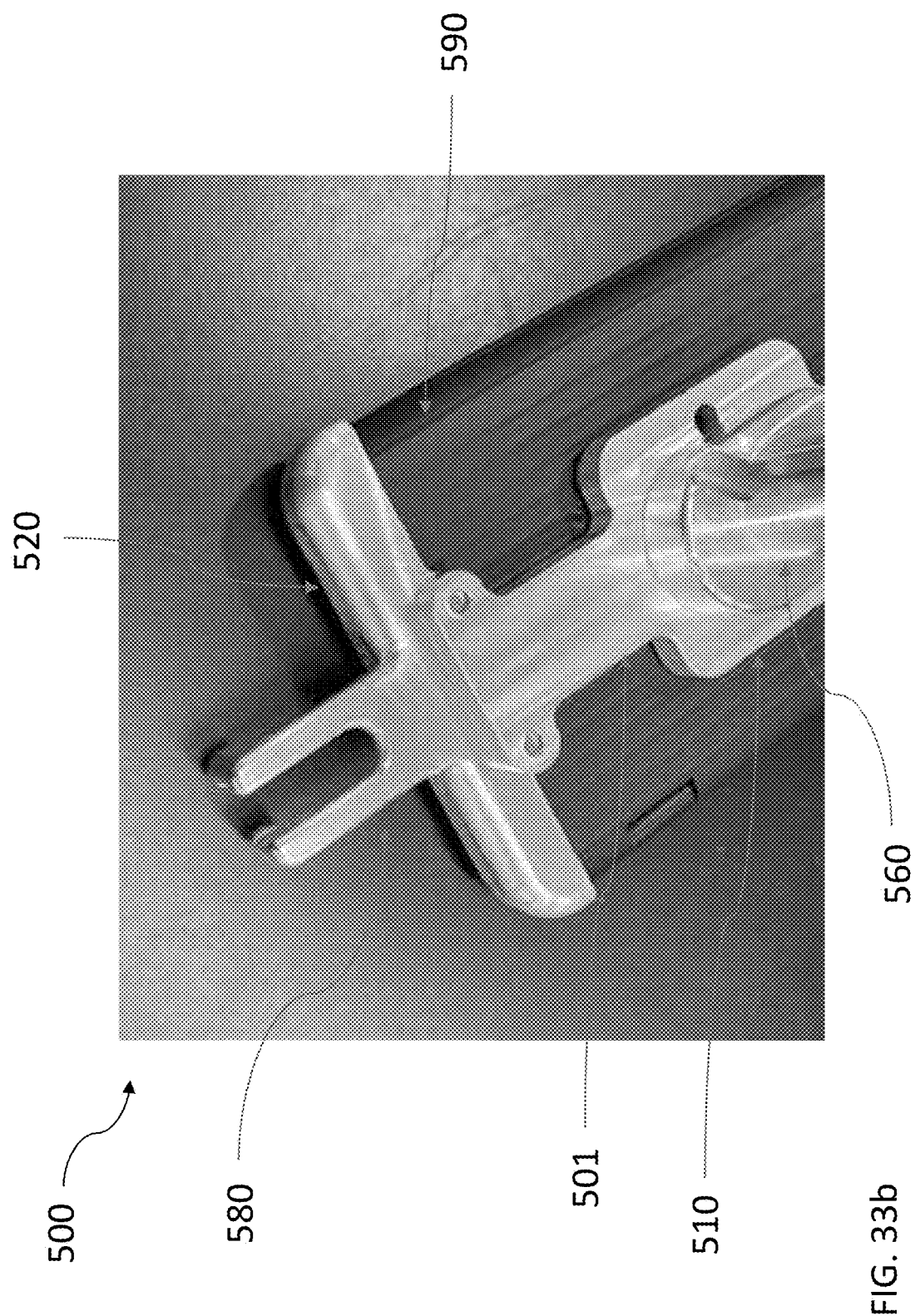
FIG. 33b illustrates a rear perspective view of another embodiment of the security apparatus configured to secure a power cord to the portable electronic device.
Figure 34:
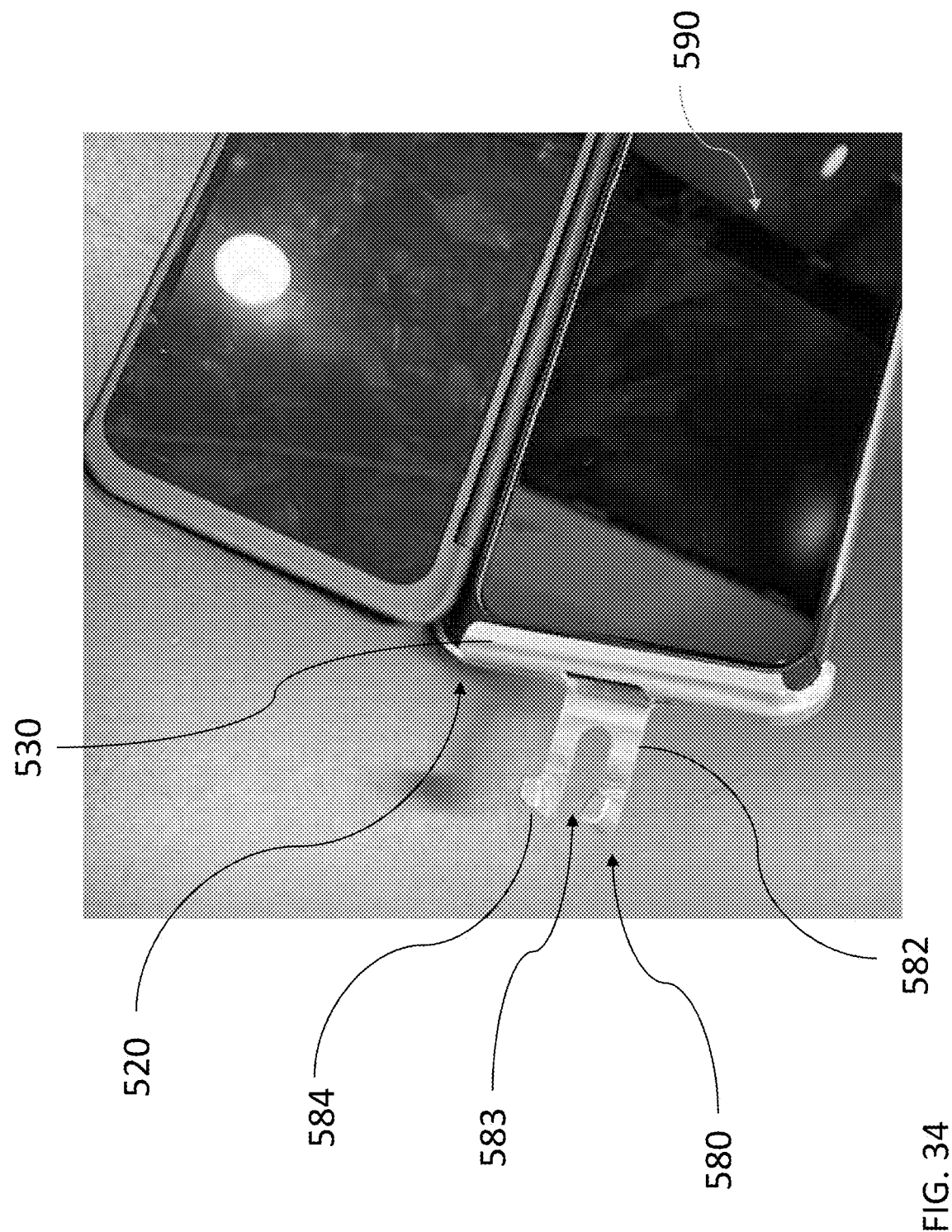
FIG. 34 illustrates a close-up front perspective view of the embodiment of FIG. 33b.

The arms 420 may further be coupled to the first and second support members 401, 410 using one or more lock assemblies 470 (FIG. 27). The one or more lock assemblies 470 are configured to further couple the arms 420 to the first and second support members 401, 410. Each lock assembly 470 comprises a plurality of lock surface features that are configured to interact with the support member surface features 407 to prevent the sliding movement of the arm 420 with respect to the first and second support member 401, 410 in the second direction N (FIG. 7*b*) when in a locked position, and allow the arm 420 to slide freely in the first S (FIG. 7*b*) and second direction N (FIG. 7*b*) along the first or second support member 401, 410 when in an unlocked position. The lock surface features are configured and function similar to those previously described in other embodiments. As shown in FIG. 31b, the lock assembly 470 is a push-button assembly, however in other embodiments, the lock assembly 470 may not be a push-button assembly. The lock assembly 470 is configured to function in a similar manner as in the embodiments of the security apparatus (100, 200, 300) previously described.

The lock assembly 470 will be described according to its interaction with the first support member 401 as is shown in FIG. 31b, however it will be understood that the lock assembly 470 interacts with the second support member 410 in a similar manner. The lock assembly 470 generally comprises a depression plate 472 and an engagement plate 474. A push rod 477 is coupled to the depression plate 472 at one end and a backing 479 at an opposing end. The engagement plate 474 is positioned between the backing 479 and the first support member 401. As shown, the push rod 477 traverses the arm 420 and extends through the elongated opening 406 of the first support member 401. The engagement plate 474 comprises a lock surface features 475 that are complimentary to the support surface features 407 and are configured to engage with the support member surface features 407 on the rear surface 403 of the first support member 401. As shown in FIG. 31b, the lock surface features 475 may be teeth 497, however in other embodiments they may be any suitable shape and configuration that are complimentary to the support member surface features 407. A spring or resilient member 478 may surround part or and/or contact a portion of the depression plate 472 and be positioned between the depression plate 472 and the recess 409 to prevent over-depression of the depression plate 472. As shown, the depression plate 472 may be obscured by an access portion 429 of the arm 420. When the support member surface features 407 and the lock surface features of the engagement plate 474 are engaged, the sliding movement of the arm 420 with respect to the first support member 401 is prevented in the second direction N (FIG. 7b).

In order to secure a portable electronic device in the security apparatus 400, the arms 420 are extended in the second direction N (FIG. 7b) by depressing or pushing down on the depression plates 472 of the lock assembly 470. The portable electronic device (not shown) is then placed onto the first and second support members 401, 410, and the arms 420 are advanced towards the portable electronic device (not shown). The arms 420 are advanced in the first direction S (FIG. 7b) until a portion of the portable electronic device (not shown) is trapped under each holder 430 lip 434. The portable electronic device blocks (not shown) access to the depression plates 472 of the locking assembly 470. The security apparatus 400 is then secured to the display surface (not shown) via one or more mounts 417 in the base 462. As shown, the one or more mounts 417 are bolts secured with nuts. Coupling the security device 400 to the display surface (not shown) acts to secure the free end of the portable electronic device (not shown) by pinning it against the display surface (not shown) such that the portable electronic device (not shown) cannot be removed from the security apparatus 400 without damage to the portable electronic device (not shown).

Removal of the security apparatus 400 from the display surface (not shown) by uncoupling the one or more mounts 417, allows the portable electronic device to be removed or slid out of the security apparatus 400, thereby allowing access to the depression plates 472 of the lock assembly 470. Accordingly, the arms 420 can then be re-extended in the second direction N (FIG. 7b) to accept and secure another portable electronic device.

The security apparatus 400 may further comprise a lateral support or keyboard bar 465 as shown in FIGS. 32a-d, that is configured to be used with tablet devices 490 having detachable keyboards 494. As shown, the keyboard bar 465 comprises a lateral support 466 including at least two holders 468 configured to slidably couple to the lateral support 465 and be adjusted along the keyboard bar 465. Each of the holders 468 includes a lip 467 that is configured to retain and otherwise secure a bottom of the tablet device 492. The holders 468 lift the tablet device 492 relative to the detachable keyboard 494 and the display surface 499.

The keyboard bar 465 comprises two or more display surface contacts 469 that are configured to contact and coupled the keyboard bar 465 to the display surface 499. The coupling may be done using any suitable means described herein or otherwise appropriate for removably coupling the keyboard bar 465 to the display surface 499. As shown, the keyboard bar 465 prevents removal of the bottom side of the tablet device 492, and further secures the detachable keyboard 494 against the display surface 499. In an embodiment, the keyboard bar 465 may be a separate component from the security apparatus 400, however in other embodiments, the keyboard bar 465 and the security apparatus 400 may be formed as a single component. In still another embodiment, the keyboard bar 465 may be movably coupled to the security apparatus 400.

Referring to FIGS. 33a-35 an embodiment of the security apparatus 500 comprises a support 510 coupled to a base 560, at least two extensions 501 extending from the support 510, and at least two holders 520 configured to engage and interact with the at least two extensions 501. The at least two holders 520 are configured to engage and retain a portion of the portable electronic device 590. As a result, portable electronic devices 590 with multiple displays, side displays and/or articulating elements may be secured by the security apparatus 500 while enabling a customer to fully interact with said portable device 590. As shown, one of the holders 520 is configured to move along one of the at least two extensions 501. Movement of one holder 520 away from the other holder 520 defines an open position enabling release or loading of the portable electronic device 590 into the security apparatus 500. Movement of one holder 520 towards the other holder 520 defines a closed position that secures the portable electronic device 590 within the security apparatus 500 and between the holders 520 or the retainers 530 of the holders 520.

Figure 35:
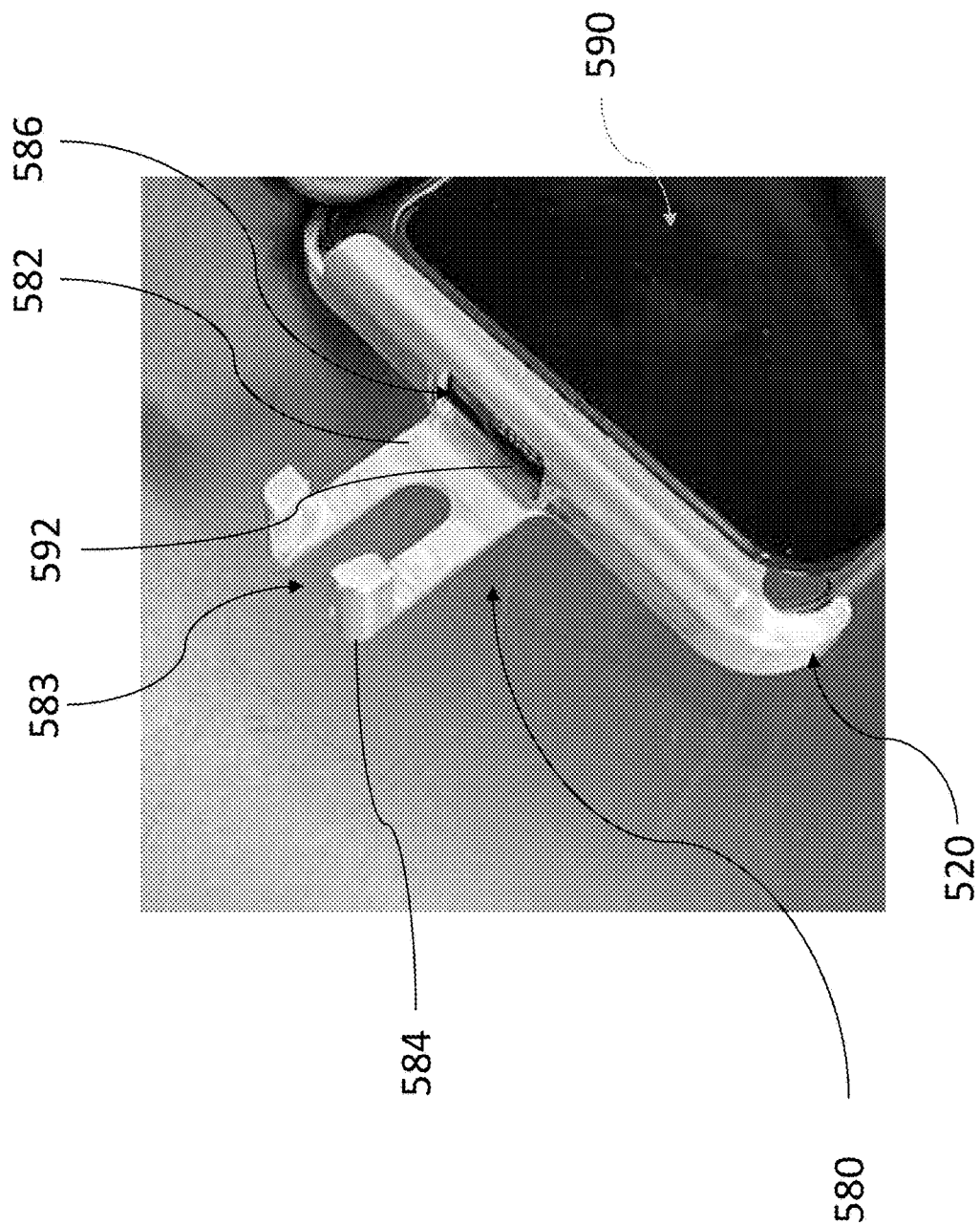
FIG. 35 illustrates another close-up front perspective view of the embodiment of FIG. 33b.

The security apparatus 500 comprises a power cord securing device or element 580. As shown, the power cord securing element 580 is coupled to the holder 520 or the retainer 530 and comprises a body 582 defining an opening 583 with two projections 584. The projections 584 may include a hook-like structure that is configured to engage or otherwise contact and secure a portion of the power cord when the security apparatus 500 is in the closed position. Referring specifically to FIG. 35, the holder 520 and/or the retainer 530 (FIG. 34) may define an opening 586 configured to align with and provide access to the power input 592 of the portable electronic device 590. As shown, the projections 584 are configured to engage or otherwise contact and secure a portion of the power cord when the security apparatus 500 is in the closed position. Moving the security apparatus 500 from the open position to the closed position causes the power cord securing element 580 to contact and/or trap the power cord against the portable electronic device 590 such that the power cord cannot be removed or disconnected from the portable electronic device 590. When the security apparatus 500 is moved into the open position by moving one or more of the holders 520 away from the other holder(s) 520, the power cord is able to be removed from portable electronic device 590 (or plugged into the portable electronic device 590). As shown, the power cord securing element 580 and the holder 520 and/or the retainer 530 may be formed as a single component.

Referring now to the embodiments of a security apparatus 600 shown in FIGS. 36*a*-39. The security apparatus 600 comprises a support 610, two or more holders 620 coupled to holder extensions 617 that move relative to the support 610, and a locking assembly 670. The support 610 generally comprises a support plate 612 that is configured to contact and support a portable electronic device 690, such as a smart phone, and a support base 611. A base or base portion 614 is coupled to the support 610 and configured to be coupled to a pedestal or anchor 602. The pedestal 602 is configured to couple to a display fixture. One or more of the components of the security apparatus 600 may be formed separately and joined together with a plurality of fasteners 615, welded joints, or may alternatively be formed as single components using known molding or machining processes.

Figures 36A, 36B:
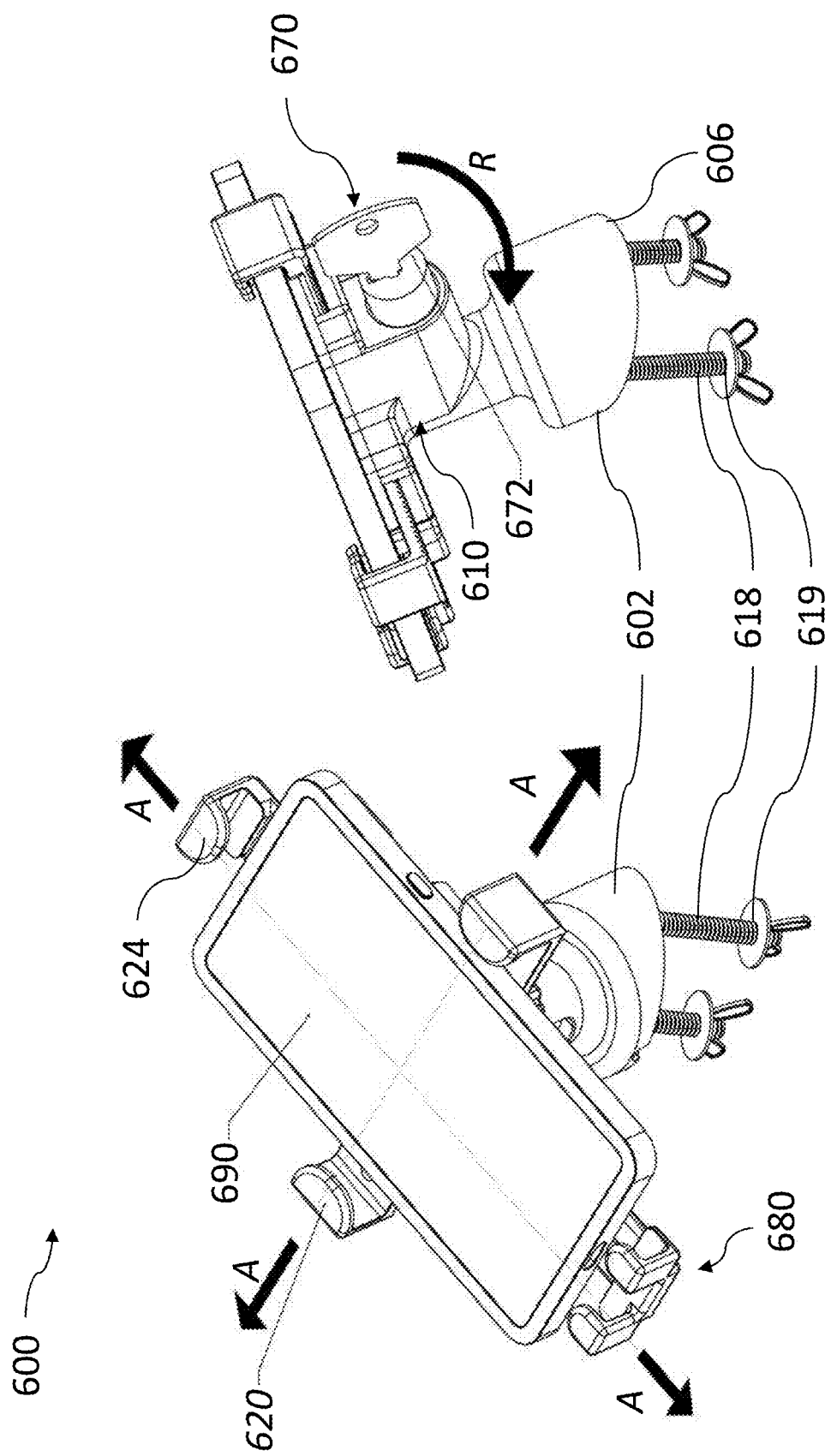
FIGS. 36a-b illustrate top and side perspective views, respectively, of another embodiment of the security apparatus in an unlocked state.
Figure 37B:
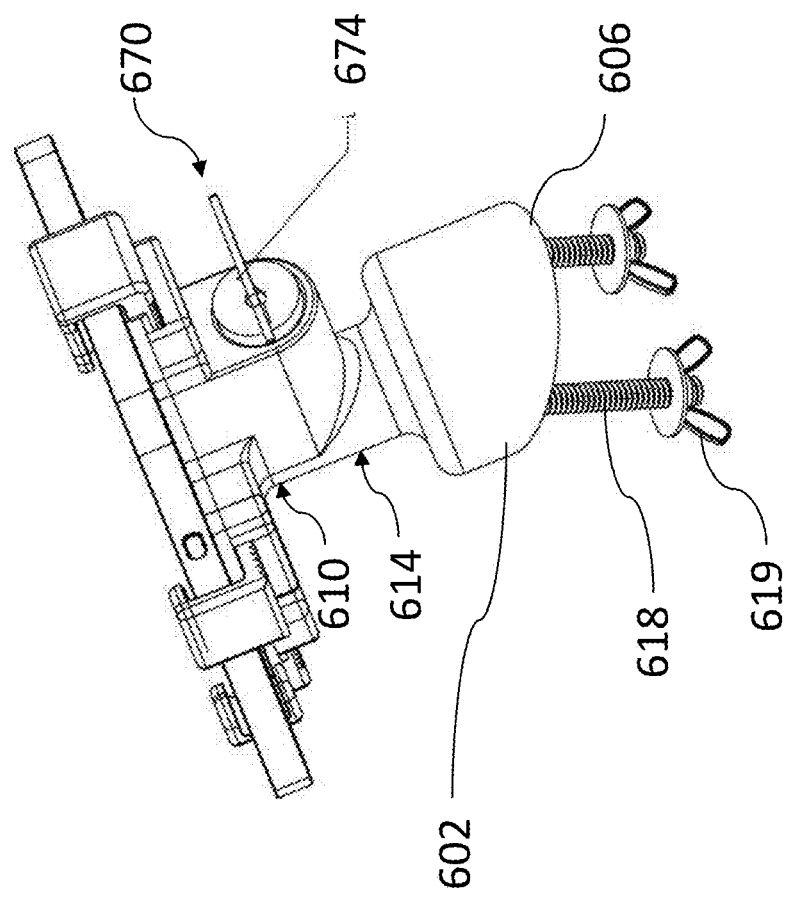
FIGS. 37a-b illustrate top and side perspective views, respectively, of the embodiment of the security apparatus of FIGS. 36a-b in a locked state.
Figure 37A:
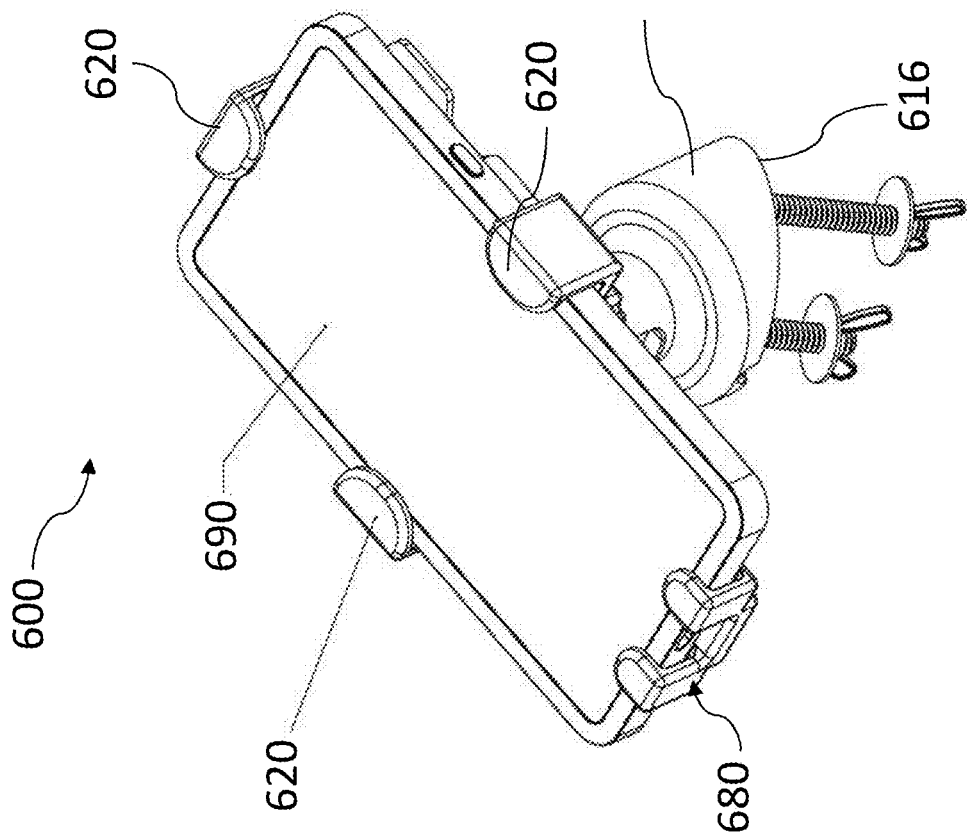

Each of the two or more holders 620 may further comprise a retainer 630 including a lip 624 that enables retention of a portion of the portable electronic device 690, and a holder extension 617 defining a plurality of surface features 613. One of the holders 620 may be generally configured as a power cord securing member 680 similar to embodiments previously described. In another embodiment, the support plate 612 supports a wireless charging puck (not shown) that enables wireless charging of the portable electronic device being held by the security apparatus 600. FIGS. 36*a*-*b* show the security apparatus 600 in an open position where the holders 620 are moved in a direction A away from the support 610 to enable removal of or installation of the portable electronic device 690 into the security apparatus 600. In contrast, the holders 620 are moved towards the support plate 612 (in an opposing direction to A) to secure the portable electronic device 690 within the security apparatus 600. The support pedestal 602 may further comprise one or more engagement structures 618 that are configured to engage the display fixture and are each configured to couple to a mount 619, such as a wingnut, split nut, or the like to secure the security apparatus 600 to the display fixture. As shown, the one or more engagement structures 618 and mounts 619 may be similar to other embodiments previously discussed. The one or more engagement structures 618 include a first end secured within the pedestal 602 and a second, free end extending from a bottom surface 606 of the pedestal.

Turning now to FIGS. 38-40*b*, the support 610 and/or the base 614 may comprise or be configured to accept a lock assembly 670 configured to lock and unlock the security apparatus 600. The lock assembly 670 my comprise an input interface configured to receive and input wherein the input results in an automatic locking/unlocking of the security apparatus 600 or enables the mechanical locking/unlocking of the security apparatus 600. As shown, the input interface is a barrel configured to accept a locking tool 674, such as a key. In other embodiment, the input interface 672 may comprise one or more biometric sensors configured to unlock and/or lock the lock assembly 670 in response to a verified biometric input.

A support base 611 is configured to accept and support a guide assembly that engages the holder extensions 617. The guide assembly may comprise a guide plate 654 and two or more engagement plates 653 coupled to the guide plate 654. In an embodiment, the guide plate 654 may further comprise a guide track extending along or partially along one or more sides of the guide plate 654. The holders 620 are configured to move relative to the guide assembly 652 and along guide axes X or Y. The guide assembly 652 may engage or contacts the holders 620, or power cord securing member 680 via the holder extensions 617 in a similar manner as has been shown and discussed in prior embodiments and therefore, may comprise one or more similar components. In an embodiment, the holder extensions 617 may be configured to engage the guide track of the guide plate 654 and move relative to the guide plate 654 along the guide track. The engagement plates 653 define a plurality of surface features 655 that cooperate with or otherwise engage surface features 613 positioned on or defined on the holder extensions 617. In an embodiment, one or more components of the guide assembly 652 and/or holders 620 may be formed as a single component.

Figure 38:
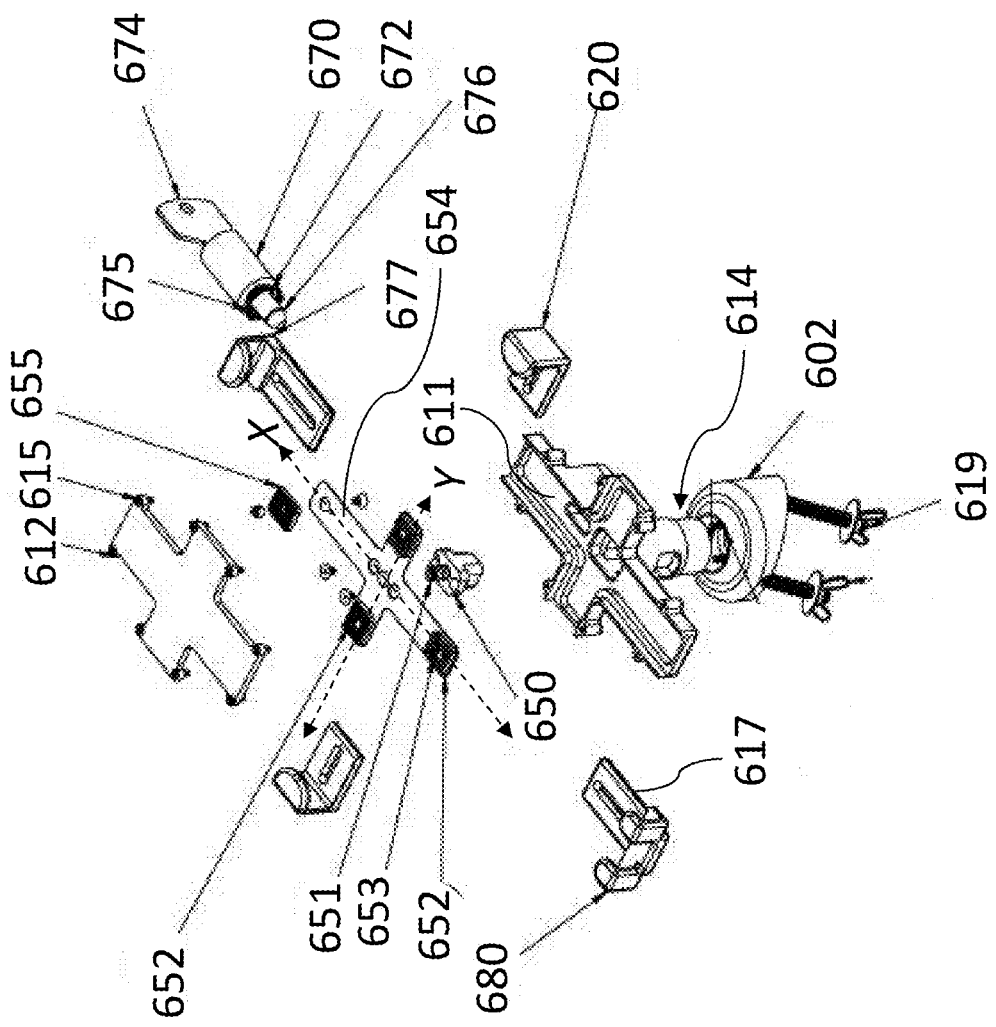
FIG. 38 is an exploded view of the security apparatus of FIGS. 36a-b.
Figure 39:
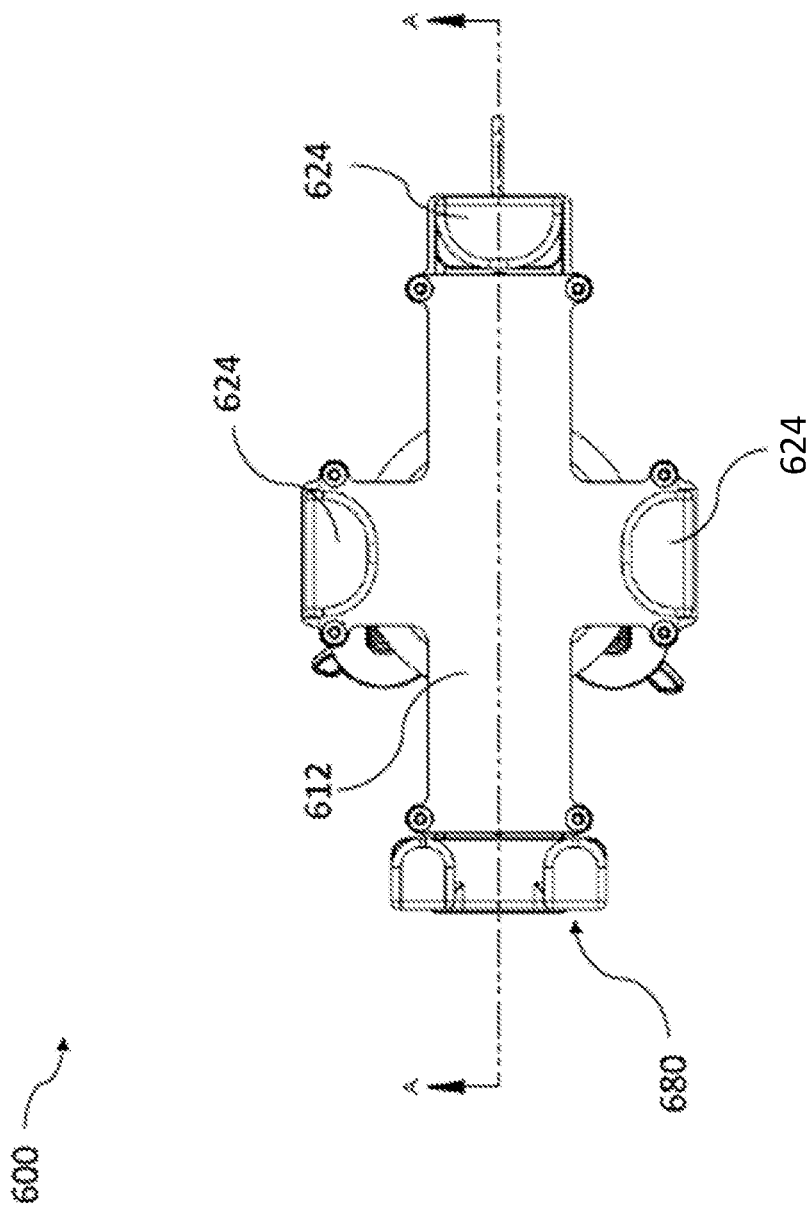
FIG. 39 illustrates a top plan view of the embodiment of the security apparatus of FIGS. 36a-b.
Figure 40A:
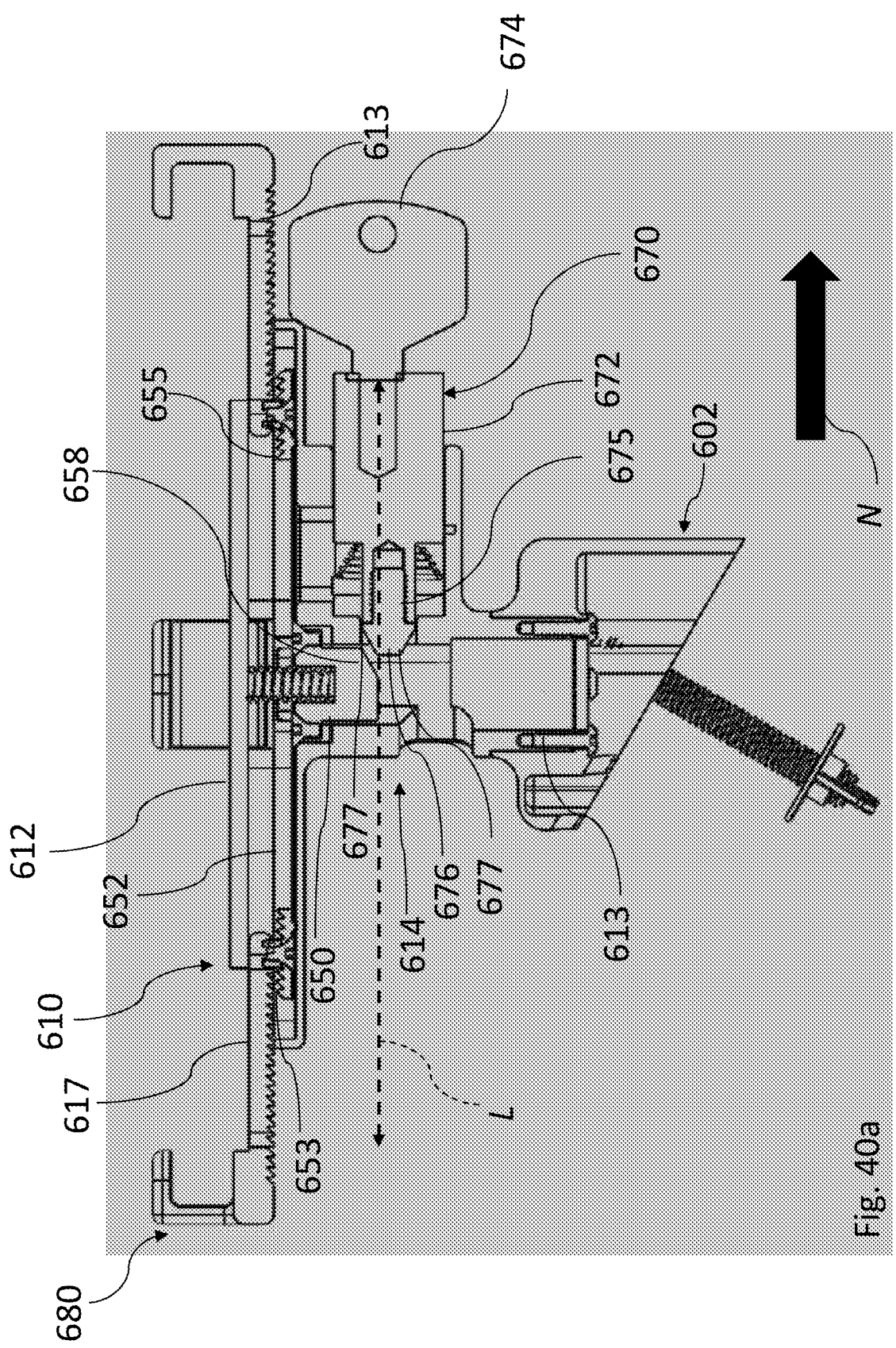
FIG. 40a illustrates a cross-sectional view of the embodiment of the security apparatus of FIG. 39 along line A-A in an unlocked state.
Figure 40B:
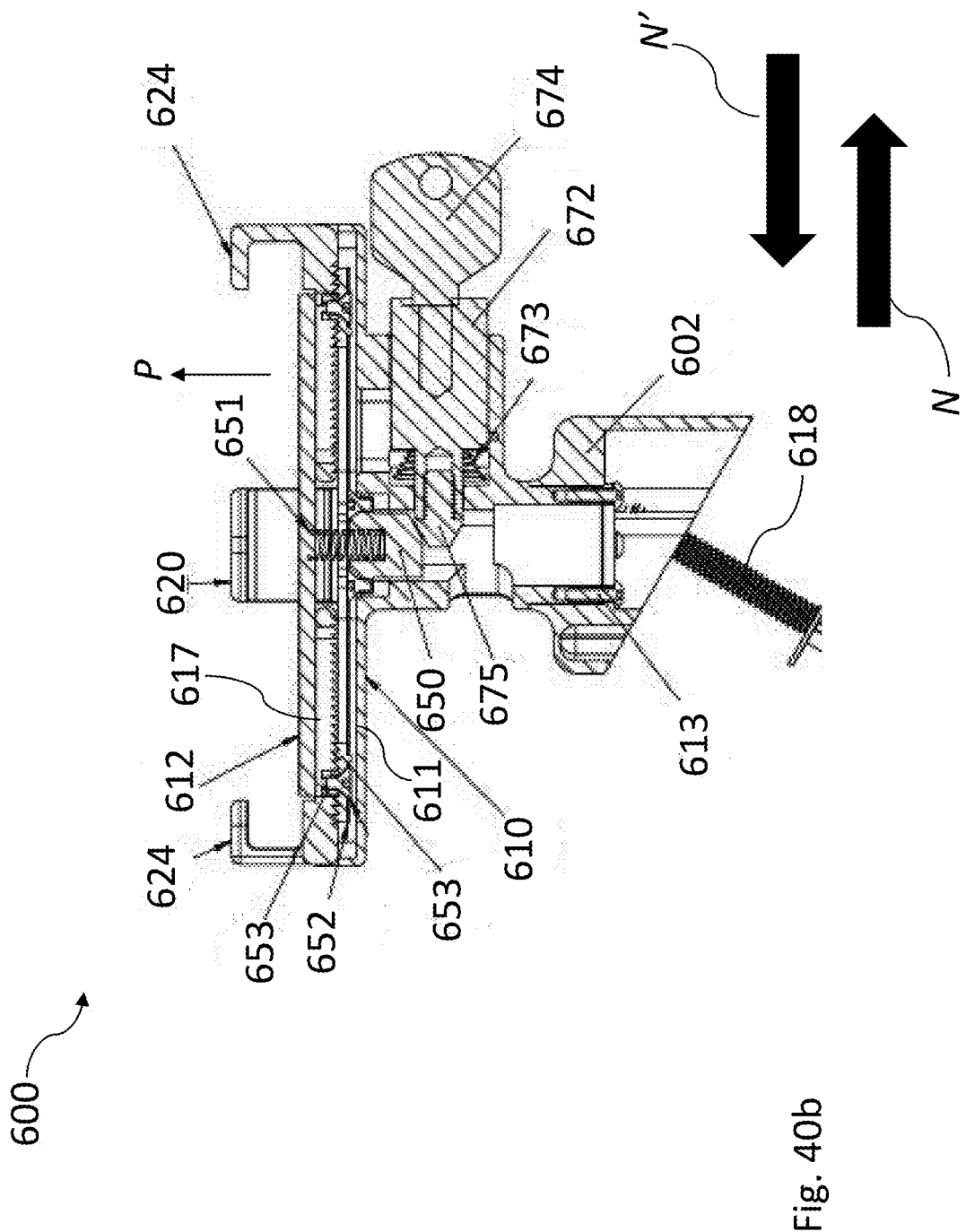
FIG. 40b illustrates a cross-sectional view of the embodiment of the security apparatus of FIG. 39 along line A-A in a locked state.

FIG. 40*a* shows a cross-section of the security apparatus 600 along line A-A of FIG. 38 in an unlocked state and FIG. 40*b* illustrates the same cross-section of the security apparatus in a locked state. In the embodiments shown, the barrel 672 of the lock assembly 670 is configured to accept a locking tool 674 such as a key. The barrel 672 is operatively coupled to a locking pin 675 and configured to move the locking pin 675 along a locking pin axis L. The locking pin 675 includes a biaser 676 positioned at an end of the locking pin 675. The biaser 676 includes one or more biaser surfaces 677, which are illustrated as an annular ramped surface, or frustoconical surface, however in other embodiments, the biaser surface 677 may be configured differently in order to operate as will be described below. A biasing element 650 cooperates with a resilient member 651, such as a spring, and comprises a biasing element surface 658. The resilient member 651 is configured to be partially seated in the biasing element 650 and extend through the guide 652 to contact the support plate 612.

The operation of the security apparatus 600 will now be explained with particular reference to the security apparatus 600 shown in the unlocked state shown in FIG. 40*a* and in the locked state as shown in FIG. 40*b*. In the unlocked state, the locking pin 675 is withdrawn or otherwise not in contact with the biasing element 650. The resilient member 651 is in a relaxed state, which enables the guide 652 to rest on the support base 611 and loosely retains the holder extensions 617 between the guide 652 and the support plate 612. In this unlocked state, a space may be seen between the surface features 655 of the engagement plates 653 and the surface features 613 of the holder extensions 617. As a result, the holder extensions 617 are able to move freely in a direction towards and away A (FIG. 36*a*) from the support 610. In the event that a portable electronic device 690 is retained in the security apparatus 600, the holder extensions 617 may be pulled or retracted in a direction A (FIG. 36*a*) to move the holders 620, 680 away from the support plate 612 in order to remove the portable electronic device 690.

In order to secure a portable electronic device 690 into the security apparatus 600, starting the unlocked state as shown in FIG. 40*a*, two or more of the holder extensions are retracted or withdrawn. The lock assembly 670 is then moved to the locked state, for example via rotation R of the locking tool 674. Rotating the locking tool 674 advances the locking pin 675 along the locking pin axis L such that the biaser surface 677 of the biaser 676 moves into contact with the biasing element surface 658. Continued advancement of the locking pin 675 causes the biasing element surface 658 to ride along and up the biaser surface 677, which results in the biasing element 650 to be pushed in an upward direction P, thereby contacting and pushing the guide 652 towards the support plate 612. This upward advance pins or otherwise clamps the holder extensions 617 between the guide 652 and the support plate 612. Consequently, the space between the surface features 655 of the engagement plates 653 and the surface features 613 of the holder extensions 617 is eliminated. The security apparatus 600 is now in the locked state. In the locked state, the barrel 672 may be moved relative to the base 614 and/or the support 610 along axis L to compress a release member 673 (FIG. 40b). In the locked state, the barrel 672 may be retained in a locked position relative to the base 614 and/or the support 610. The release member 673 may be comprised of a resilient material. As shown, the release member 673 is a spring, and more preferably a cone-shaped spring.

The portable electronic device 690 may now be placed in the security apparatus 600 such that it is in contact with the support plate 612. Similar to embodiments previously described, the surface features 655, 613 are shaped in order to enable the holder extensions 617, (and therefore the holders 620 and the power cord securing member 680) to be advanced towards the support plate 612 such that the holders 620 retain and hold two or more sides of the portable electronic device 690. In the locked state, the holders 620 and power cord securing member 680 (and therefore, the holder extensions 617) are inhibited from being retracted or withdrawn away from the support 610. The security apparatus 600 may then be secured to a display fixture or surface (not shown) using the engagement structures 618 and mounts 619 as has been previously described in other embodiments. This embodiment of the security apparatus 600 may remain mounted to the display surface or display fixture (not shown) during installation and removal of the portable electronic device 690.

Figure 41A:
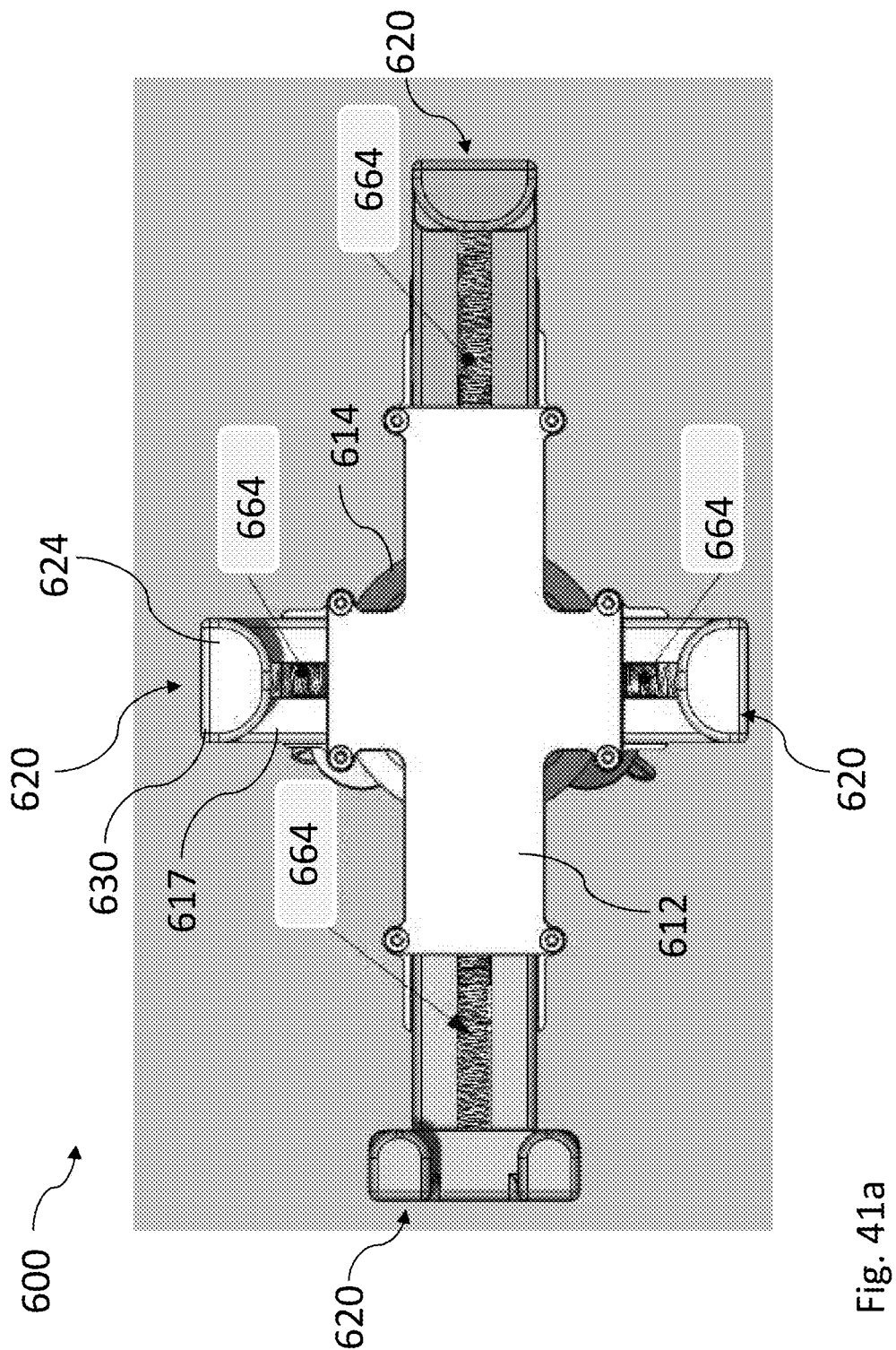
FIG. 41a illustrates a top plan view of an embodiment of the security apparatus comprising auto-releasing holders.
Figure 41B:
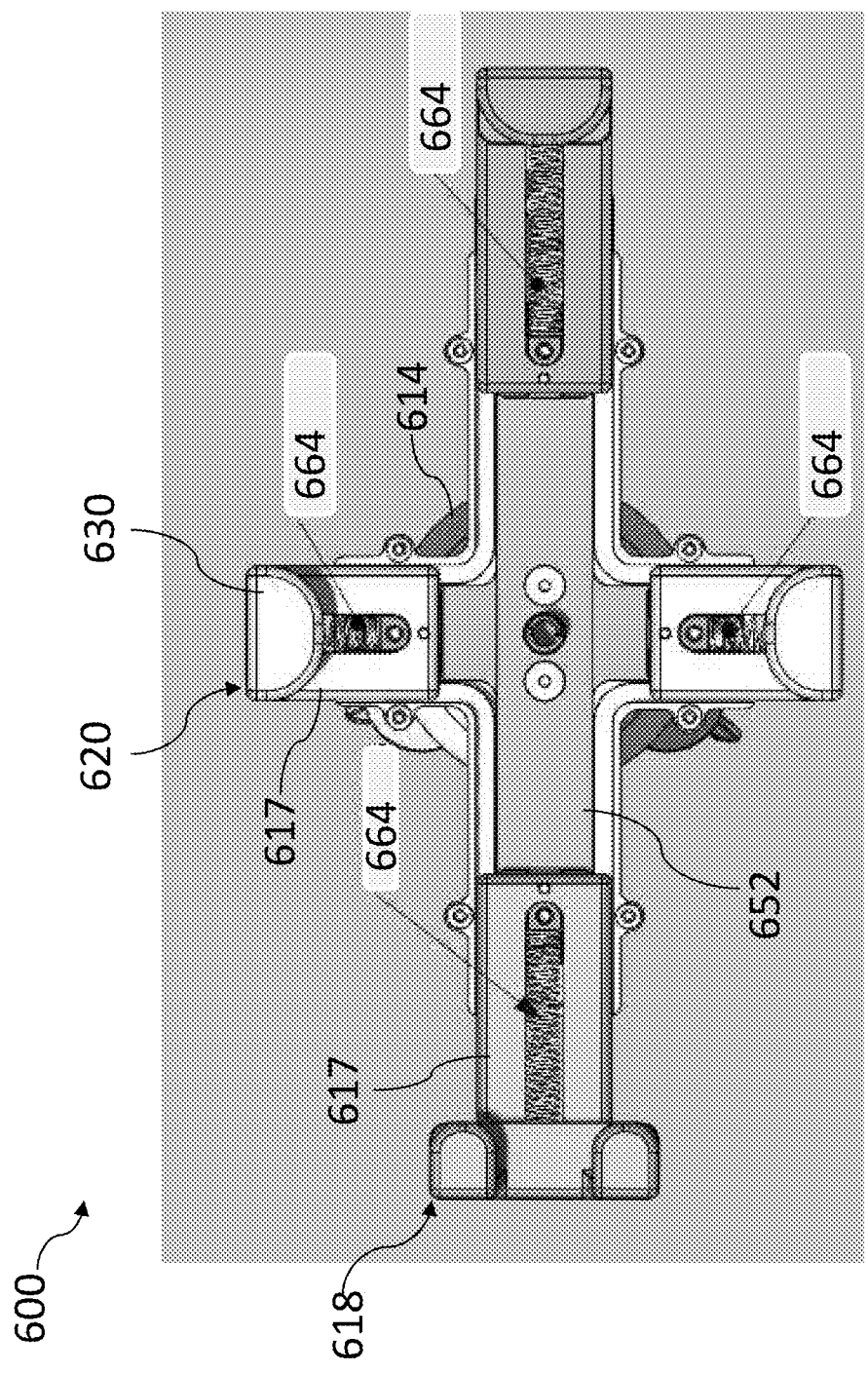
FIG. 41b illustrates a top plan view of the embodiment of the security apparatus of FIG. 41a with the support plate removed.
Figure 41C:
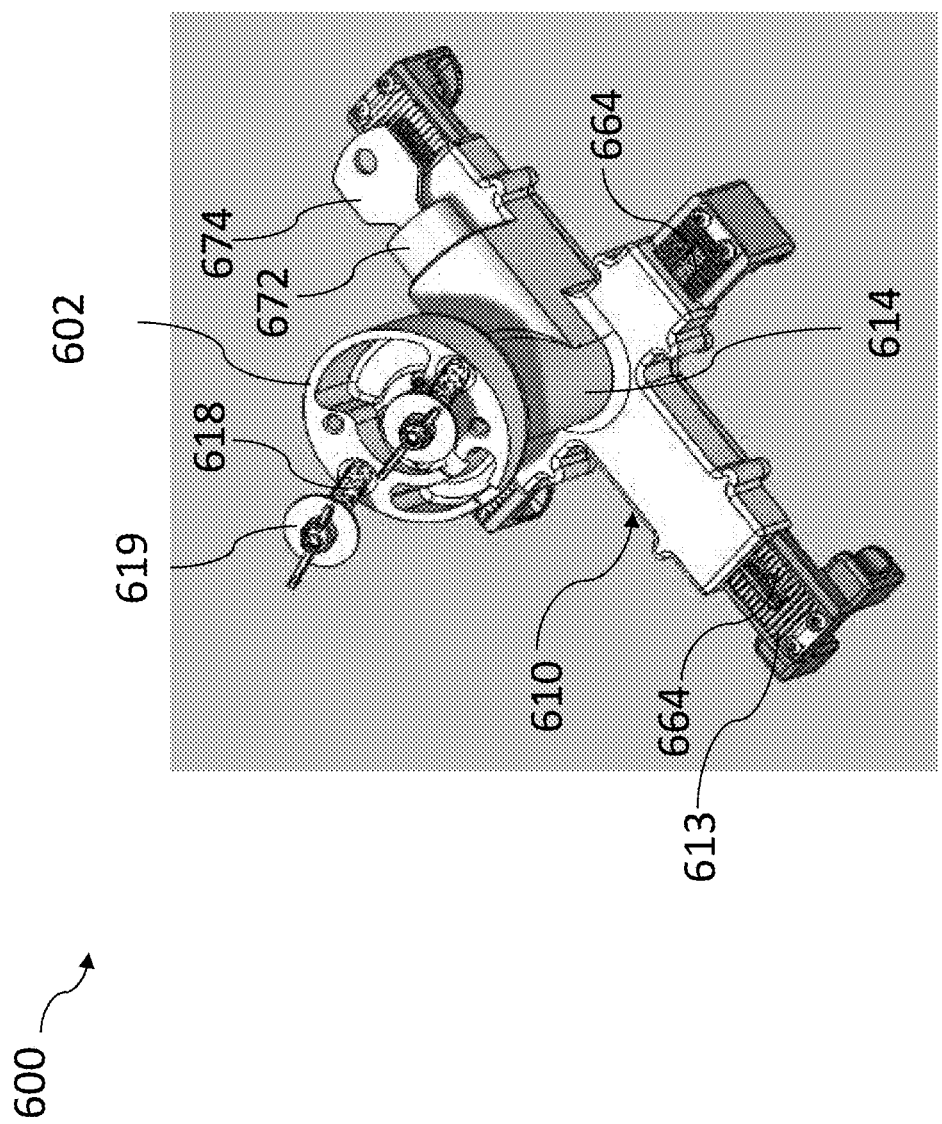

Rotating the barrel 672 to the unlocked state may enable release of the barrel 672 and decompression of the release member 673. The release member 673 urges the barrel 672 along the axis L in a direction N. Accordingly, moving the barrel 672 to the locked state (or locked position) may comprise a combination of a rotation of the barrel and movement of the barrel along the axis L in a direction N'. With reference to FIGS. 41a-c, the security apparatus 600 may be spring-loaded such that one or more of the holders 620 and the power cord securing member 680 are automatically directed in the direction A when the security apparatus 600 is moved from the locked state to the unlocked state. A spring member 664 or other such resilient member is attached to or contacts the support 610 or the base 614 at on end. A second, opposing end of the spring 664 contacts or is attached to a portion of the holder 620. When the security apparatus 600 is in the locked state, the spring members 664 are in a compressed state. Adjusting the lock assembly 670 to move the security apparatus 600 to the unlocked state enables decompression of the release member 673 to move the barrel 672 in N direction, which disengages the locking pin 675 from the biasing element 650. This enables the spring members 664 to decompress or expand to push the holders 620 in the direction A (FIG. 36a). In this manner, the security apparatus 600 may be quickly unlocked with fast release of the retained portable electronic device.

Figure 42:
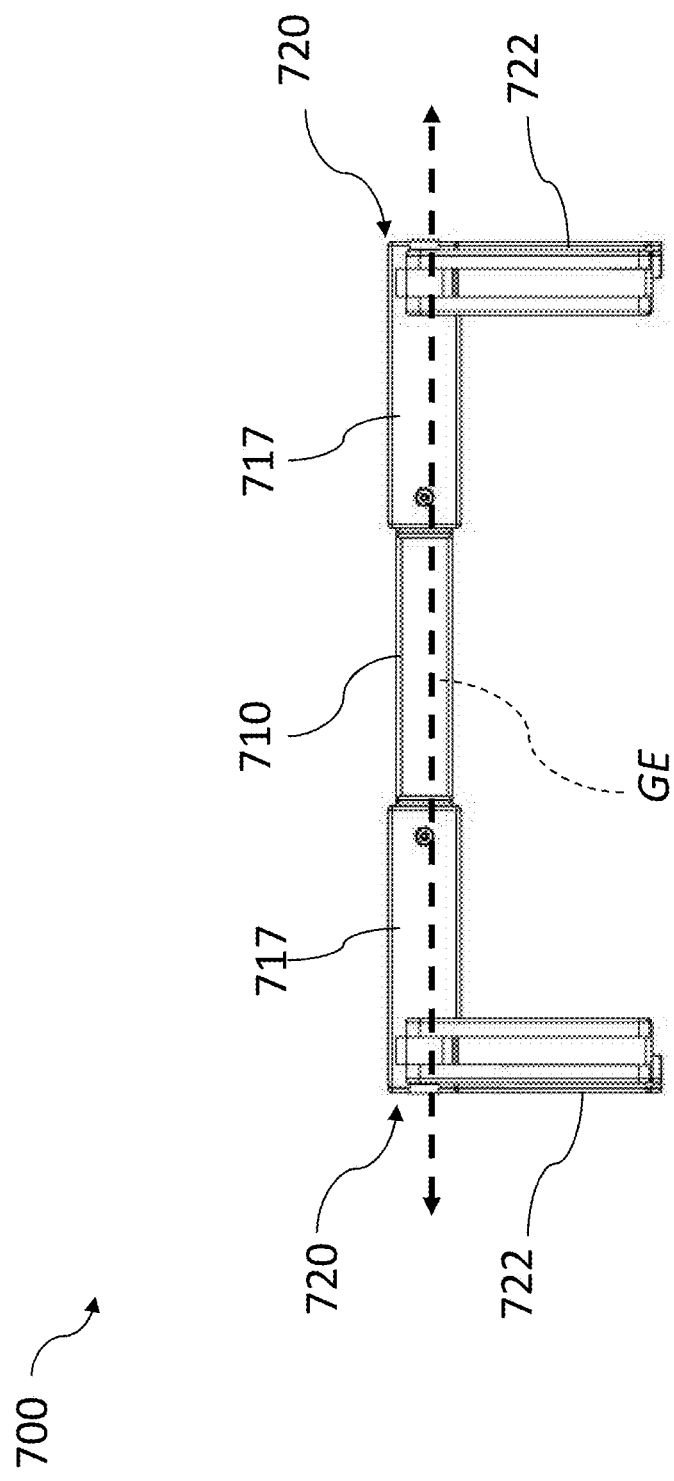
FIG. 42 illustrates a top plan view of an embodiment of another embodiment of the security apparatus.
Figure 43:
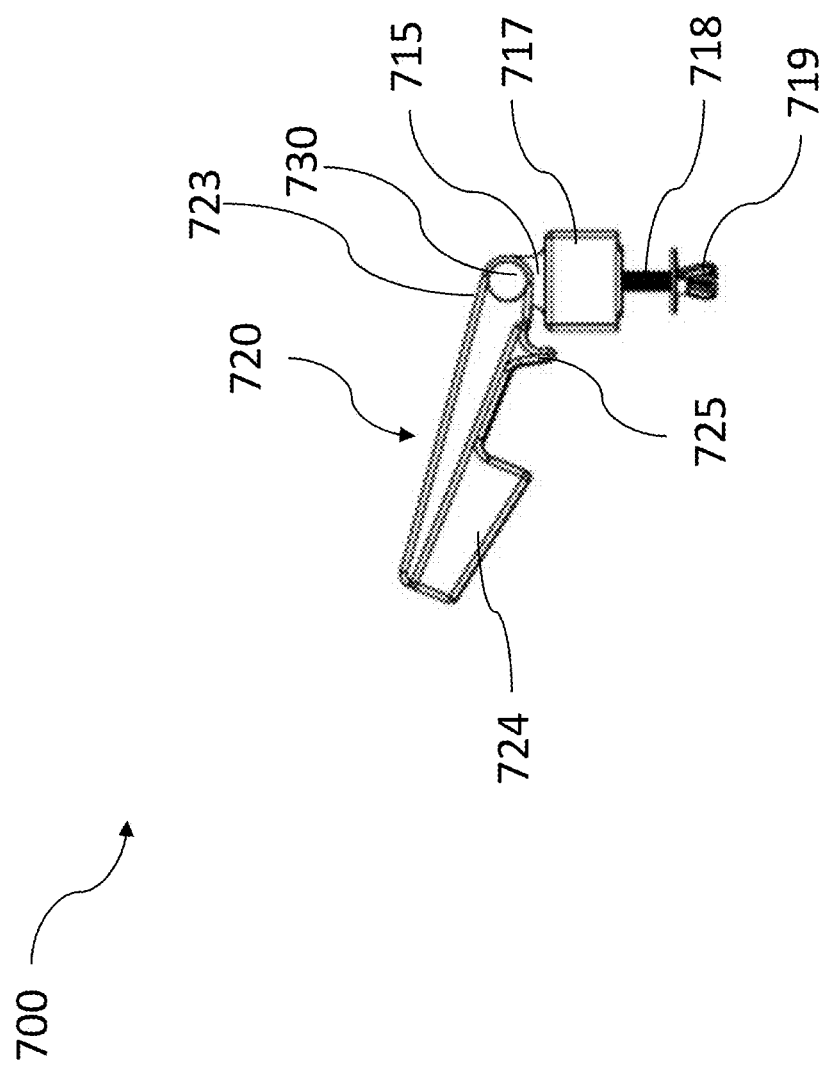
FIG. 43 illustrates a left side elevational view of the embodiment of the embodiment of the security apparatus of FIG. 42.
Figure 44:
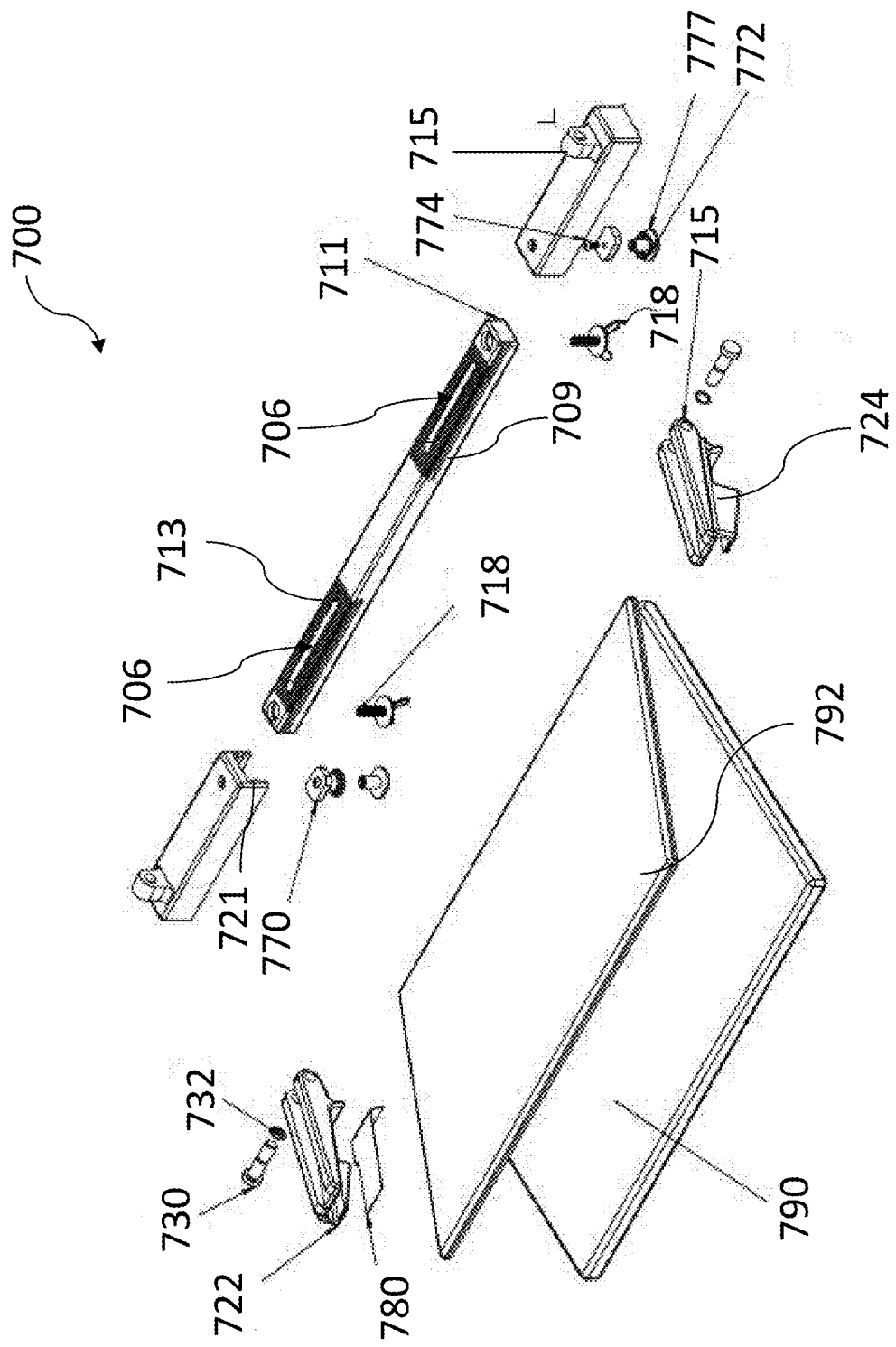
FIG. 44 illustrates an exploded view of the embodiment of the security apparatus of FIG. 42.
Figure 45:
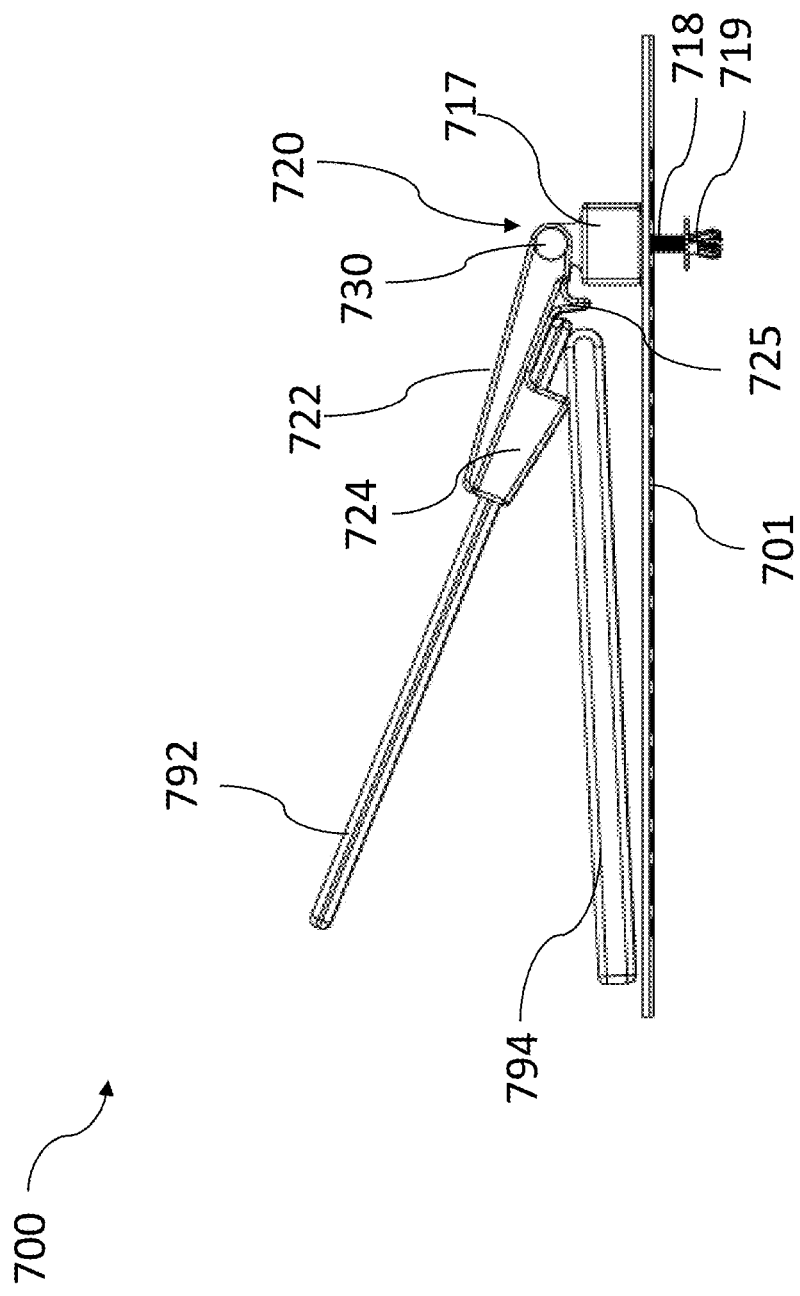
FIG. 45 illustrates a left side elevational view of the embodiment of the security apparatus of FIG. 42 with a laptop installed and in a closed position.

Referring now to the embodiments of a security apparatus 700 shown in FIGS. 42-48. This embodiment of the security apparatus 700 generally comprises a support 710 and at least two holders 720. Each of the at least two holders 720 includes a holder base 717 moveably coupled to the support 710 and a retainer 722 pivotally coupled to the holder base 717. Referring to FIG. 42, when the security apparatus 700 is in an unlocked state, the holder base 717, and therefore the holders 720 may be freely moved along a guide axis GE and relative to the support 710. The support 710 may define one or more guides 709 that are configured to interact with one or more holder guides 721 to guide movement of the holders 720 along the support 710. Each retainer 722, as shown particularly in FIGS. 43-44, include an attachment end 723 that is configured to pivotally attach to the holder base 717 at a hinge point 715 via a hinge pin 730 secured by a hinge fastener 732. The support 710 as shown in FIG. 44 comprises a plurality of surface features 713 positioned or defined at opposing ends of the support 710, however in other embodiments, the surface features 713 may extend the entire length of the support 710. The surface features 713 surround one or more elongated openings 706 that traverse the support 710.

The holder bases 717 may be coupled to the support 710 in a similar manner as embodiments of the security apparatus previously described by using one or more lock assemblies 770. The lock assemblies 770 each comprise a depression plate 772 coupled to one end of a push rod 777 and a backing that engages an opposing end of the push rod 777. An engagement plate 774 is positioned between the backing and the support 710. In some embodiments, there may be no backing between the push rod 777 and the depression plate 772. In other embodiments, the backing and the push rod 777 may be formed as a single component. The push rod 777 extends through the elongated opening 706 of the support 710. The engagement plate 774 comprises a plurality of lock surface features that are complimentary to the surface features 713 of the support 710. As shown, the lock surface features are complimentary teeth that are configured to engage or interact with the surface features 713 or teeth of the support 710. A spring or resilient member may surround part of and/or contact a portion of the depression plate 772. The resilient member may be positioned between the depression plate 772 and a bottom surface of the support 710 to prevent over-depression of the depression plate 772. In an embodiment, the resilient member may be housed within the push rod 777.

In the resting or decompressed state, the spring may act to exert a force against the depression plate 772, which in turn acts to bring the lock surface features of the engagement plate 774 into engagement with the surface features 713 of the support 710. The surface features of the engagement plate 774 and the support 710 as shaped such that when the surface features 713 of the support 710 and the lock surface features are engaged, the sliding movement of the holder bases 717 are permitted in a first direction such that the holders 720 are brought closer together, but are inhibited from being moved in a second direction where the holders 720 are moved apart from each other.

In order to install a portable electronic device 790, such as a laptop computer, into the security apparatus 700, the depression plates 772 are depressed to disengage the engagement plates 774 and the holder bases 717, and therefore the holders 720 are moved apart from each other. The depression plates 772 are then released to return the security apparatus 700 to the locked state. The holder bases 717 and therefore, the holders 720, are moved closer to each other such that the lips 724 of the holders 720 retain opposing sides of the display portion 792 of the laptop computer 790 ("laptop"). As shown in FIGS. 45-48, the display portion 792 is retained by the lip 724 of the holder 720 and a holder stop 725 or stop member. The lip 724 and/or the holder stop 725 may be coated with a rubber material or may comprise a rubber or other resilient surface that protects the surfaces of the laptop and inhibits scratching of the laptop 790. Once the display portion 792 is secured, the support 710 is then coupled to the display surface 701 by coupling mounts 719 to the engagement structures 718 of the support 710. The engagement structures 718 may be fixedly coupled to the support 710, or may be a separate component that is accepted in mount recesses or mount openings 711 that at least partially extend through the support 710. The laptop 790 is now secured and inhibited from being removed from the display surface 701. The lips 724 of the holder 720 and the holder stop 725 inhibit removal of the display portion 792 of the laptop 790 from the security apparatus 700 while it is coupled to the display surface 701. The spacing of the lip 724 and the holder stop 725 relative to the display surface 701 or display fixture further inhibits removal of the laptop when secured within the security apparatus 700 as shown in FIGS. 45-48.

Figure 46:
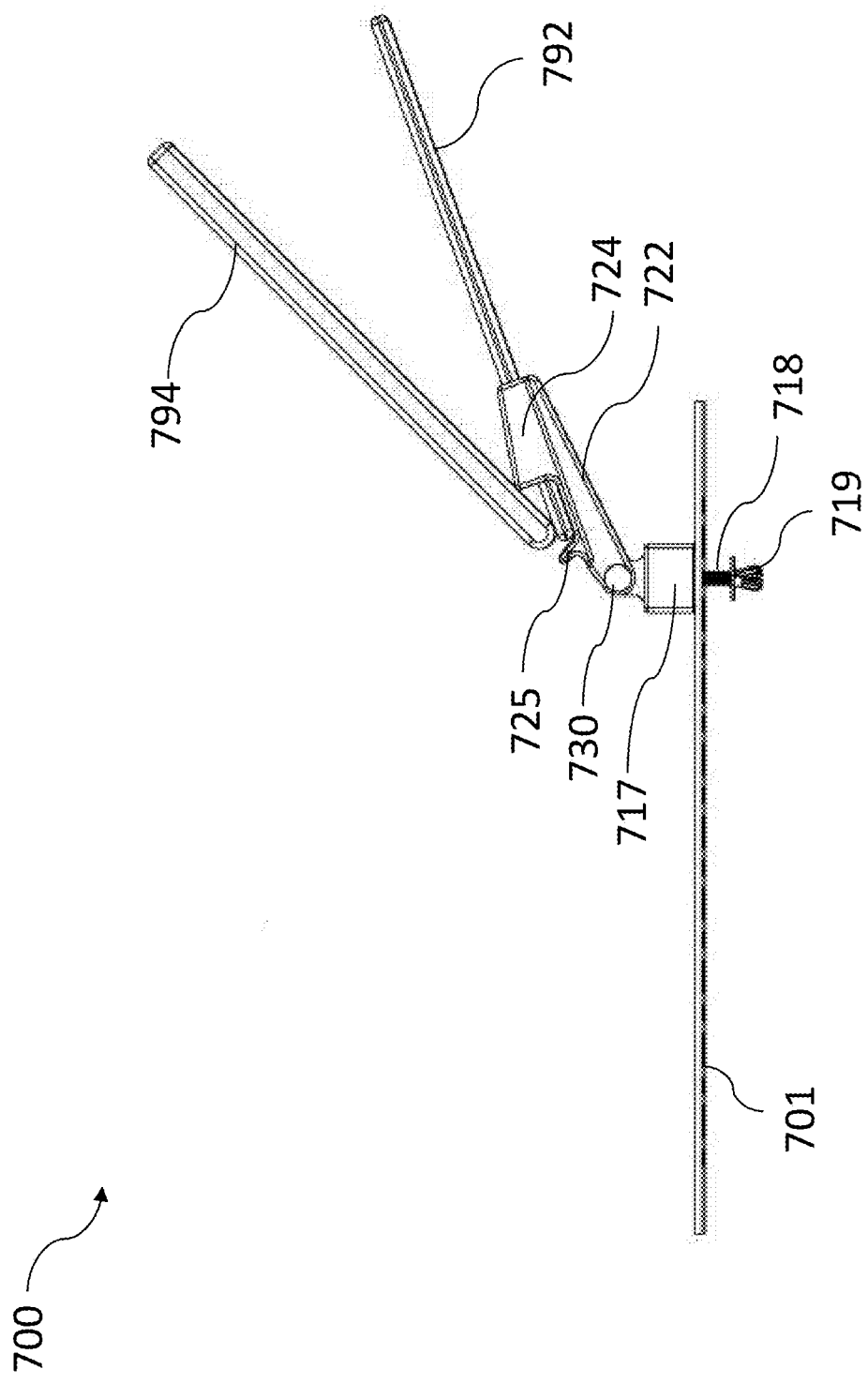
FIG. 46 illustrates a left side elevational view of the embodiment of the security apparatus of FIG. 45 with a laptop installed and in a closed back position.
Figure 47:
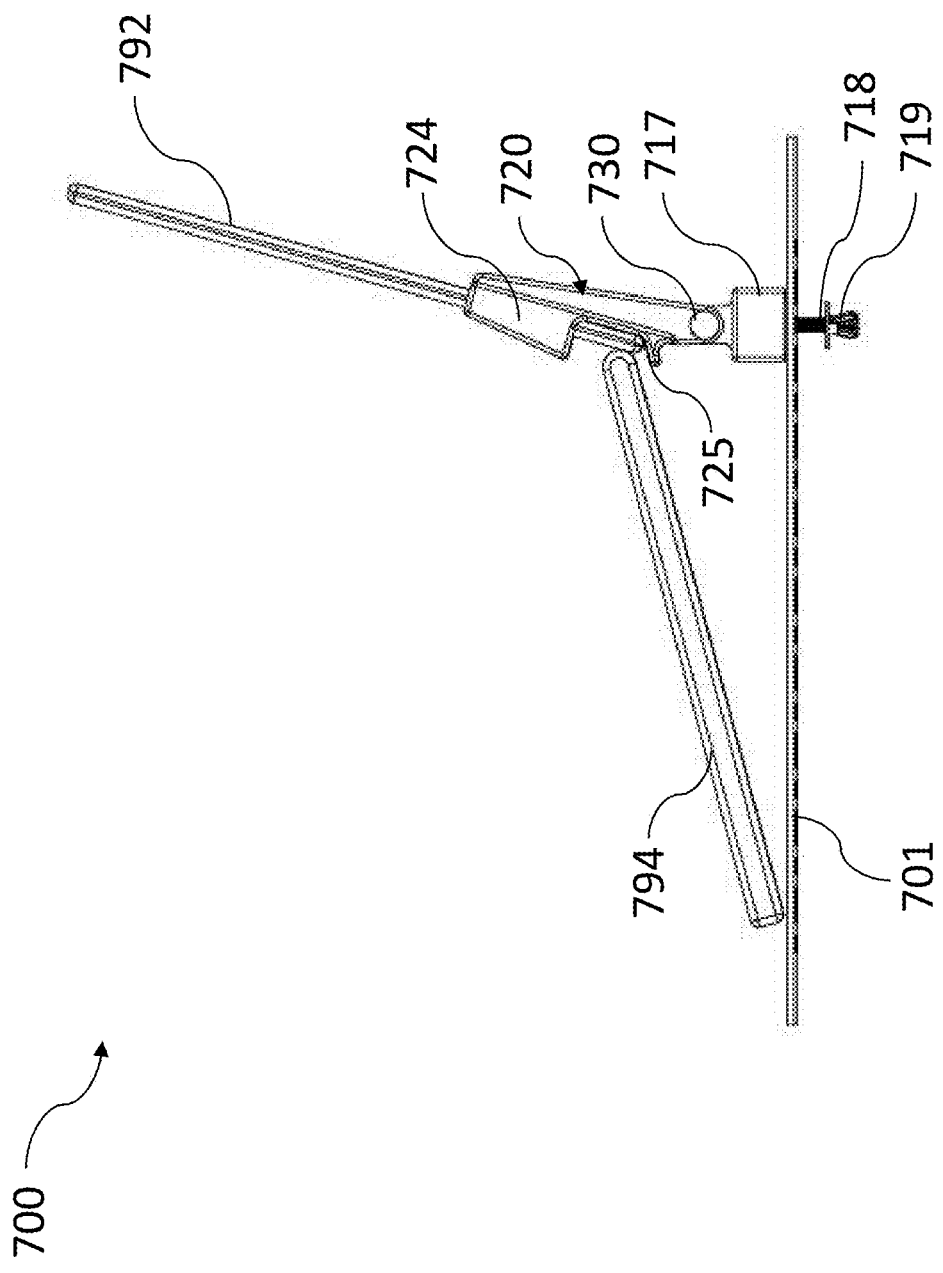
FIG. 47 illustrates a left side elevational view of the security apparatus of FIG. 45 with a laptop installed and in the open position.
Figure 48:
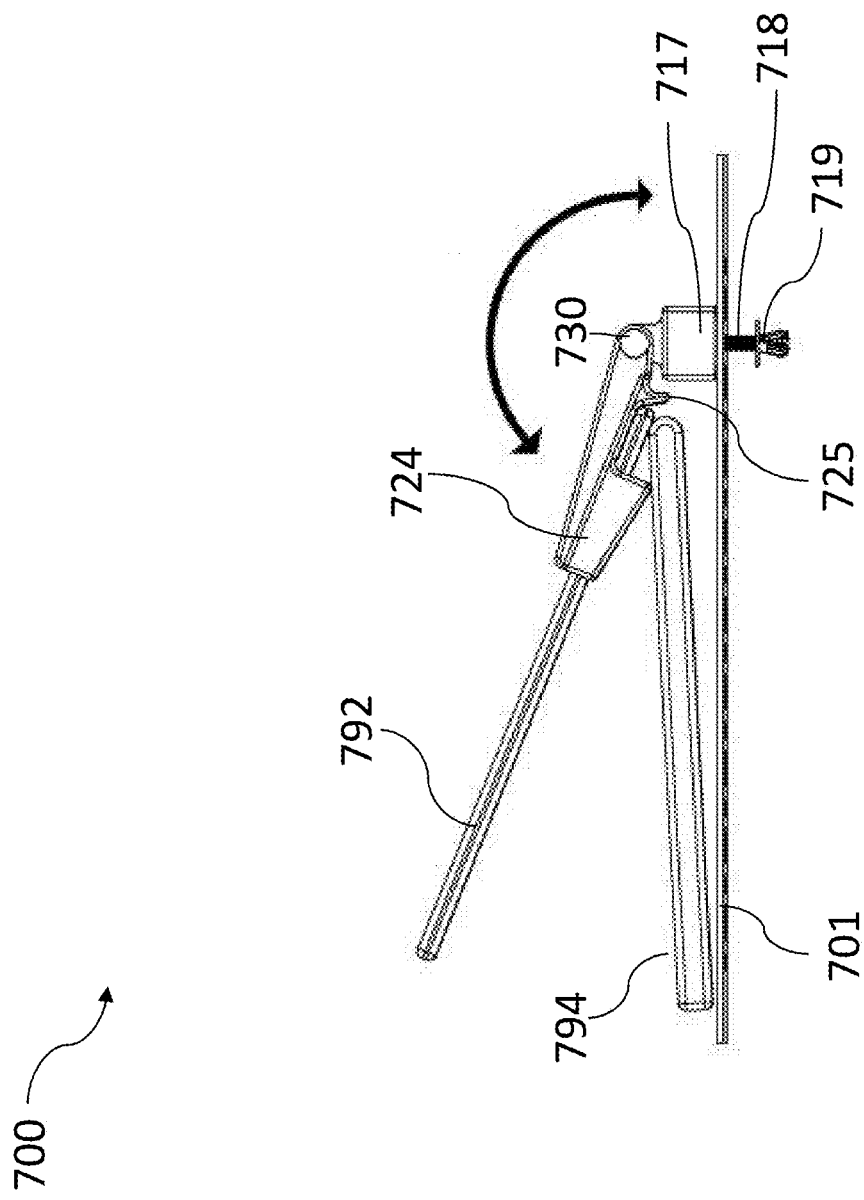
FIG. 48 illustrates a left side elevational view of the embodiment of the security apparatus of FIG. 47 with a laptop installed and in a closed position.

Once secured, the laptop 790 may be pivotally moved relative to the display surface 701 while retained by the security element 700 as shown in FIG. 46. In addition and as shown in FIGS. 47-48, the display portion 792 and the base portion 794 of the laptop 790 may be moved relative to each other and relative to the display surface while the laptop 790 is retained by the security apparatus 700.

Figure 49:
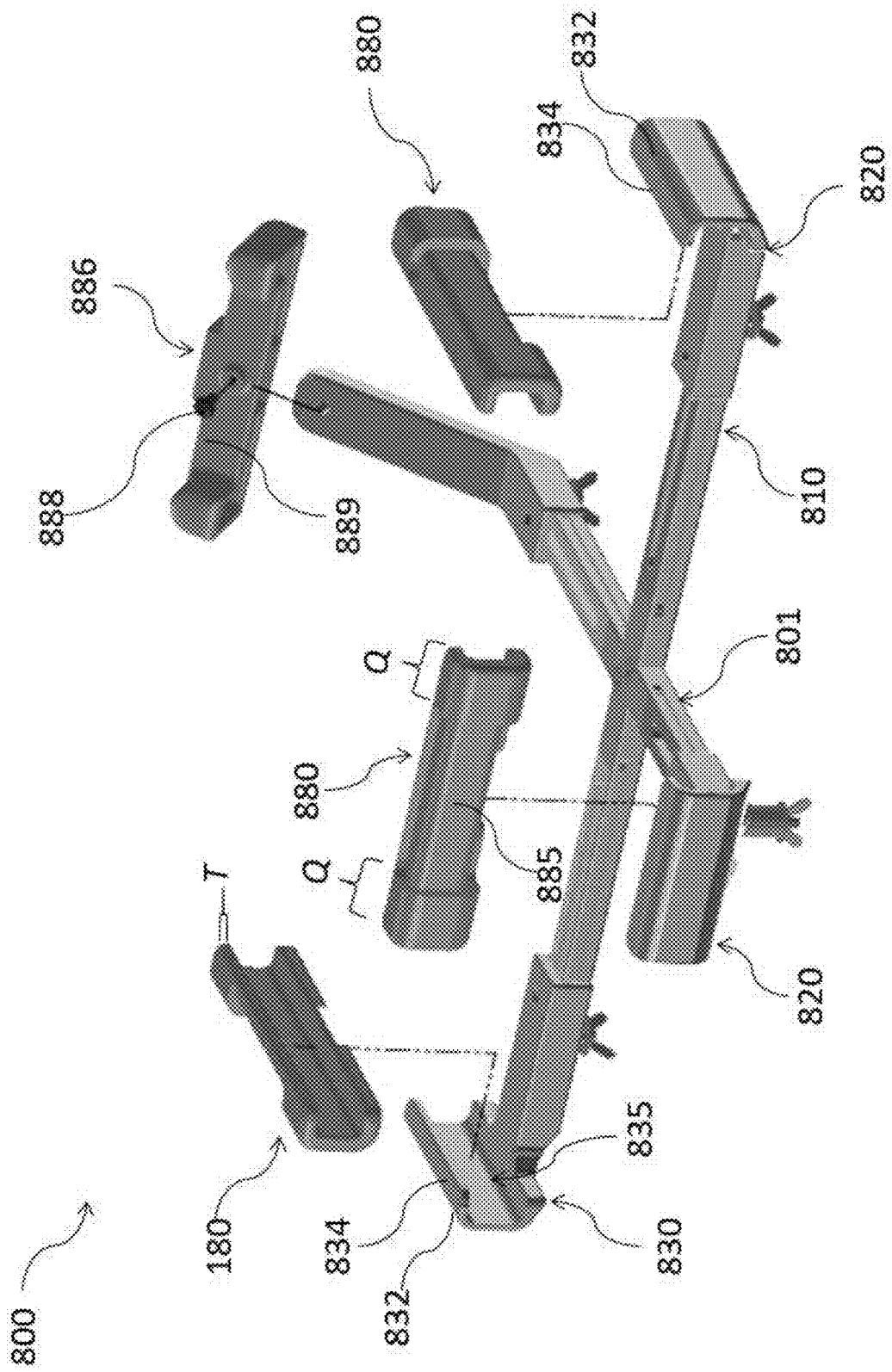
FIG. 49 illustrates a partially exploded view of another embodiment of the security apparatus including one or more detachable securing members.
Figure 50:
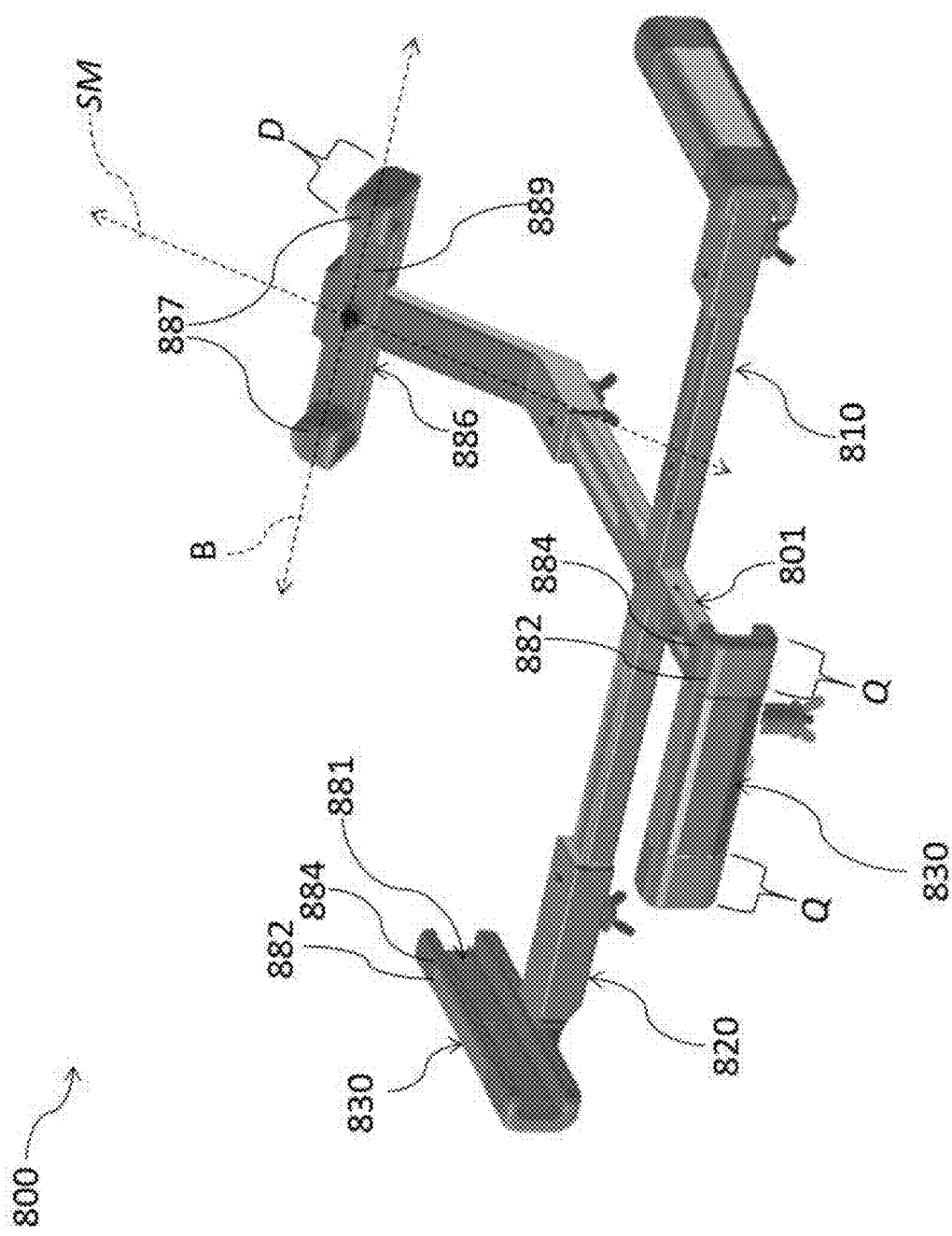
FIG. 50 illustrates a perspective view of the embodiment of the security apparatus from FIG. 49.

FIGS. 44, and 49-50 illustrate an embodiment of the security apparatus 800 that comprises one or more removable brackets or securing members 780, 880. As shown, the securing members 880 are configured to be removeably coupled to a holder 820 or retainer 830. The cap 832 and the lip 834 of the retainer 830 define a pocket 835 configured to engage, secure, and/or contact a surface of a portable electronic device. In the embodiments shown in FIGS. 49-50, the securing member 880 may be configured to be removeably coupled or held within the pocket 835. In another embodiment, the securing members are configured to be removeably coupled to the corresponding holder 820.

The securing members 880 allows one or more dimensions of the holder 820 or retainer 830 to be changed in order to accommodate portable electronic devices of varying sizes without having to remove and install holders 820 or retainers 830 of different sizes, or purchasing entirely differently dimensioned security apparatuses. As shown in FIGS. 49-50, an outside surface 885 of the securing member 880 is configured to engage the pocket 835 of the retainer 830. The retainer 830 is thereby increased in length be a distance Q and a new pocket 881 is defined by the cap 882 and lip 884 of the securing member 880. The height and depth of the new pocket 881 is decreased relative to the pocket 835 by the thickness T of the securing member 880. In other embodiments, the securing member 880 may be configured to change the height and depth of the new pocket 881 relative to the pocket 835 by an amount that is greater than the thickness T of the securing member 880. The securing member 880 may be dimensioned for a snap-fit or friction fit engagement with the holder 820 or retainer 830. In an embodiment, the outside surface 885 of the securing member 880 may define one or more surface features configured to removeably engage one or more complimentary surface features defined on corresponding surfaces of the pocket 835.

Still referring to FIGS. 49-50, the stop member 840 may be configured to removeably couple to a stop support member 886. The stop support member 886 may be comprise one or more raised members 887 positioned at opposing ends of a brace 889. As shown, the brace 889 extends along an axis B that intersects the axis SM of the stop member 840. The raised members 887 are configured to contact and support a surface of a portable electronic device being held/secured by the security apparatus 800. The raised members 887 extend a distance D from the brace 889. As shown, the stop support member 886 comprises two (2) raised members 887, however the stop support member 886 may comprise at least one (1) raised member 887. In other embodiments, the raised members 887 may be configured to clamp, trap, or otherwise secure a surface of a portable electronic device. As shown, the stop support member 886 may be secured to the stop member 840 using one or more fasteners 888, however in other embodiments the stop support member 886 may be coupled to the stop member 840 through a snap-fit engagement between one or more surface features defined on the stop member 840 and one or more complimentary surface features defined on the stop support member 886. In an embodiment, the surface features may comprise a plurality of threads defined on the stop member 840 configured to engage a plurality of complimentary threads defined on the stop support member 886. It is understood that one or more of the features of the removable brackets or securing members 780, 880 may be customized to accommodate One or more components of the embodiments of security apparatus 100, 200, 300, 400, 500, 600, 700, 800 described above may be comprised of one or more types of metal, such as steel, zinc, or aluminum, or one or more types of plastic, such as PA6 (Nylon 6), ABS (Acrylonitrile butadiene styrene), or POM (Polyoxymethylene). In an embodiment, one or more components of the security apparatus 100 may be comprised of a combination of metallic and plastic components.

While the present invention has been particularly shown and described with reference to certain exemplary embodiments, it will be understood by one skilled in the art that various changes in detail may be effected therein without departing from the spirit and scope of the invention that can be supported by the written description and drawings. Further, where exemplary embodiments are described with reference to a certain number of elements, it will be understood that the exemplary embodiments can be practiced utilizing either less than or more than the certain number of elements.

The invention claimed is:

1. A security apparatus for a portable electronic device, the security apparatus comprising:
   a base;
   a support assembly coupled to the base, the support assembly comprising,
      a support base coupled to the base, and
      a support plate coupled to at least one of the support base and the base,
   wherein the support plate is configured to contact the portable electronic device;
   a guide assembly positioned between the support base and the support plate, the guide assembly comprising,
      a guide plate, and
      at least two engagement plates positioned on the guide plate, each of the at least two engagement plates defining a plurality of surface features;
   at least two holders partially positioned between the guide assembly and the support plate, wherein the at least two holders are supported by the guide assembly, and wherein each of the at least two holders comprises,
      a retainer configured to retain a portion of the portable electronic device, and a holder extension defining a plurality of surface features that are complimentary to the plurality of surface features defined on the at least two engagement plates;

a lock assembly at least partially positioned within at least one of the base and the support assembly, the lock assembly comprising, a barrel configured to accept a locking tool, and a locking pin operatively coupled to the barrel, the locking pin including a biaser comprising one or more biaser surfaces; and a biasing element positioned adjacent to the locking pin, wherein in an unlocked state, the locking pin is positioned away from the biasing element and the at least two engagement plates are spaced apart from the holder extensions such that the at least two holders are enabled to move in a first direction to move the retainers away from the support assembly and an opposing second direction to move the retainers towards the support, and wherein in a locked state, the locking pin contacts and advances the biasing element into contact with the guide assembly to push the guide assembly towards the support plate to clamp the holder extensions between the guide assembly and the support plate, wherein the plurality or surface features of the holder extensions engage the surface features of the engagement plates to inhibit movement of the at least two holders in the first direction.

2. The security apparatus of claim 1, wherein each of the at least two holders comprises:

a spring member with a first end contacting one of the guide assembly and the support assembly; and a second end of the spring member contacts the holder, wherein when the lock assembly is moved from the locked to the unlocked state, the spring member is enabled to expand to push the holders in the first direction.

3. The security apparatus of claim 1, further comprising one or more securing members removeably coupled to one or more of the at least two holders, wherein the one or more securing members are configured to change a dimension of the holder.

4. The security apparatus if claim 1, wherein one of the holder extensions comprises a power cord securing element configured to inhibit disconnection of a power cord from the portable electronic device when the security apparatus is in the locked state.

5. A security apparatus for securing a portable electronic device, the security apparatus comprising:

a base;

a support assembly coupled to the base, the support assembly comprising, a support base coupled to the base, and a support plate coupled to at least one of the base and the support base, where the support plate is configured to contact the portable electronic device;

a guide assembly positioned between the support base and the support plate, the guide assembly comprising, a guide plate, and at least two engagement plates that each define a plurality of surface features;

at least two holders partially positioned between the guide assembly and the support plate, each of the at least two holders comprising, a retainer configured to retain a portion of the portable electronic device, and a holder extension defining a plurality of surface features that are complimentary to the surface features of the at least two engagement plates; and a lock assembly at least partially positioned within at least one of the base and the support assembly, the lock assembly is configured move between an unlocked state and a locked state, wherein in the unlocked state, the at least two engagement plates are spaced apart from the holder extensions such that the at least two holders are enabled to move in a first direction to move each retainer away from the support assembly and an opposing second direction to move each retainer towards the support assembly, and wherein in the locked state, the lock assembly urges the guide assembly towards the support plate to clamp the holder extensions between the guide assembly and the support plate, wherein the surface features of the holder extensions engage the surface features of the engagement plates to inhibit movement of the at least two holders in the first direction.

6. The security apparatus of claim 5, wherein the lock assembly further comprises:

a barrel configured to accept a locking tool; and a locking pin operatively coupled to the barrel, the locking pin including a biaser comprising one or more biaser surfaces.

7. The security apparatus of claim 6, further comprising a biasing element operatively coupled to the guide assembly.

8. The security apparatus of the claim 7, further comprising a resilient member in contact with the biasing element and the guide assembly.

9. The security apparatus of claim 5, wherein each of the at least two holders comprises a spring member with a first end contacting at least one of the guide assembly and the support assembly, and a second end contacting the holder, and wherein when the lock assembly is moved from the locked to the unlocked state, the spring member is enabled to expand to push the holders in the first direction.

10. The security apparatus of claim 5, further comprising one or more securing members removeably coupled to one or more of the at least two holders and configured to change a dimension of the one or more of the at least two holders.

11. The security apparatus of claim 5, wherein one of the holder extensions comprises a power cord securing element configured to inhibit disconnection of a power cord from the portable electronic device when the security apparatus is in the locked state.

12. The security apparatus of claim 7, wherein the one or more biaser surfaces are frustoconical.

13. A security apparatus for securing a portable electronic device, the security apparatus comprising:

a base;

a support coupled to the base;

a guide positioned on the support and defining a plurality of surface features;

at least two holders partially positioned between the guide and the support, wherein the at least two holders are supported by the guide and wherein each of the at least two holders defines a plurality of surface features that are complimentary to the surface features of the guide; and a lock assembly at least partially positioned within at least one of the base and the support, the lock assembly configured move between an unlocked state and a locked state, wherein in the unlocked state, the plurality of surface features defined by the guide are spaced apart from the plurality of surface features on the holders such that the at least two holders are enabled to move in a first direction that is away from the support and an opposing second direction to move the holders towards the support, and wherein in the locked state, the lock assembly moves the guide to clamp the holder between the guide and the support, wherein the surface features of the holder engage the surface features of the engagement plates to inhibit movement of the at least two holders in the first direction.

14. The security apparatus of claim 13, wherein the lock assembly further comprises:
a barrel configured to accept a locking tool, and
a locking pin operatively coupled to the barrel, the locking pin including a biaser comprising one or more biaser surfaces.

15. The security apparatus of claim 14, further comprising a biasing element operatively coupled to the guide and configured to engage the locking pin in the locked state.

16. The security apparatus of the claim 15, further comprising a resilient member in contact with the biasing element and the guide.

17. The security apparatus of claim 13, further comprising:
a spring member with a first end contacting at least one of the guide and the support; and
a second end contacting the holder,
wherein when the lock assembly is moved from the locked to the unlocked state, the spring member is enabled to expand to push the holders in the first direction.

18. The security apparatus of claim 13, further comprising one or more securing members removeably coupled to one or more of the holders and configured to change a dimension of the one or more holders.

19. The security apparatus of claim 13, wherein one of the holders comprises a power cord securing element configured to inhibit disconnection of a power cord from the portable electronic device when the security apparatus is in the locked state.

20. The security apparatus of claim 15, wherein the one or more biaser surfaces are frustoconical.

* * * * *

UNITED STATES PATENT AND TRADEMARK OFFICE
CERTIFICATE OF CORRECTION

PATENT NO. : 11,466,477 B2
APPLICATION NO. : 17/297677
DATED : October 11, 2022
INVENTOR(S) : Franklyn W. Gulick, Jr. et al.

It is certified that error appears in the above-identified patent and that said Letters Patent is hereby corrected as shown below:

In the Claims

Claim 4:
Column 23
Line 43 change "apparatus if" to --apparatus of--

Claim 5:
Column 24
Line 6 change "configured move" to --configured to move--

Claim 13:
Column 24
Line 64 change "configured move" to --configured to move--

Signed and Sealed this
Sixteenth Day of May, 2023

*Katherine Kelly Vidal*

Katherine Kelly Vidal
*Director of the United States Patent and Trademark Office*